United States Patent [19]

Tsuyama et al.

[11] Patent Number: 5,596,712
[45] Date of Patent: Jan. 21, 1997

[54] METHOD AND SYSTEM FOR DIAGNOSIS AND ANALYSIS OF PRODUCTS TROUBLES

[75] Inventors: Tsutomu Tsuyama; Shigeru Sato; Kayo Tsunekawa, all of Yokohama; Sadao Shimoyashiro, Fujisawa; Toshimasa Harada, Shizuoka-ken; Koichi Higano, Tochigi; Toshio Namiki, Utsunomiya; Chikaaki Yamaguchi, Tochigi-ken; Mitsuzo Morito, Tochigi, all of Japan

[73] Assignee: Hitachi, Ltd., Tokyo, Japan

[21] Appl. No.: 910,453

[22] Filed: Jul. 8, 1992

[30] Foreign Application Priority Data

Jul. 8, 1991 [JP] Japan .................................... 3-166695
May 25, 1992 [JP] Japan .................................... 4-132196

[51] Int. Cl.⁶ ............................. G06F 11/34; G06F 11/00
[52] U.S. Cl. .............. 395/183.02; 364/267; 364/DIG. 1
[58] Field of Search .................................. 371/29.1, 16.5, 371/15.1, 21.6; 364/276.3, 275.7; 395/183.01, 183.02, 185.01

[56] References Cited

U.S. PATENT DOCUMENTS

| | | | |
|---|---|---|---|
| 4,847,795 | 7/1989 | Baker et al. | 371/25.1 |
| 4,870,575 | 9/1989 | Rutenberg . | |
| 5,060,279 | 10/1991 | Crawford et al. | 382/14 |
| 5,090,014 | 2/1992 | Polich et al. | 371/15.1 |
| 5,099,436 | 3/1992 | McCown et al. | 371/26 |
| 5,200,958 | 4/1993 | Hamilton et al. | 371/29.1 |
| 5,210,704 | 5/1993 | Husseiny . | |
| 5,272,704 | 12/1993 | Tong et al. | 371/15.1 |
| 5,305,426 | 4/1994 | Ushioda et al. | 395/914 |

FOREIGN PATENT DOCUMENTS

| | | | |
|---|---|---|---|
| 424869 | 5/1991 | European Pat. Off. | G05B 19/04 |
| 428135 | 5/1991 | European Pat. Off. | G06F 15/20 |
| 119007 | 7/1983 | Japan | G05B 23/02 |
| 63-40962 | 2/1988 | Japan . | |
| 022406 | 1/1990 | Japan | G21L 17/00 |
| 242535 | 2/1990 | Japan | G06F 9/44 |
| 2-161567 | 6/1990 | Japan | G06F 15/20 |
| 3154847 | 7/1991 | Japan | G06F 11/22 |
| 0481616 | 3/1992 | Japan | G01D 21/00 |

*Primary Examiner*—Robert W. Beausoliel, Jr.
*Assistant Examiner*—Albert Decady
*Attorney, Agent, or Firm*—Antonelli, Terry, Stout & Kraus, LLP

[57] ABSTRACT

A computer-implemented method and system for diagnosing and system for diagnosing and analyzing fault information of a product is carried out by (a) creating a fault tree representing causal relations between faults and causes thereof base on information of past faults and information concerning the structure and characteristics of the product, and storing the fault tree in a storage unit, the fault tree having branches allocated with weighting coefficients; (b) inputting new fault information of the product into the computer; (c) searching the fault tree in accordance with the weighting coefficients based on the fault information stored in the storage unit to thereby determine the cause of the fault; (d) generating and outputting information concerning an adjustment or repair of the product suffering from the fault based on the determined cause of the fault as well as the information concerning the structure and the characteristics of the product; (e) supplying information concerning the timing of the occurrence of the fault, symptoms appearing in the fault, the cause of the fault and the adjustment and repair data to a host computer through a data collecting station to thereby construct a database for the fault information; and (f) the quality of the product based on all or a part of information of the database.

10 Claims, 54 Drawing Sheets

FIG. 6
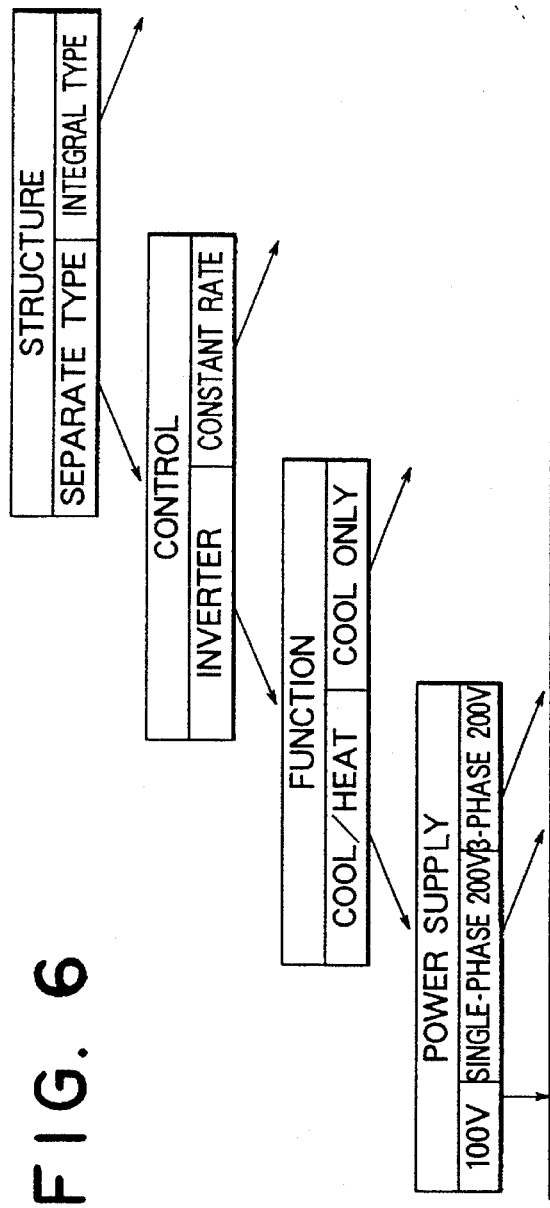
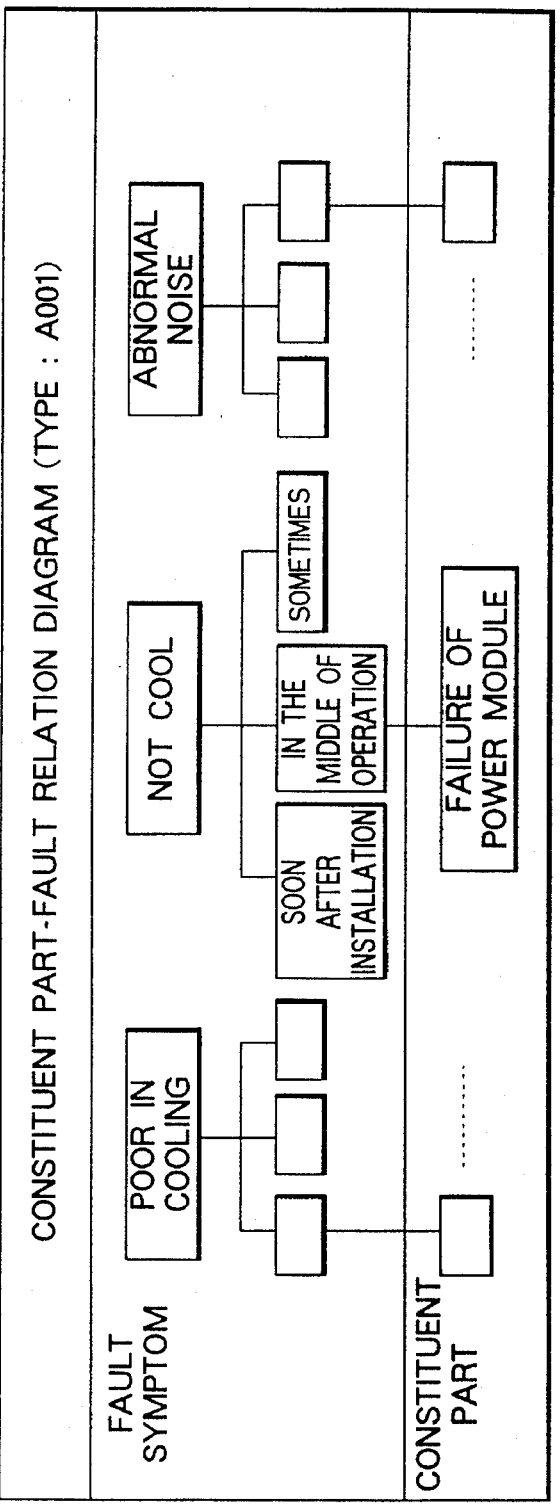

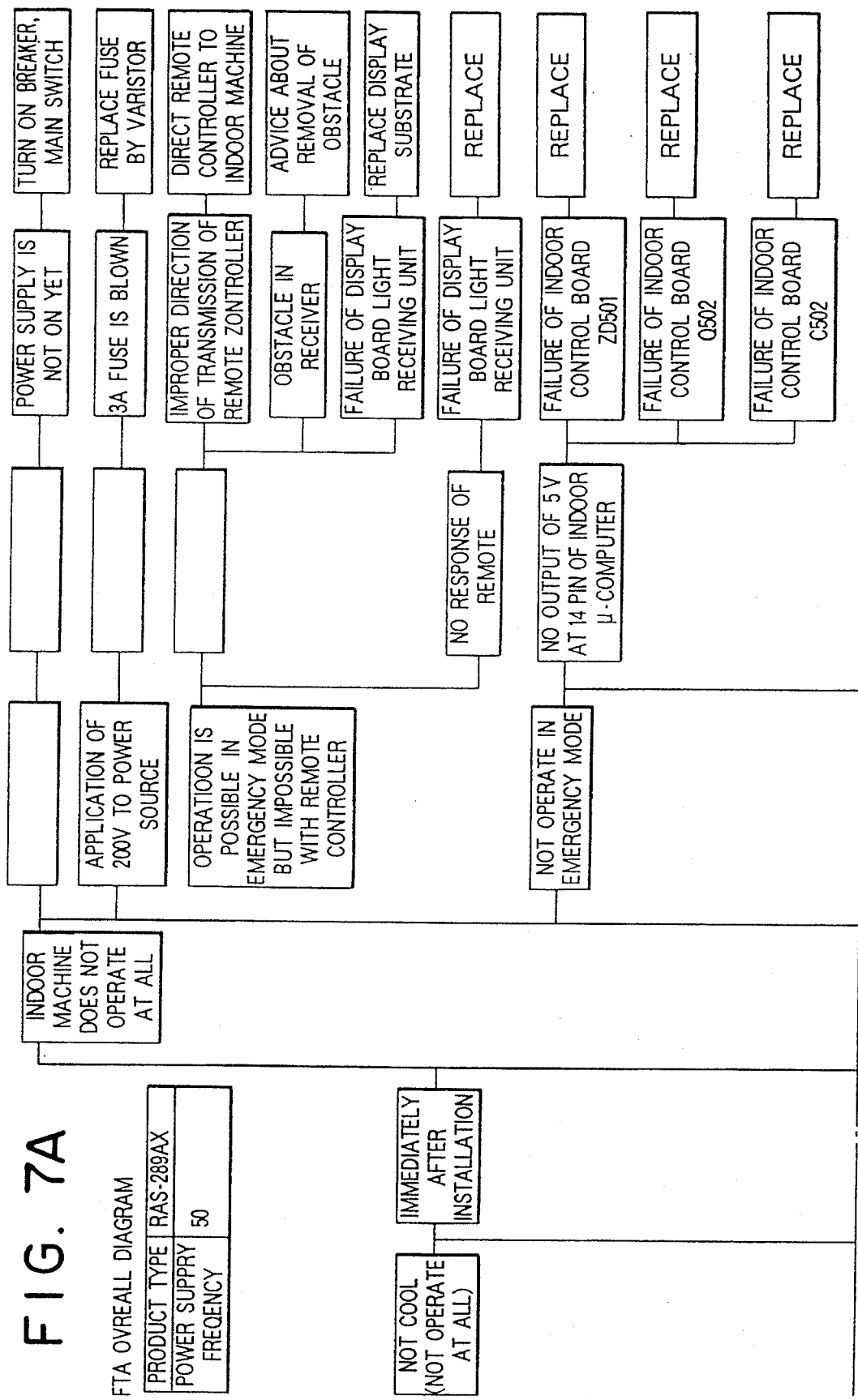

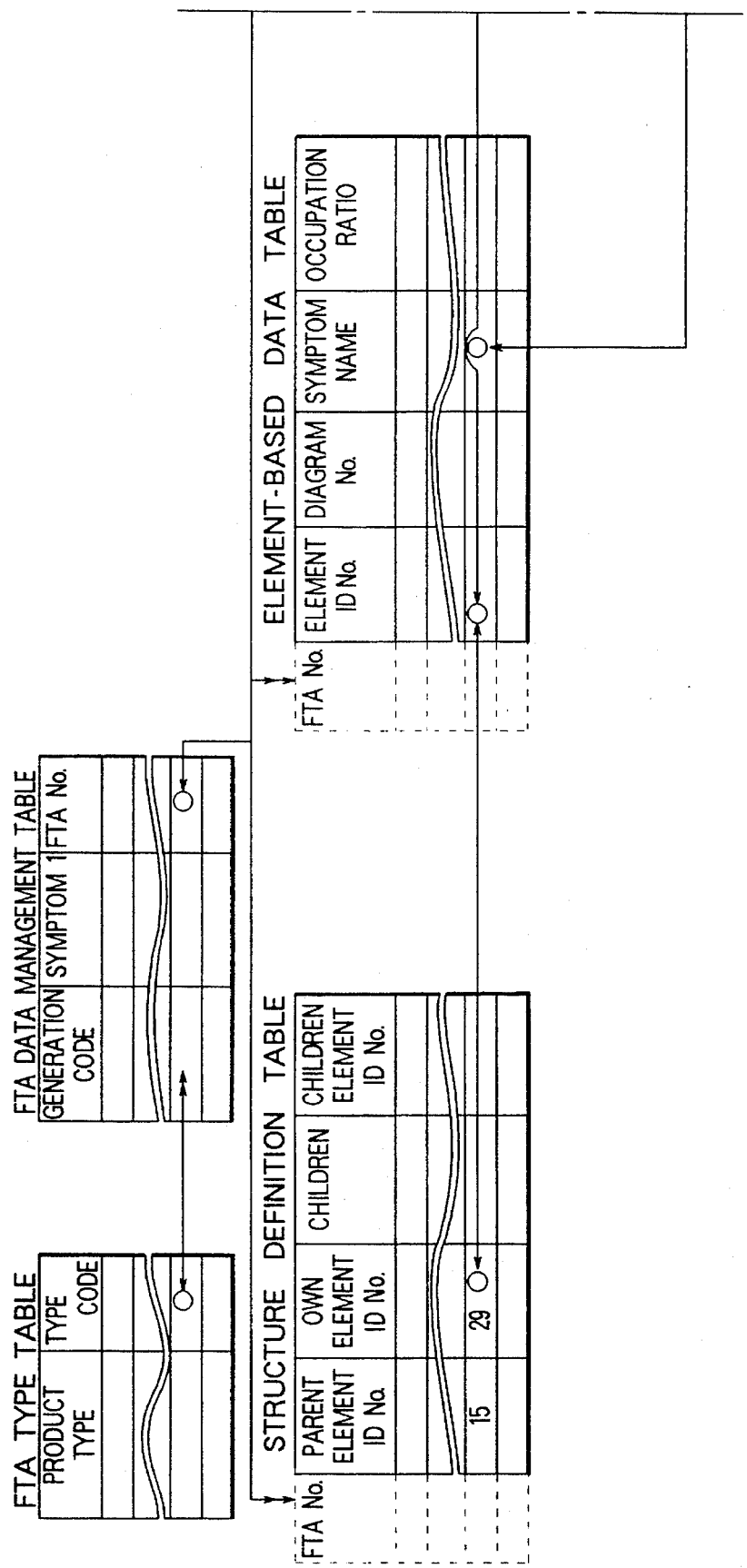

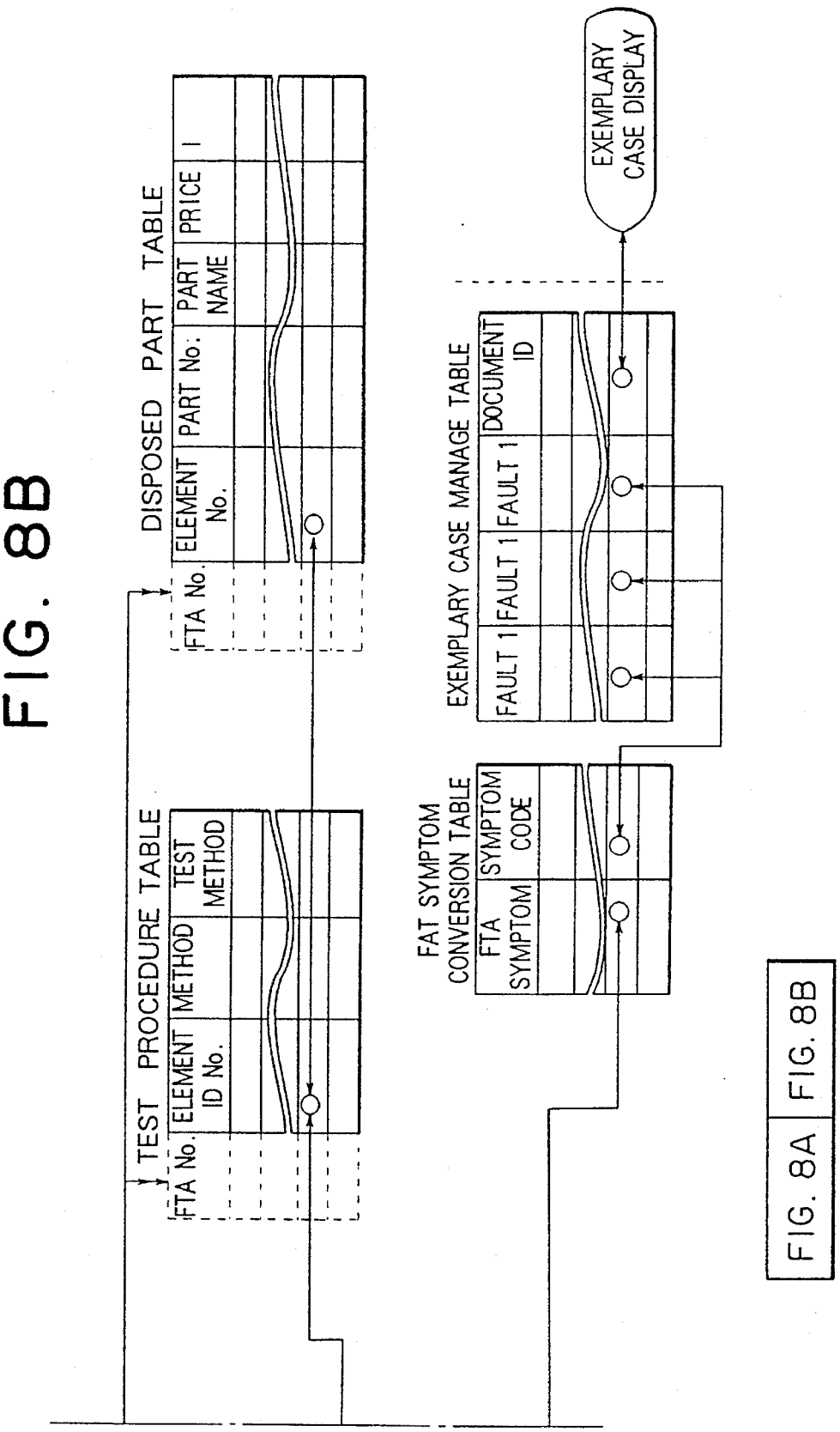

FIG. 9

DIAGNOSIS CONDITION SETTING

| PRODUCT TYPE | | |
|---|---|---|
| POWER SUPPLY FREQUENCY | 50Hz | 60Hz |
| SYMPTOM 1 | | |
| SYMPTOM 2 | | |

DIAGNOSIS START

END

FIG. 15

RESULT OF FAULT DIAGNOSIS

| PRODUCT TYPE | A001 |
| --- | --- |
| SYMPTOM 1 | NOT COOL (NOT OPERATE AT ALL) |

| DIAGNOSIS HISTORY | IN THE MIDDLE OF OPERATION |
| --- | --- |
| | OUTDOOR MACHINE DOES NOT OPERATE AT ALL |
| | TIMER LAMP FLASHES TREE TIMES |
| | OUTDOOR DIAGNOSIS LAMP IS NOT LIT |

THE CURRENT FAULT MAY BE COMPLETELY REMOVED BY REPLACING (ADJUSTING) FOLLOWING PARTS

| No. | PART NAME | PART No. | OCCUPATION RATIO | PRICE | STANDARDIZED WAGE |
| --- | --- | --- | --- | --- | --- |
| 1 | 1A FUSE OF OUTDOOR MACHINE BOARD | P001-6 | 40 | 300 | 6,300 |
| | OUTDOOR MACHINE SUBSTRATE ZD701 | P001-7 | — | 300 | — |
| | OUTDOOR MACHINE SUBSTRATE Q701 | P001-8 | — | 400 | — |
| 2 | REPAIR OF CONNECTION OF F-CABLES | | 30 | — | 3,200 |
| 3 | INDOOR CONTROL BOARD DRIVER IC | P001-9 | 15 | 300 | 6,300 |
| 4 | INDOOR POWER SUPPLY BOARD OPERATION RELAY | P001-10 | 10 | 400 | 6,300 |
| | INDOOR POWER SOURCE BOARD POWER RELAY | | — | 400 | — |
| 5 | OUTDOOR TEMPERATURE FUSE | P001-11 | 5 | 600 | 3,200 |

NOTE THAT ABOVE PREDICTION IS IMPROVED IF THE FAULT SITUATION ON THE FOLLOWING PAGE IS MADE CLEAR

FIG. 18A

| FIG.18A |
|---------|
| FIG.18B |

| | |
|---|---|
| PRODUCT CLASSIFICATION | X (4) |
| CHARGE / CHARGE-FREE | X (1) |
| PART NO. | X (14) |
| TYPE OF PRODUCT | X (12) |
| MANUFACTURE NO. (PRODUCT NUMBER) | X (12) |
| STATISTICAL YEAR, MONTH | X (6) |
| JOINT NO. — CARD | X (6) |
| JOINT NO. — PART | X (1) |
| DATA CLASSIFICATION (B.O./S.A./DST.) | X (1) |
| SYMPTOM CODE | X (4) |
| SOMETIMES CODE | X (1) |
| NUMBER OF MONTHS OF OPERATION | X (3) |
| MANUFACTURAL YEAR | X (2) |
| PRODUCT YEAR | X (2) |
| YEAR, MONTH OF MANUFACTURE | X (4) |
| LOT NUMBER | X (6) |
| BUSINESS OFFICE COPE | X (2) |
| SPECIAL AGENT CODE | X (6) |
| CIRCUIT ID NO. | X (6) |
| YEAR, MONTH OF FAULT (RECEIVED) | X (6) |
| YEAR, MONTH OF PURCHASE | X (6) |

FIG. 18B

| | | | |
|---|---|---|---|
| REASON FOR CHARGE-FREE | | | X (1) |
| CLASSIFICATION OF REPAIR CONTENT | | | X (1) |
| CLASSIFICATION OF OPERATION PERIOD | | | 9 (8) |
| REPAIR AMOUNT OF MONEY | WAGE | | 9 (8) |
| | PART PRICE | | 9 (8) |
| | TOTAL (INCLUSIVE OF OTHERS) | | X (6) |
| RECEPTION NO. | | | X (1) |
| CLASSIFICATION OF PERIOD | | | X (1) |
| CLASSIFICATION OF CLIENT | | | X (1) |
| CLASSIFICATION OF REPAIRER | | | X (1) |
| ADJUSTMENT/REPAIR CODE (1) | | | X (14) |
| SIMULTA-NEOUS REPLACE-MENT | ADJUSTMENT/REPAIR CODE (2) | | X (1) |
| | PART NO. (2) | | X (14) |
| | ADJUSTMENT/REPAIR CODE (3) | | X (1) |
| | PART NO. (3) | | X (14) |
| PRECEDING | YEAR, MONTH OF REPAIR | | X (4) |
| | SYMPTOM | | X (4) |
| PRE-PRECEDING | YEAR, MONTH OF REPAIR | | X (4) |
| | SYMPTOM | | X (4) |
| MEASURE NO. | | | X (6) |
| COOL/HEAT | FAULT LOCATION CODE | | X (3) |
| | SYMPTOM CODE | | X (4) |
| PART NAME | | | X (20) |
| MAKER CODE | | | X (6) |
| HOME-USE ELECTRIC/COOLER HEATER CLASSIFICATION | | | X (1) |
| GLOBAL SYMPTOM CLASSIFICATION CODE | | | X (4) |

FIG. 18A
FIG. 18B

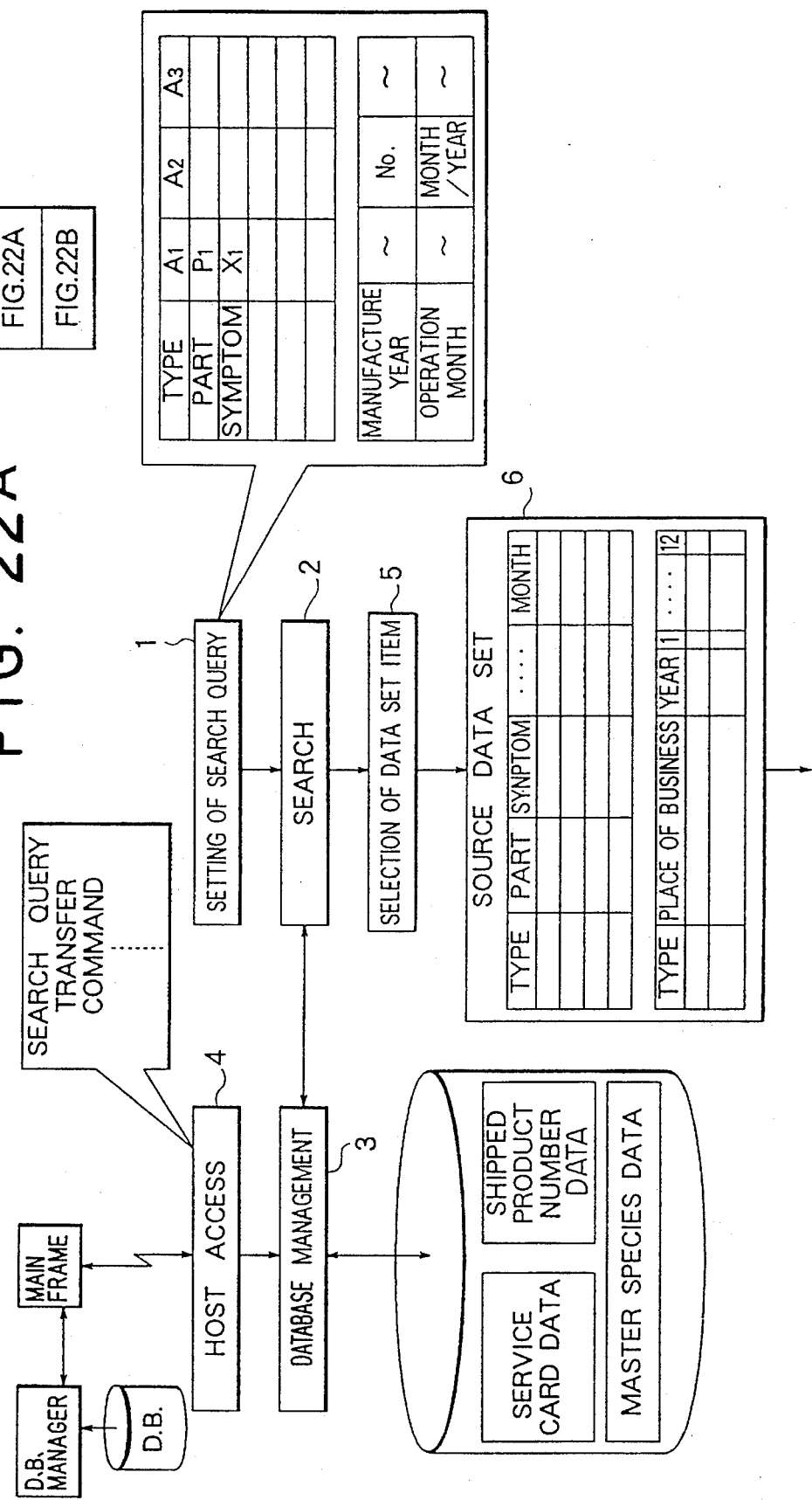

FIG. 23A

| ITEMS FOR MANAGEMENT | DEFINITION |
|---|---|
| NUMBER OF FAULTS | NUMBER OF OCCURRENCE OF FAULT DURING CONCERNED PERIOD MONTH, YEAR |
| TOTAL NUMBER OF FAULTS | TOTAL NUMBER OF FAULT OCCRRENCES FROM SHIPPING START MONTH TO THE CONCERNED PERIOD |
| MONETARY AMOUNT FOR REPAIR | MONETARY AMOUNT FOR REPAIR DURING THE CONCERNED PERIOD (STATISTICAL PERIOD IN MONTH, YEAR) |
| TOTAL MONETARY AMOUNT | TOTAL MONETARY AMOUNT IN A TIME SPAN SHIPPING START MONTH TO THE CONCERN PERIOD |
| MONTHLY FAULT RATIO | $\dfrac{\text{NUMBER OF FAULT OCCURRENCES DURING THE CONCERNED PERIOD}}{\text{TOTAL NUMBER OF PRODUCTS SHIPPED FROM THE START MONTH TO THE CONCERNED PERIOD}}$ |
| TOTAL FAULT RATIO | $\dfrac{\text{NUMBER OF FAULT OCCURRENCES FROM SHIPPING START MONTH TO THE CONCERNED PERIOD}}{\text{TOTAL NUMBER OF SHIPPED PRODUCTS FROM SHIPPING START MONTH TO THE CONCERNED PERIOD}}$ |
| FAULT RATIO ON AVERAGE | $\dfrac{\text{TOTAL NUMBER OF FAULT OCCURRENCES FROM SHIPPING START MONTH TO THE CONCERNED PERIOD}}{\text{TOTAL OPERATION TIME FROM SHIPPING START MONTH TO THE CONCERNED PERIOD}}$ |

| FIG. 23A |
|---|
| FIG. 23B |

FIG. 23B

| CLASSIFICATION | | DATA ITEMS | DATA TYPES |
|---|---|---|---|
| CATEGORICAL DATA | DISCRIMINATION | SEARCH IDENTIFICATION NUMBER, PRODUCT CLASSIFICATION, CHARGE/CHARGE-FREE CLASSIFICATION, DATA CLASSIFICATION, FAULT DISPOSAL CODE, ELECTRIC APPARATUS FOR HOME USE, COOLER/HEATER CLASSIFICATION, JOINT, NO., TROUBLE LOT NO. | 0 |
| | FACTORS | PART NO., PRODUCT TYPE, SYMPTOM CODE, SOMETIMES CODE, BUSINESS OFFICE CODE, SPECIAL AGENT CODE, CIRCUIT NO., INPUT/OUTPUT CLASSIFICATION, CLASSIFICATION OF DISPOSAL CONTENT, CHARGE-FREE REASON CLASSIFICATION OF CONTENTS OF REPAIRS, CLASSIFICATION OF OPERATION PERIODS, CLASSIFICATION OF PERIODS, CLASSIFICATION OF CLIENTS, CLASSIFICATION OF REPAIRERS, ADJUSTMENT/REPAIR CODES (1)−(3), PART NOS. (2)−(3), PRECEDING SYMPTOM, PRE-PRECEDING SYMPTOM, MEASURES NOS. MAKER CODE, COOLER/HEATER CODE, PART NAMES | I |
| SEQUENTIAL DATA | MANAGEMENT NO. | MANUFACTURAL NO., LOT NO., ACCEPT NO. | II |
| | MONTH YEAR | MANUFACTURAL YEAR, PRODUCT YEAR | III |
| | | STATISTICAL MONTH/YEARS, MANUFACTURAL MONTH/YEAR, FAULT OCCURRENCE MONTH/YEAR, PURCHASE MONTH/YEAR, PRECEDING REPAIR MONTH/YEAR, PRE-PRECEDING REPAIR MONTH/YEAR | IV |
| NUMERICAL DATA | | NUMBER OF MONTHS IN OPERATION, MONETARY AMOUNT FOR REPAIR | V |

| FIG. 23A |
|---|
| FIG. 23B |

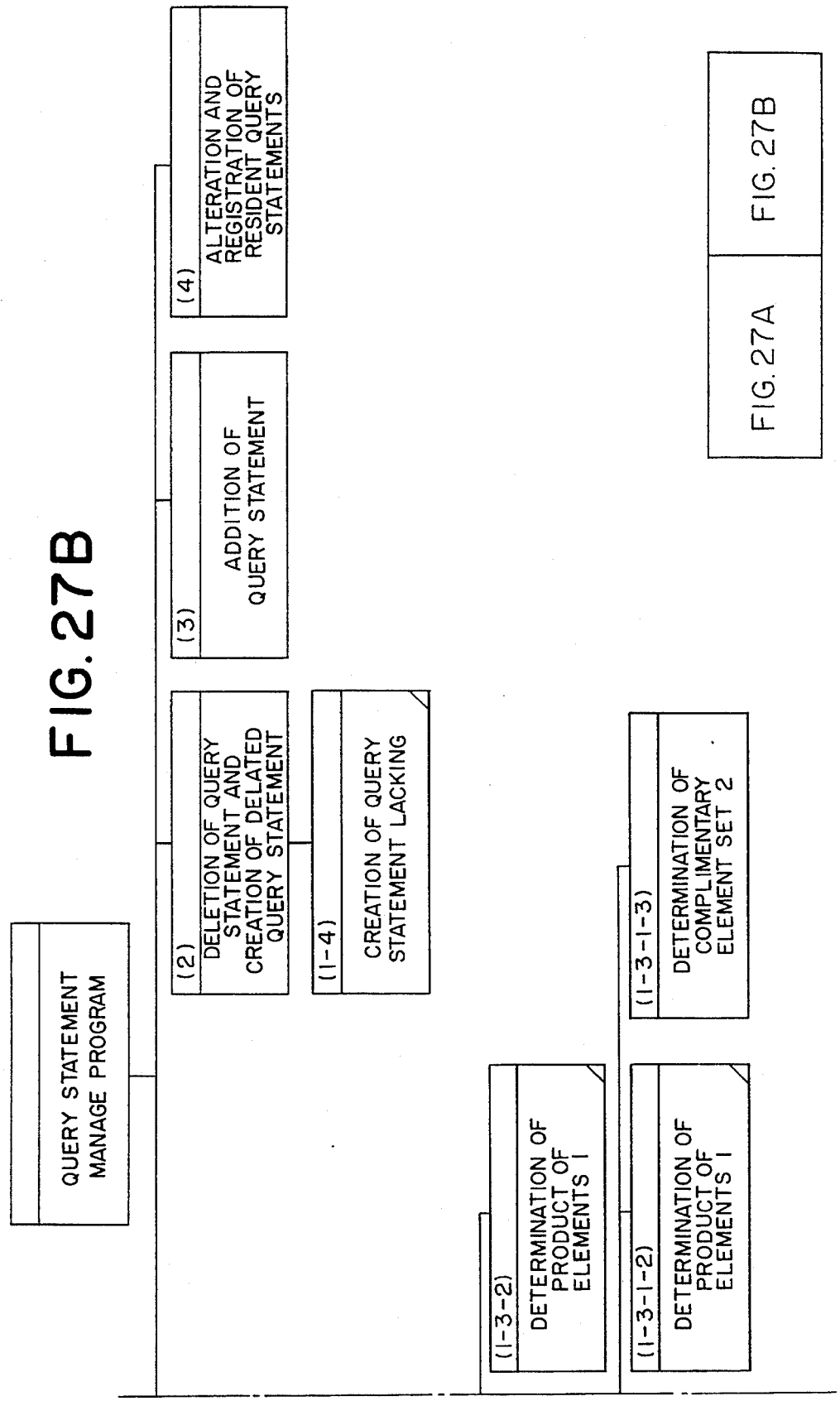

FIG. 31

(4) ALTERATION AND REGISTRATION OF RESIDENT QUERY STATEMENT

STEP 1: OPEN QUERY STATEMENT FILE IN UPDATE MODE

STEP 2: WRITE INPUT QUERY STATEMENT IN QUERY STATEMENT FILE

STEP 3: CLOSE QUERY STATEMENT FILE

END

ADDITION OF
QUERY STATEMENT

STAP 1 — OPEN QUERY STATEMENT FILE IN ADD MODE

STEP 2 — ADD INPUT QUERY STATEMENT IN QUERY STATEMENT FILE

STEP 3 — CLOSE QUERY STATEMENT FILE

END

FIG. 33

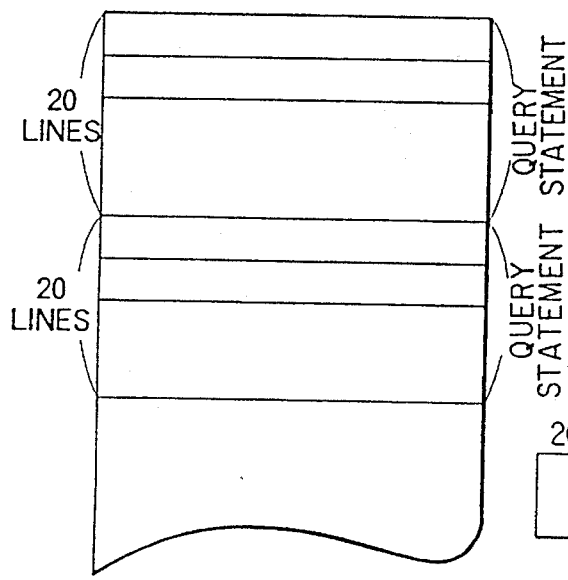

ONE QUERY IS DESCRIBED ON 21 LINES. FIRST CONTAINS NORMAL REPRSENTING ORDINARY NUMBER OF THE CASE. FIRST QUERY STATEMENT IS RESIDENT. ITEM NAME AND TYPE MUST NECESSARILY BE STATED ON ONE LINE.

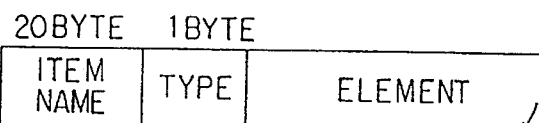

UNLESS ELEMENTS EXIST. WHOLE SET IS PREREQUISITE FOR THE ITEM.

FIG. 34

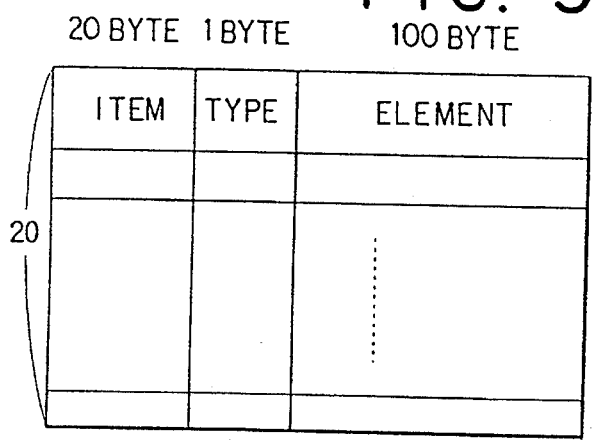

```
STRUCT JYOKENS
  {
    STRUCT JYOKEN [20]
  }
STRUCT JYOKEN
  {
    CHAR NAME [20]
    CHAR TYP :
    CHAR YOUSO [100]
  }
```

TYP ... ( c : CHARACTER TYPE
         λ : INTEGER TYPE
         f : REAL NUMBER TYPE )

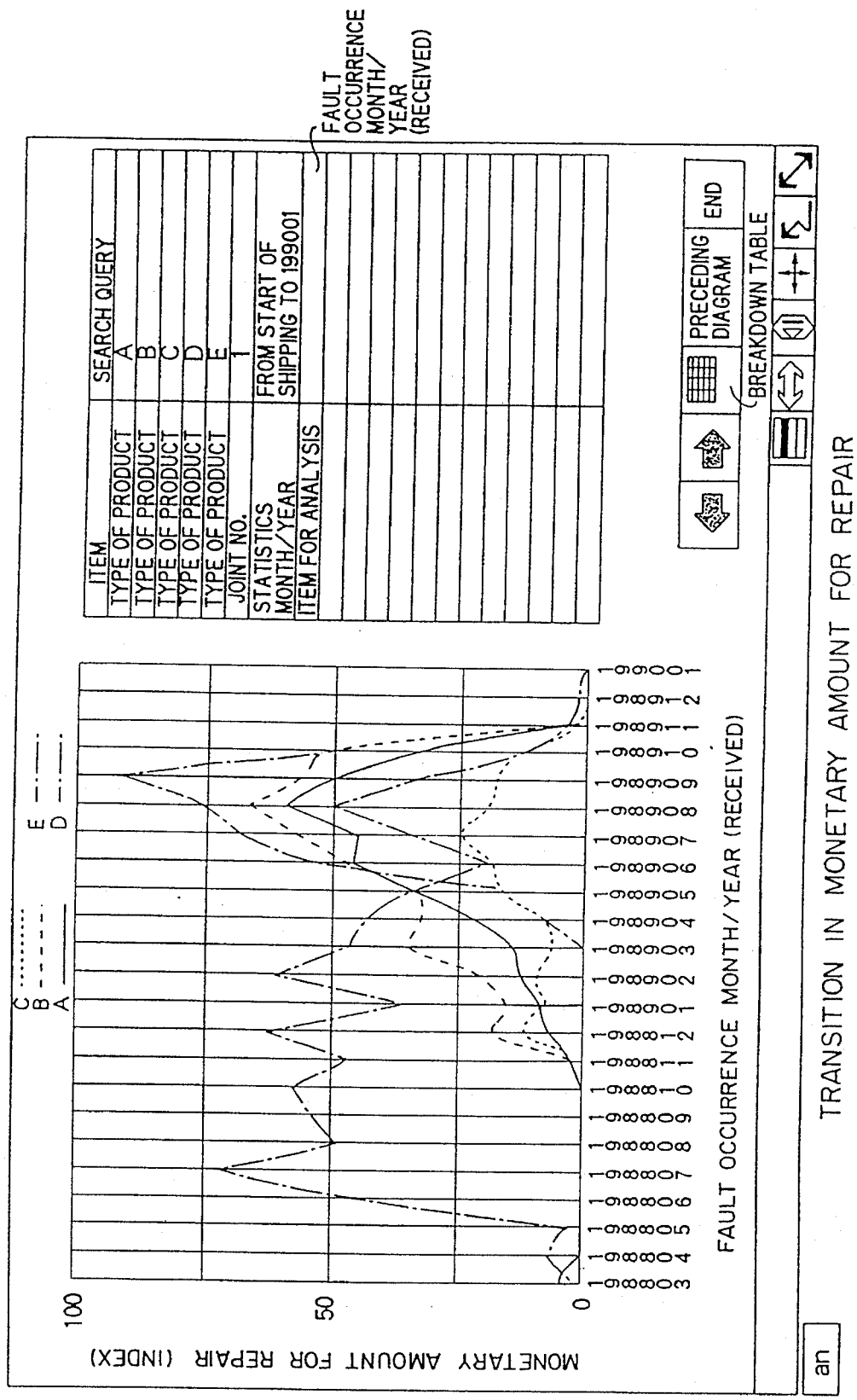

FIG. 41

| TOTAL CASE No. | | 3140 | | |
|---|---|---|---|---|
| NO | TYPE OF PRODUCT | MANUFACTURE No. (±#) | PART No. 1 | SYMPTOM CODE |
| 1 | A | 00520449 | Y000 | ABNORMAL SOUND (RATTLE) |
| 2 | C | 00099612 | Y000 | OTHER |
| 3 | A | 00999900 | Y000 | NO REPRODUCTION OF PHENOMENON |
| 4 | A | 00090226 | Y000 | OTHER |
| 5 | D | 00074868 | Y001 | BREAKAGE/CUT/CHACK RATIO |
| 6 | E | 00149423 | Y001 | OTHER |
| 7 | D | 001066589 | Y001 | DEFORMATION. DISTORTION |
| 8 | D | 00106605 | Y002 | OTHER |
| 9 | B | 00144725 | Y002 | BRUISE(SCRATCH) |
| 10 | A | 00144801 | Y002 | BRUISE(SCRATCH) |
| 11 | A | 00148400 | Y002 | DEFORMATION.DISTORTION |
| 12 | B | 00149123 | Y002 | BRUISE(SCRATCH) |
| 13 | B | 00150212 | Y003 | BRUISE(SCRATCH) |
| 14 | D | 00222120 | Y004 | 1037 |
| 15 | A | 00011617 | Y004 | DEFORMATION.DISTORTION |

DATA EXTRACT | DATA DELETE | OVERLAP ±#

GROUP DEFINSION

END

SPECIFICATIONS OF SERVICE CARD

FIG. 45

SOURCE DATA MANAGE TABLE

| | ITEM 1 | ITEM 2 | ... | ITEM L |
|---|---|---|---|---|
| 1 | | | | |
| 2 | | | | |
| ... | | | | |
| j | | | | |
| ... | | | | |
| M | | | | |

(a) SOURCE DATA COUNT TABLE: M

ANALYSIS TOOL MANAGE TABLE

| | ITEM FOR ANALYSIS | DATA PROSESSING METHOD | ANALYSIS METHOD | CONTENT OF FACTOR ANALYSIS |
|---|---|---|---|---|
| 1 | | | | |
| 2 | | | | |
| ... | | | | |
| i | | | | |
| ... | | | | |
| N | | | | |

(b) FACTOR ANALYSIS COUNT TABLE: i

FACTOR ANALYSIS (SAVING OF MANAGEMENT DATA)

RESTORATION OF MANAGEMENT DATA

DATA RELATION DIAGRAM

| ITEM FOR ANALYSIS | DATA PROCESSING METHOD | ANALYSIS METHOD |
|---|---|---|

FIG. 48
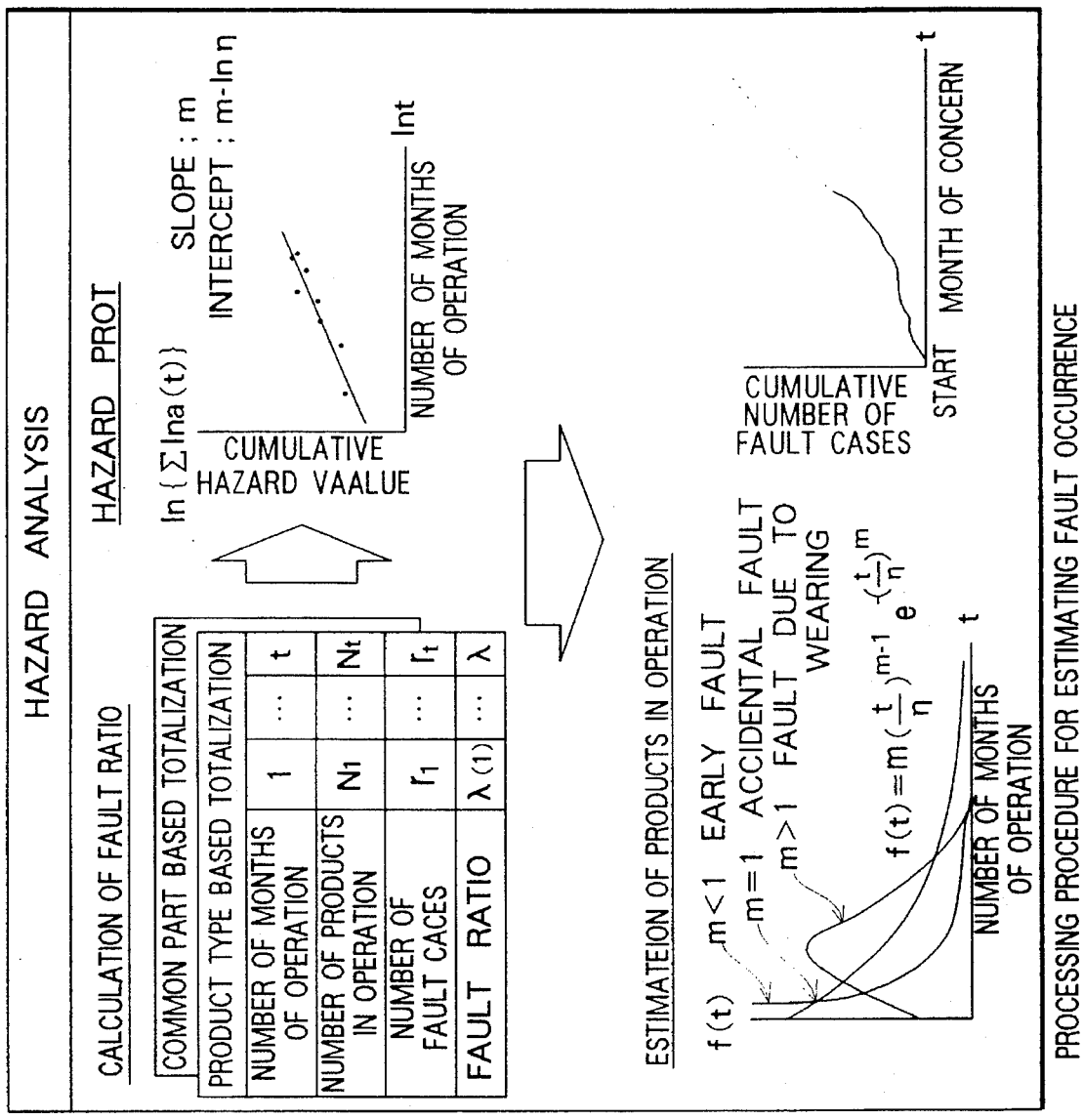
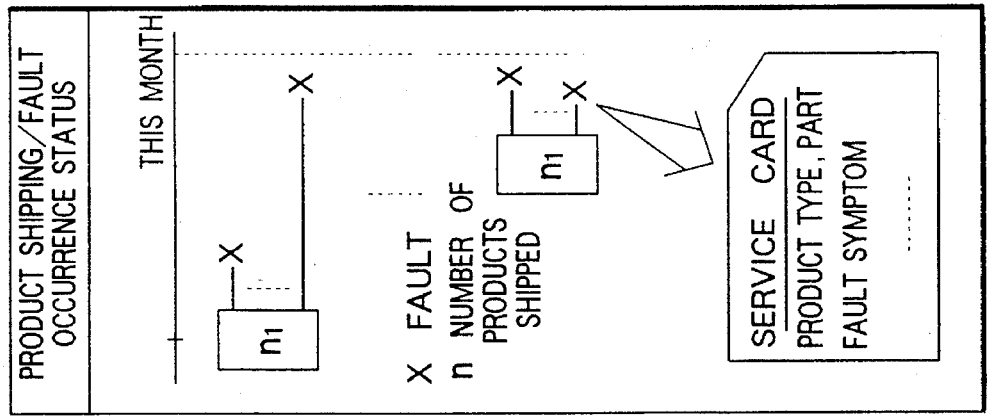

METHOD AND SYSTEM FOR DIAGNOSIS AND ANALYSIS OF PRODUCTS TROUBLES

BACKGROUND OF THE INVENTION

The present invention relates to a method and a system for searching for a causal relation of trouble or a fault of a product on the basis of information concerning the fault of the product to thereby display the cause of the fault together with measures for coping with the fault, as well as a system and a method for collecting and storing information concerning the quality of the product and for searching and analyzing the information as stored.

In the fault finding diagnosis of a machine or apparatus known heretofore, a tree representing the causal relations of the faults is displayed on an image screen, wherein an event of concern is moved in the direction toward the cause of the fault through interactive diagnosis procedure, as is disclosed, for example, in JP-A-2-161567. In the case of the invention described in this publication, however, no consideration is given to means for obtaining the information from the machine or apparatus subjected to the diagnosis or means for transmitting the information to a location or system for carrying out the diagnosis. Further, there is found suggestion concerning the no probability concept representing validity of the causal relations which provides one of the basis for the decisions made in the course of tree searching. Moreover, no consideration is given to means for updating the probabilities and configuration of tree. For these reasons, this prior art technique is lacking in practicality for performing the fault diagnosis of the machines or apparatuses.

With regard to the collection and analysis of the information concerning the quality of products used by the customers, there is proposed a method of acquiring the fault information of the products by making use of bar codes, as disclosed, for example, in JP-A-63-40962. However, neither teaching nor suggestion is found in this publication concerning the data storage/manage method and the search/analysis method. Further, as the fault information, there is available only "content of the fault". Thus, this prior art method is also lacking in practicality.

In the case of the prior art techniques mentioned above, it is first noted that no consideration is made concerning the accuracy of the data which provides the basis for the diagnosis, thus giving rise to a problem with respect to the accuracy of the diagnosis performed by the system. Secondly, structurization of the data providing the basis for the diagnosis or inputting of the causal relations of the faults, to say in another way, cannot be realized unless an AI tree is effectively usable, presenting a problem with respect to the operability thereof.

Furthermore, in conjunction with the method of analyzing the quality information, it is first noted that consideration is paid to neither the items of quality data to be collected nor the means for collecting the quality data in reality, giving rise to a problem concerning the practicality of the quality control or management of the system. Secondly, neither the method of storing and managing the quality data nor the search method is taken into consideration, presenting a problem with respect to the cost performance of the system as well as the operability inclusive of the expansion-susceptibility of the system. Thirdly, the function or capability of the system is confined to the display of the faults of products actually taking place in the field or locales and the states of quality deficiency. Thus, the system play a role as a tool for pursuing the causes or factors in which the faults and the deficiencies originate. Besides, because the functions of a large scale computer are utilized directly by the users, no consideration can be paid to any fine condition setting for the search and the analysis, which in turn presents problems for the users with respect to the dynamics and the flexibility of the editing function and the analysis function.

SUMMARY OF THE INVENTION

An object of the present invention is to solve the problems of the prior art techniques and provide a method and a system for diagnosing and analyzing fault information of products with the aid of a computer to thereby perform rapid and effective repair of those products which suffer from the fault and prepare the quality information of the products by statistically processing the results of the analysis.

A method for diagnosing and analyzing fault information according to the invention comprises the following steps of:

a) creating a fault tree representing causal relations between faults and causes thereof in the past in a tree structure on the basis of information concerning the structure and characteristics of the product and storing the fault tree in a storage unit, wherein the branches of the fault tree are allocated with weighting coefficients, respectively;

b) inputting new fault information of the product into the computer through a terminal apparatus capable of communicating with the computer;

c) responding to the input of the new fault information for searching for the fault tree in accordance with the weighting coefficients on the basis of the fault information stored in the storage unit to thereby determine the cause of the fault of the product;

d) generating by the computer the information concerning adjustment or repair of the product suffering from the fault on the basis of the cause of the fault as well as the information concerning the structure and the characteristics of the product and outputting the information concerning the adjustment or the repair;

e) supplying the information concerning the date of occurrence of the fault of the product, symptoms appearing in the fault, the cause of the fault and the data of the adjustment and the repair to a host computer through a data collecting station to thereby provide a database for the fault information; and f) statistically analyzing by the computer the quality of the product on the basis of all or a part of information of the database.

A system for diagnosing and analyzing the fault information of products with the aid of a computer comprises the following units:

a) a storage unit for storing a fault tree representing past causal relations between faults and causes thereof in a tree structure together with information concerning structure and characteristics of the product, wherein branches of the fault tree are allocated with weighting coefficients, respectively;

b) a terminal apparatus capable of communicating with the computer for inputting new fault information of the product;

c) means responsive to the input of the new fault information for searching for the fault tree in accordance with the weighting coefficients and on the basis of the fault information stored in the storage means to thereby determine the cause of the fault of the product;

d) a unit for generating information concerning adjustment or repair of the product suffering from the fault on the basis of the cause of the fault as well as information concerning the structure and the characteristics of the product and outputting the information concerning the adjustment or the repair;

e) a unit for supplying information concerning the date of occurrence of the fault of the product, symptoms appearing in the fault, the cause of the fault and the data concerning the adjustment and repair to a host computer through a data collecting station to thereby provide a database for the fault information; and f) a unit for statistically analyzing the quality of the product on the basis of all or a part of the information stored in the database.

In a mode for carrying out the present invention, when a fault occurs in a product in the field where it is operated by a customer, the user of the product, a maintenance engineer such as a serviceman who is in charge of disposing of customers' claims, is dispatched to the field and repairs the product, wherein information concerning the repair is fed back to a factory which responsible for designing, manufacturing and inspecting the product from a business division such as a special agent and a business office through a computer network on a repair-by-repair basis. With the computer network, it is intended to mean a network in which general-purpose large scale computers are interconnected hierarchically, or in which a general-purpose computer and workstations are interconnected hierarchically or in which workstations are interconnected hierarchically. Further, the maintenance serviceman is obliged to input the type of the product, the symptoms of the fault and the contents of the disposal through the medium of a small scale terminal whenever he or she has repaired the product in the field.

According to the invention, when a fault occurs in a machine or apparatus being used by a customer, the cause of the fault can be pinpointed by searching for the fault tree on the basis of the symptom, whereby the measures for adjustment or repair can be designated. By virtue of this feature, the number of times the maintenance serviceman is dispatched to the field for the repair, the turn-around time for completion of the repair and the number of parts required for the repair can be reduced, whereby service costs can be decreased while increasing the reliability of the product, which will ultimately lead to expansion of the share in the market.

Further, information regarding the repair performed primarily in the field by the maintenance serviceman can instantaneously be fed back to the factory which is responsible for designing, manufacturing and inspecting the product on a repair-by-repair basis by way of the business division such as a specific agent or business office. Accordingly, improvement of the design of the product being manufactured, evaluation of the parts as well as improvement of evaluation/inspection method can be realized in an earlier stage. Besides, enhanced reliability can be ensured in designing a new model. Furthermore, since the search/analysis of the quality data can be performed solely in the workstation, a sequence of the search/analysis request, the processing and the output can be executed on a real-time basis, whereby the turn-around time involved in the analysis work can be reduced. Moreover, by searching and developing the source data on a memory on a record-by-record basis in the workstation, the analysis for each item of data concerning the fault and the repair of the product or analysis for all combinations of the data items can be performed.

BRIEF DESCRIPTION OF THE DRAWINGS

FIG. 6 shows a hierarchical structure of a tree representing causal relations of the fault to be searched in the fault diagnosis;

FIG. 8 shows a data structure for implementing the fault tree in a workstation;

FIG. 9 shows a screen image for allowing the type of a product suffering from a fault and symptoms thereof acquired from a customer directly or through the medium of a serviceman who contacted the customer to be input as the conditions for the diagnosis;

FIG. 15 is a view showing results of the diagnosis;

FIG. 18 is a view showing a format for inputting type of a product, symptoms of a fault, parts, contents of disposal etc. into a hand-held computer;

FIGS. 23A and 23B are, views showing management items and data items which provide the basis for performing arithmetic operation in accordance with an analysis request when the present invention is carried out;

FIG. 31 is a view showing a procedure through which the function (4) of alteration and registration of the resident query statement shown in 28 is activated;

FIG. 32 is a view showing a procedure through which the function (3) for addition of the query statement shown in FIG. 28 is implemented;

FIG. 33 is a view showing file specifications of a query statement file for storing the search query statements subjected to arithmetic operation;

FIG. 34 is a view showing file specifications of an input/output parameter file for storing elements of the query statements upon data transaction with a program of a higher rank;

FIG. 35 shows an example of a transition diagram as a result of the analysis;

FIG. 41 is a view showing an example of a specification table as a result of the analysis;

FIG. 45 shows a data correlation diagram for a factor analysis;

FIG. 48 is a view showing a system for estimating state of fault occurrence in the future on the basis of the current data concerning the fault occurrence and the shipping of products.

DESCRIPTION OF THE PREFERRED EMBODIMENTS

The present invention will be described in conjunction with an exemplary embodiment thereof by reference to FIGS. 1 to 48.

Figure 1:
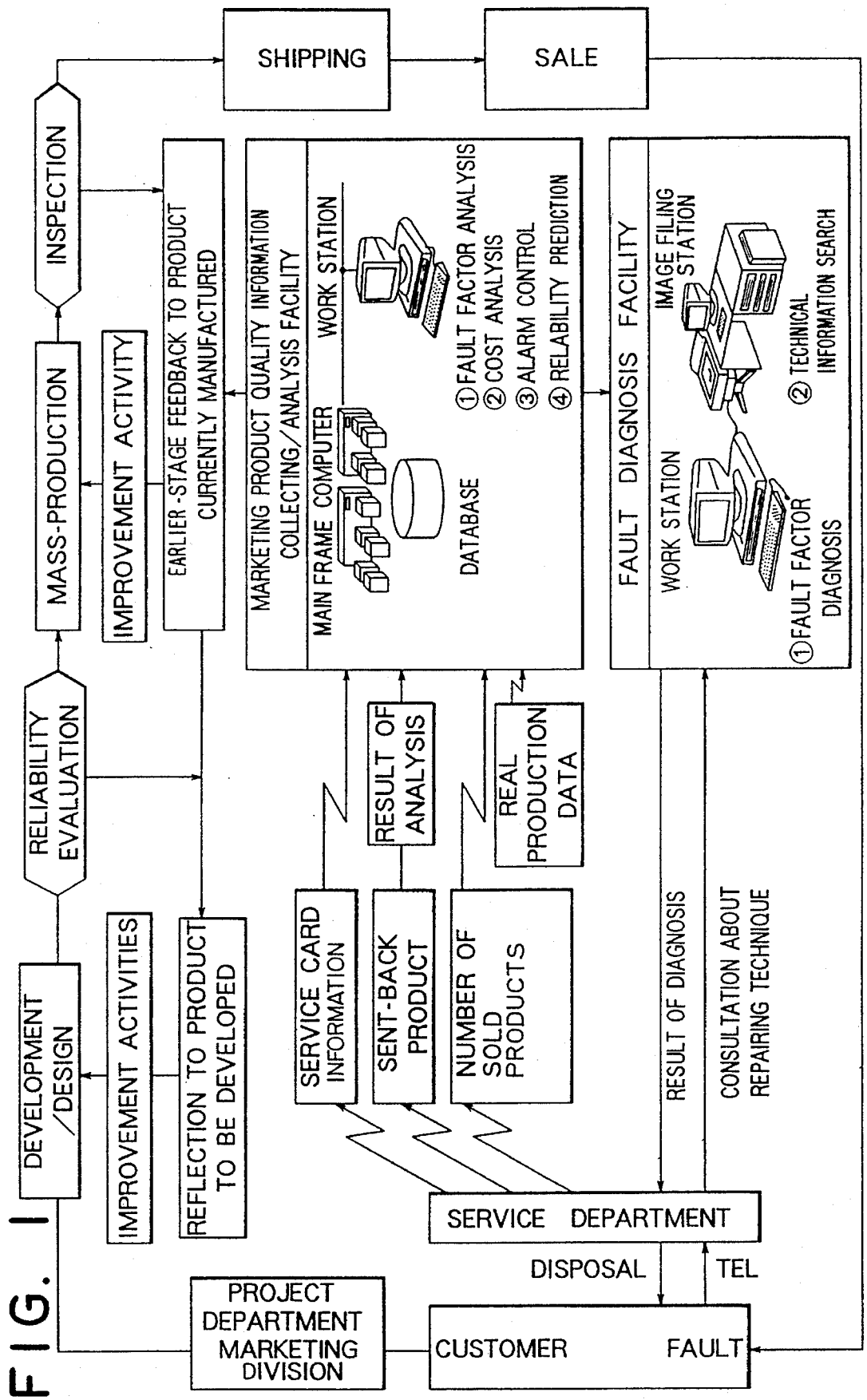
FIG. 1 shows a general arrangement of a system for carrying out the present invention.

FIG. 1 shows a general arrangement of a system to which the present invention is applied. A product planned by a marketing department is developed and designed to subsequently undergo a reliability evaluation, whereon a production schedule is established. The finished products as manufactured are then shipped for sales after inspection. When a fault occurs in the product put into operation by a customer, information is sent to a service department which is responsible for the repair. In that case, the cause of the fault is estimated with the aid of a fault diagnosis facility to thereby advise the measures to be taken for disposing of the fault. Real data such as the date of occurrence of the fault, phenomena or symptoms thereof, causes of the fault, measures as taken actually and the like are sent to a host computer center to be stored as records in a database. On the basis of the database, trend of the fault occurrence and the factors of the fault are analytically determined with the aid of a marketing product quality information collecting/analyzing facility. The results of the analysis are fed back to departments or divisions which are in charge of design, manufacture, inspection and others, to be thereby reflected onto development and design of new products as well as manufacturing and inspection of the products being currently on the production lines.

Figure 2:
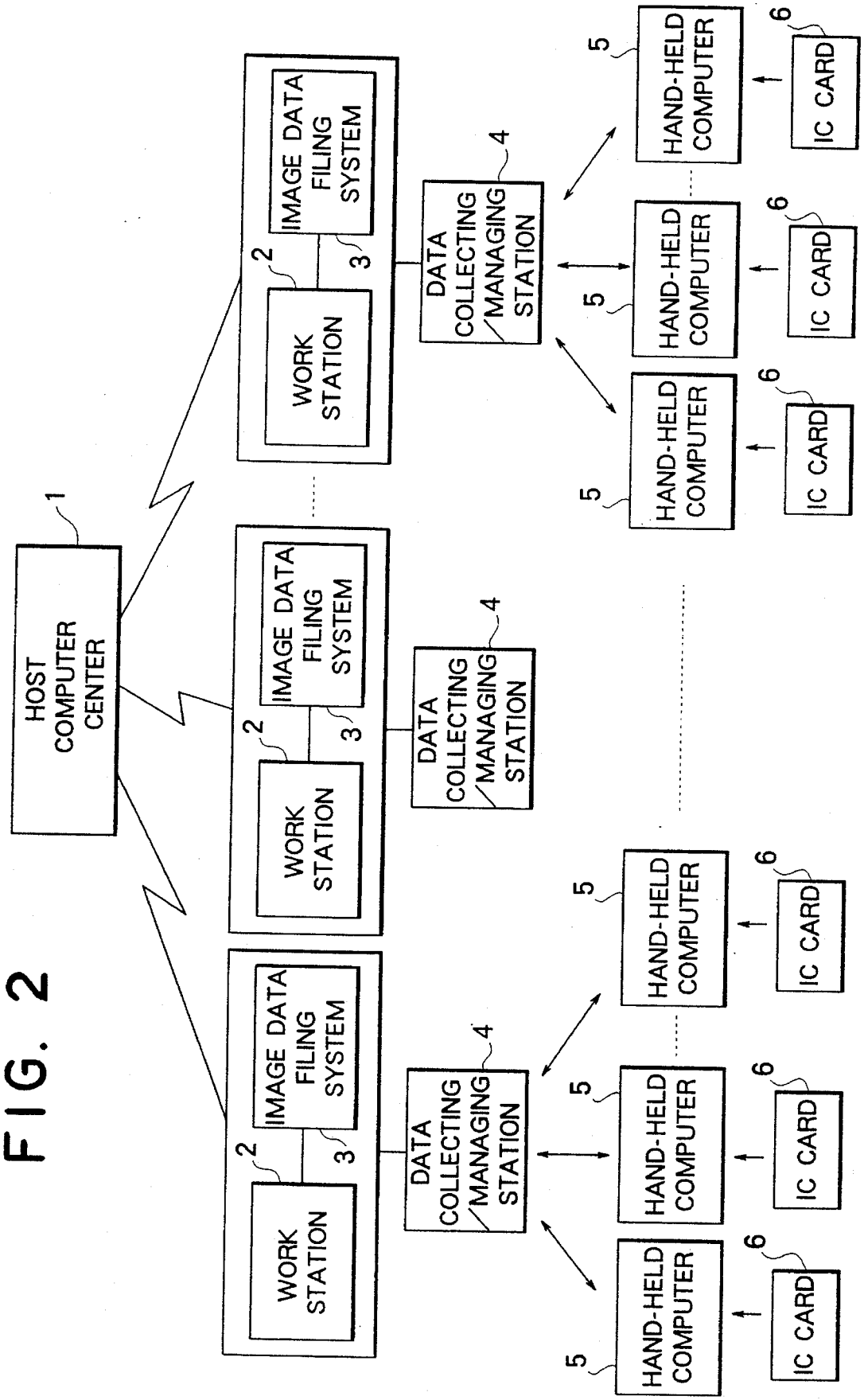
FIG. 2 illustrates an arrangement of a facility for estimating the cause of a fault and indicating the measures for dealing with the fault.

FIG. 2 illustrates an arrangement of a facility for estimating the cause of a fault as occurred and indicating the measures for dealing with the fault. When a fault takes place in an apparatus or machine being used by a customer, phenomena or symptoms of the fault are inputted to a hand-held computer 5 in the locale for conducting the diagnosis. In dependence on the result of the diagnosis, indications for adjustment, repair or the like measure is given. The data which provide the basis for the investigation of the cause for the fault in the diagnosis as well as methods of adjustment, repair and the like procedure are stored in IC cards on a product-by-product basis so that the IC card can selectively be exchanged in dependence on the product of concern. The real data resulting from the fault diagnosis and the repair service are up-loaded from the hand-held computer 5 to a data collection/management station 4 on a once-per-week basis from the local bases each located at the level of a branch office which is in charge of arranging in order the claims of customers in a local area over which the branch office is in charge of control. The local base which is equipped with the data collection/management station 4 is in the position to conduct the diagnosis of the fault and designate the adjustment and repair methods with the aid of a work station 2 and an image file system for replying to the inquiries from those servicemen who are not in possession of the hand-held computer 5. The individual local bases mentioned above are connected to a host-computer center which is in charge of nationwide control and management and to which all the real data of the fault diagnoses and the repairs are uploaded to be rearranged, wherein the rearranged data can be down-loaded to the local bases.

Figure 3:
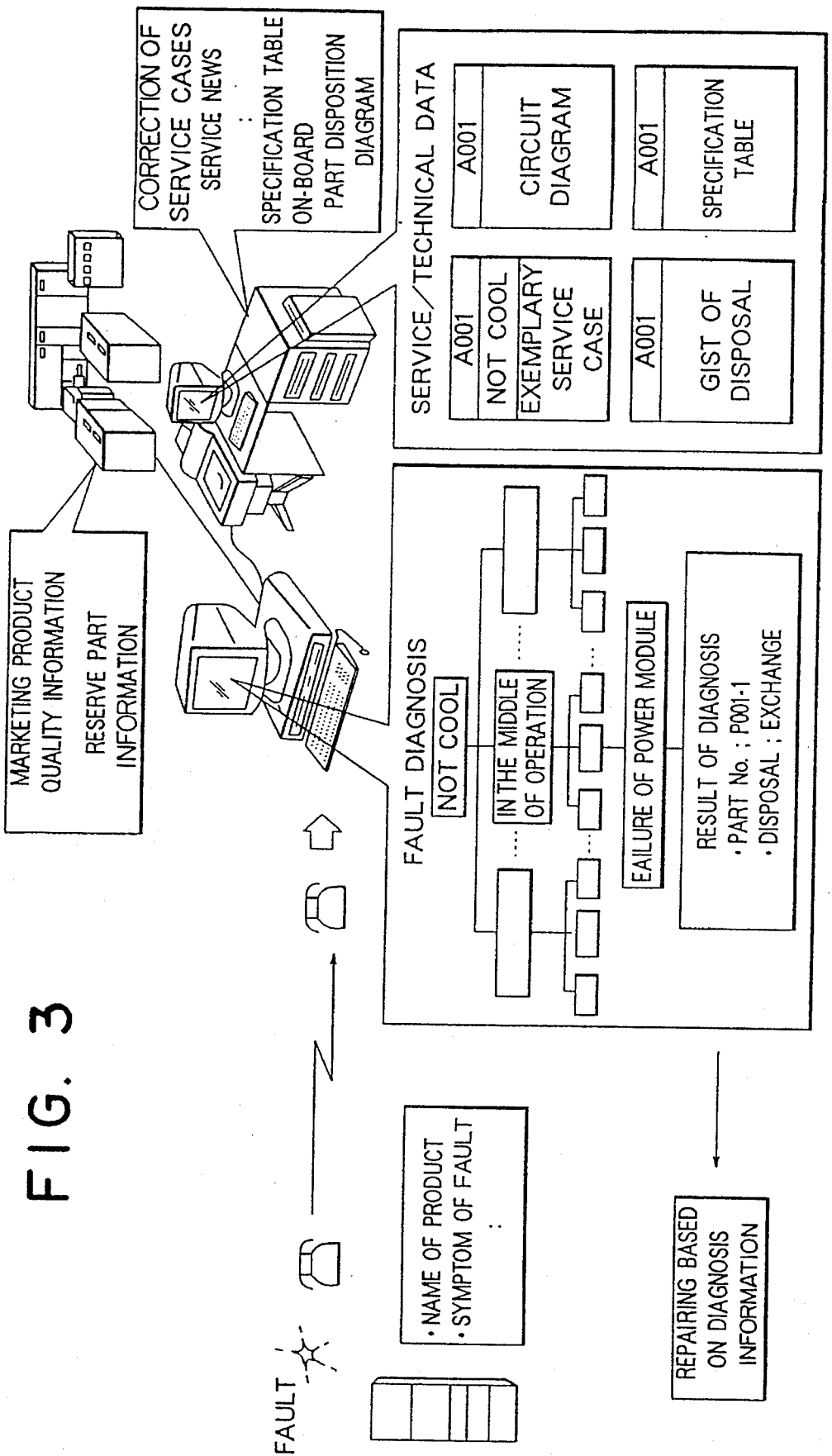
FIG. 3 is a system arrangement diagram showing information indicated/presented by the system during a time span from occurrence of a fault in a customer's apparatus until completion of repair and information stored internally.

Referring to FIG. 3, the local base equipped with the work station 2 and the image filing system 4 as shown in FIG. 2 will be described in detail. In this figure, there are illustrated information and advice supplied by the system in the course of executing a procedure upon occurrence of a fault in an apparatus of a customer up to the removal of the fault together with the information stored internally to this end. Upon occurrence of a fault, a telephone message of the fault occurrence is sent from the customer to a maintenance service department. In the course of transactions through the telephone, the maintenance service department gets information concerning the name and model or type of the product of concern, symptoms of the fault, the time and the conditions at and under which the fault has taken place and others. In the maintenance service department, the information obtained from the customer is inputted to the work station to thereby cause a diagnosis procedure to be started.

The fault diagnosis is effectuated by searching a tree representing the causal relations of the faults. The tree representing the causal relations of faults will be referred to as the fault tree (or FT in abbreviation). Further, analysis procedure performed by using the fault tree will be referred to as FTA (Fault Tree Analysis). The fault tree is initially configured on the basis of the information contained in the design specifications such as those of the structure and the characteristics of an apparatus or machine of concern or on the basis of the fault information obtained from the customers concerning similar apparatus or machines, whereon the fault tree configuration is updated every time the diagnosis is performed with the effect thereof being confirmed. Concerning the fault tree search strategy, description will be made later on. In the course of the diagnosis, there can arbitrarily be displayed image information of relevant documents such as precedent cases of fault recovery, circuit diagnosis, specifications tables and others. Such documents can previously be registered and stored in an image filing system so that the relevant parts of the documents can be displayed, printed or facsimiled by making access to the image filing system from the work station in the course of the diagnosis or after the diagnosis on the basis of the result thereof. The results of the diagnosis are displayed together with a document showing in concrete a portion or part in which the fault originated as well as a method of disposing of the fault and the procedures for examination or inspection and repairing. On the basis of the results of the diagnosis, the repair as well as the effect brought about thereby can be confirmed.

Figure 4:
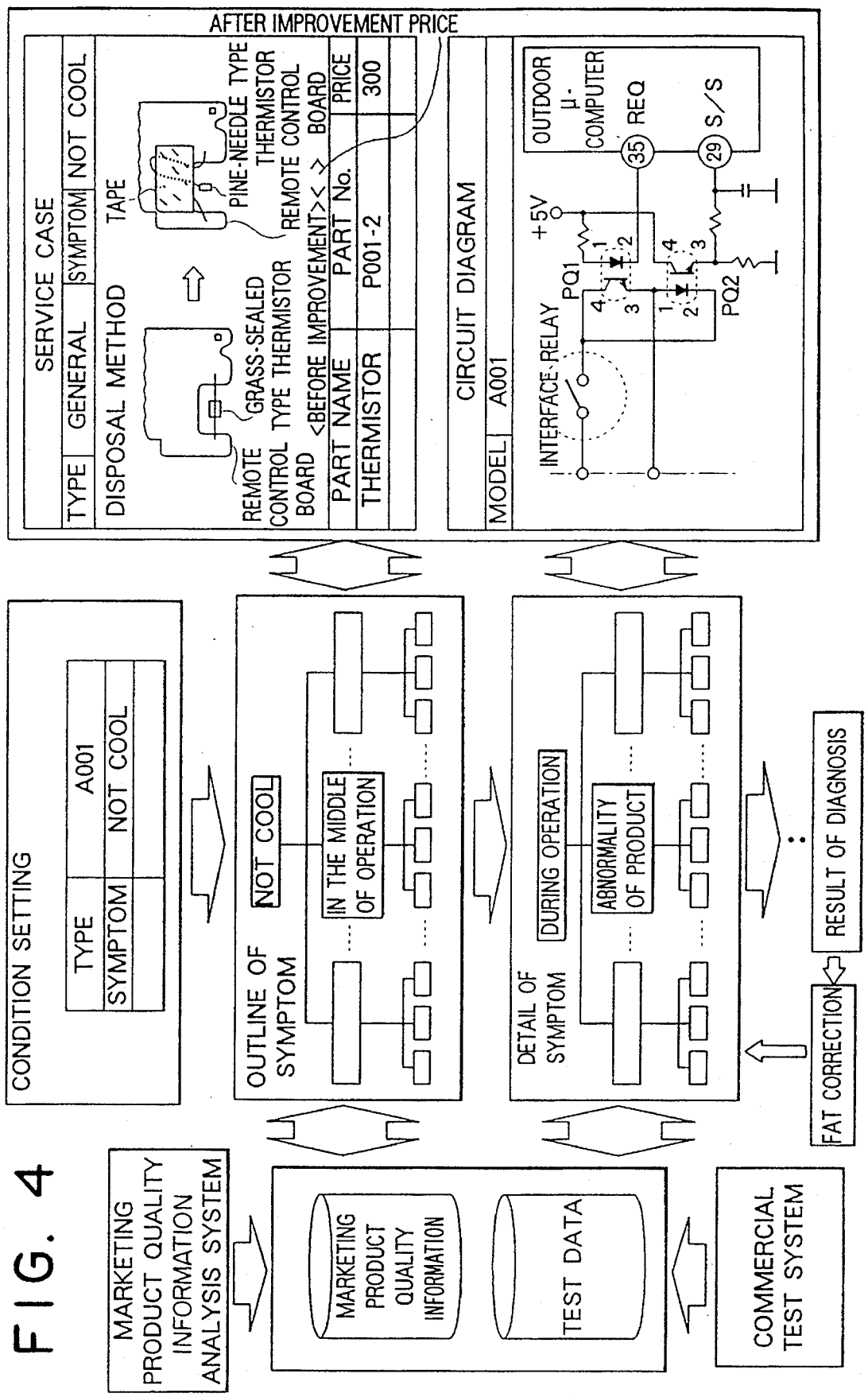
FIG. 4 shows a method of setting up conditions for the fault diagnosis and location of data required in the diagnosis process.
Figure 5:
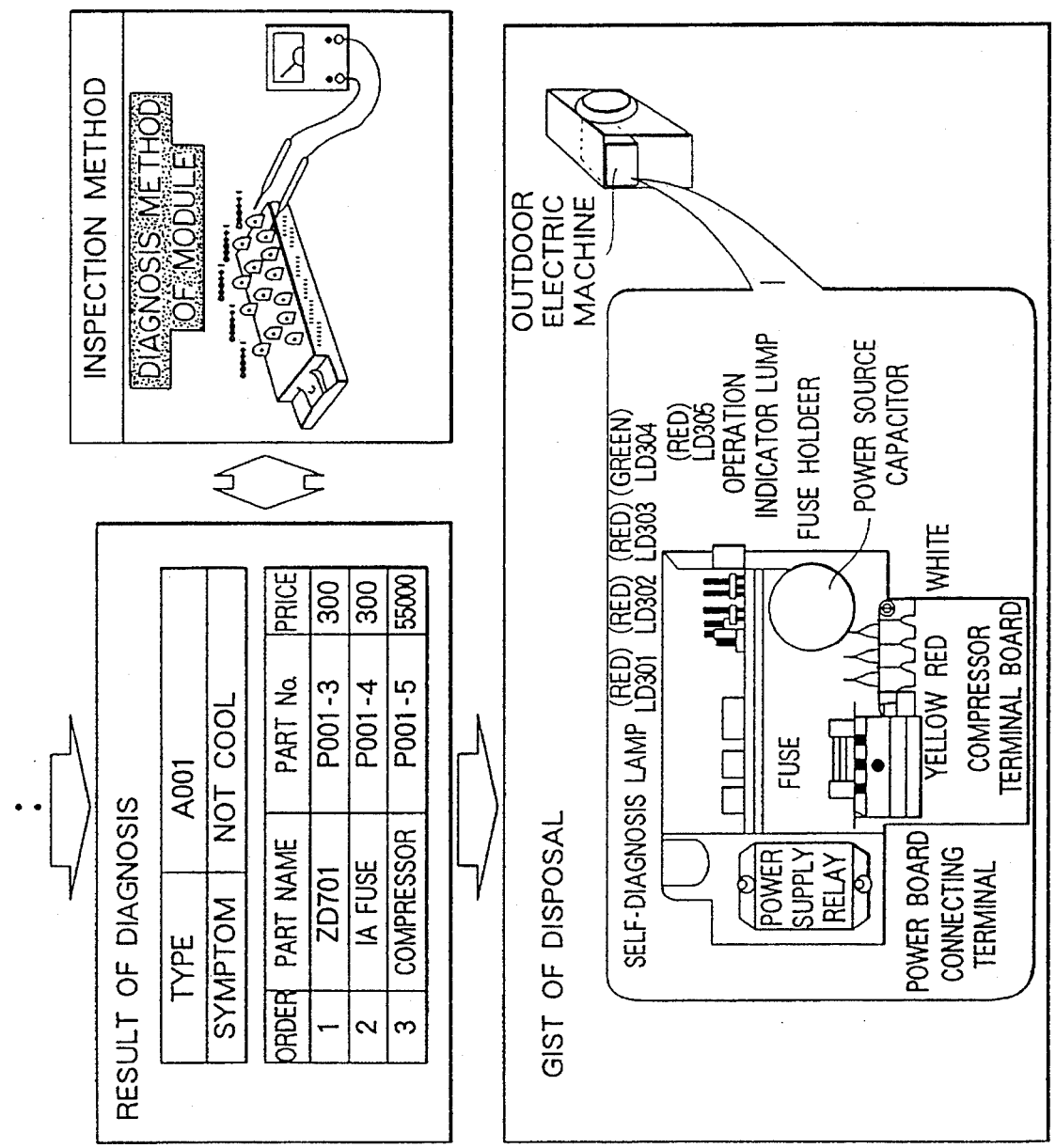
FIG. 5 shows a result of diagnosis attained through the procedure shown in FIG. 4.

The fault diagnosis procedure or diagnosis process outlined above by reference to FIG. 3 is shown in more concrete in FIGS. 4 and 5 together with examples of information for making access to the result of the diagnosis as well as those of the information for display.

FIG. 4 shows a method of setting up conditions for the fault diagnosis together with location of the data required in the diagnosis process. A database which stores marketing product quality information and test data referenced in the course of the diagnosis process is shown at the left-hand side in the figure. The marketing product quality information represents the information concerning the faults and the repairs of products on the market, which information is collected by a marketing product quality information analysis system and stored in the database in terms of records each for one fault case. The test data represent those which result from the test of performance of a new product before delivery to the market and which are collected by a utility test system. An example of a document registered in the image filing system is shown at the right-hand side. A process flow of the diagnosis is shown at an intermediate portion in a top-down fashion. In the first place, the type or model of a product suffering from a fault as well as a phenomenon or symptom indicating the fault most straightforwardly are inputted as the initial conditions for the diagnosis. A fault tree which coincides with the initial condition is generated on a memory and displayed on a display screen. In the case of the example now under consideration, a fault tree having an apex node labeled an event or symptom "not cool" is displayed. When the occurrence of the fault corresponds to a node labeled "in the middle of operation" in the fault tree, this node is designated. Then, a fault tree having the apex node labeled "in the middle of operation" is displayed. Repetition of this procedure leads to a result of the diagnosis. On the basis of this result, probabilities which are attributes of the individual nodes of the fault tree are updated.

Through dialogical interaction between the computer and the operator, the former gets information concerning the contents of the fault of a product of concern. As the contents of the fault are converted to items in more and more detail, the search progresses to the elements corresponding to lower and lower hierarchical levels (leaves) of the fault tree. When inputting of the information by the operator is interrupted in the course of repetition of the dialogic interaction, the computer then checks by itself weighting coefficients (occurrence probabilities) imparted to the nodes to thereby select the node having a maximum weighting coefficient at the hierarchical level reached currently, whereupon the search proceeds to a next lower hierarchical level. Through repetition of the operation described above, there can ultimately be reached a cause level in the hierarchy of the fault tree.

FIG. 5 shows a result of the diagnosis obtained through the procedure illustrated in FIG. 4. In the diagnosis result shown at an upper left portion, those parts which are registered at the distal end of the fault tree as reached are displayed in the descending order of the fault occurrence probabilities together with the type and the symptom set up initially as the initial condition for the diagnosis.

FIG. 6 shows a hierarchical structure of a tree representing causal relations of the fault to be searched in the fault diagnosis. The fault tree shown in FIG. 6 illustrates a whole structure of a fault tree for an air conditioner. At first, in dependence on whether the structure of the air conditioner is of a separate type or an integral type, the tree branches correspondingly, which is then followed by successive branchings in dependence on whether an inverter control method or a constant Fate control method is adopted, whether the function of the air conditioner is for both air cooling and heating or only for the air-cooling and whether a power source is a single-phase 200 V or three-phase 200 V, respectively. Further, the tree branches to a hierarchical level representing the symptom of the fault and then to a level representing the cause of the fault.

Figure 7B:
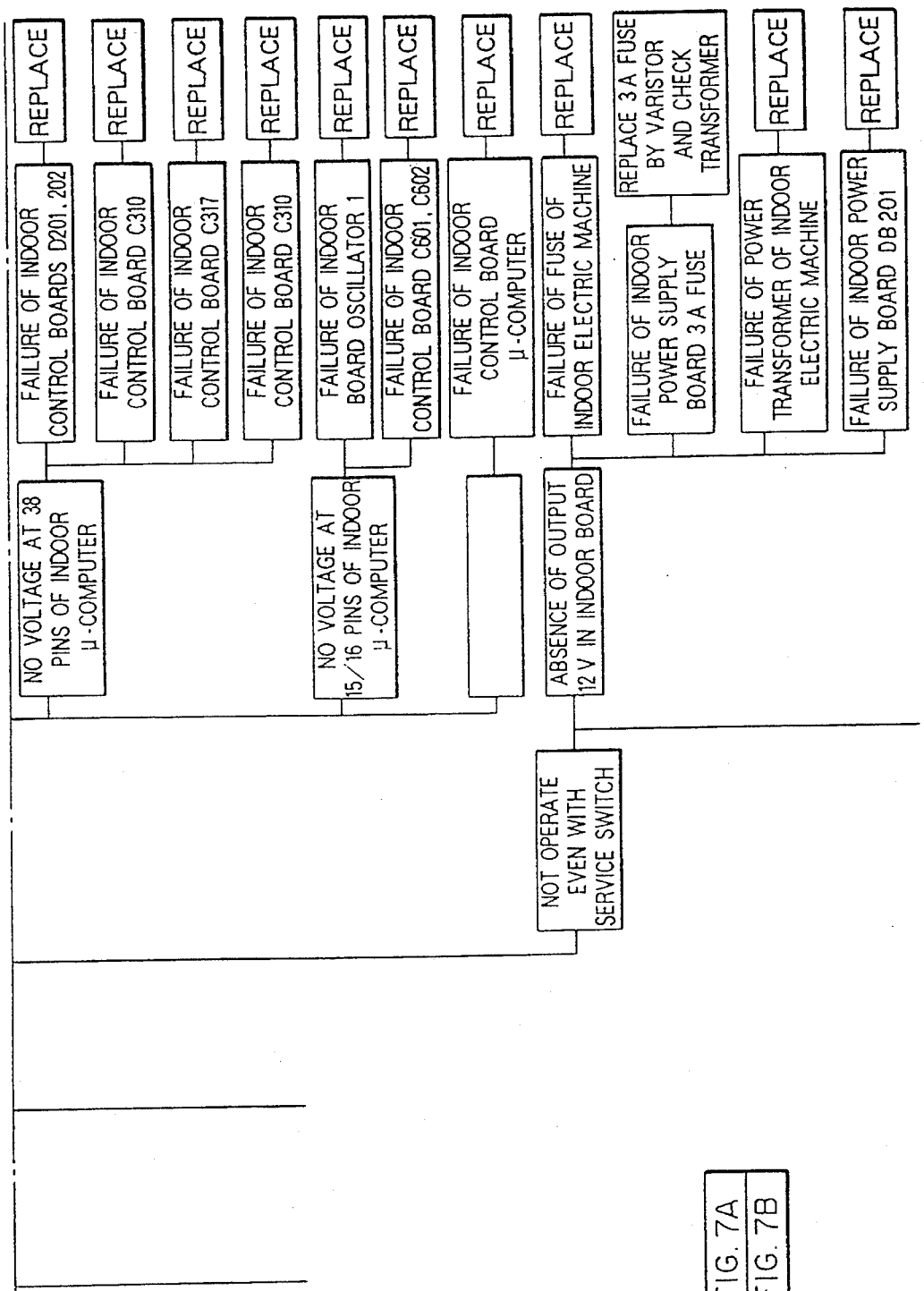
FIG. 7 shows, by way of example, those portions of an overall structure of the fault tree for the air conditioners shown in FIG. 6 which are relevant to symptom "not cool" of a machine type A001.

FIG. 7 shows, by way of example, those portions of the whole structure of the fault tree for the air conditioner shown in FIG. 6 which are relevant to the symptom "not cool" of the air-conditioner of model A001. More specifically, a fault tree having the top node allocated to the symptom which represents straightforwardly the fault of "not cool" is shown, in which as the tree is traced toward lower level (rightwardly), the symptom becomes more and more detailed, entering the interior of the machine deeper and deeper. An element representing an event which is the cause of the fault belongs to the second level from the bottom level to which those elements representing events for disposing of the fault in dependence on the causes belong.

FIG. 8 shows a data structure for implementing the fault tree in a work station. This data structure includes the ID numbers of the individual nodes constituting the fault tree, the ID numbers of parent nodes, the ID numbers of children nodes, symptom names or test procedure, parts to be disposed of, case management number for the document search and others. A FTA form table contains and manages those data which indicate the relations between the individual fault trees and the product types. In a FTA data manage table, the fault trees are managed on the basis of unit symptom representing the fault most straightforwardly. On the other hand, the individual elements belonging to the fault trees managed with this table is managed by an element-based data table which registers therein the ID numbers of the individual elements, symptom names and the occurrence probabilities corresponding to the individual elements. Parent-children relations between the elements are managed by a structure definition table in which the ID number of the element representing the parent of the individual elements as well as the identifier numbers of the elements representing the children nodes are registered.

FIGS. 9 to 15 show images displayed in succession in the course of diagnosis procedure executed by the system.

FIG. 9 shows an image for allowing the type of a product suffering from a fault and symptoms thereof as acquired from the customer directly or through the medium of a serviceman who contacted the customer to be inputted as the conditions for the diagnosis. For inputting the model or type of the product and the symptoms, associated, blank columns are designated by using a mouse, in response to which associated lists make appearance, respectively. On the basis of the lists, the type and the symptoms to be inputted are selected. There can be set up two symptoms at maximum as the condition for the diagnosis. After having set up the conditions for the diagnosis in this image, the fault diagnosis procedure is started.

Figure 10:
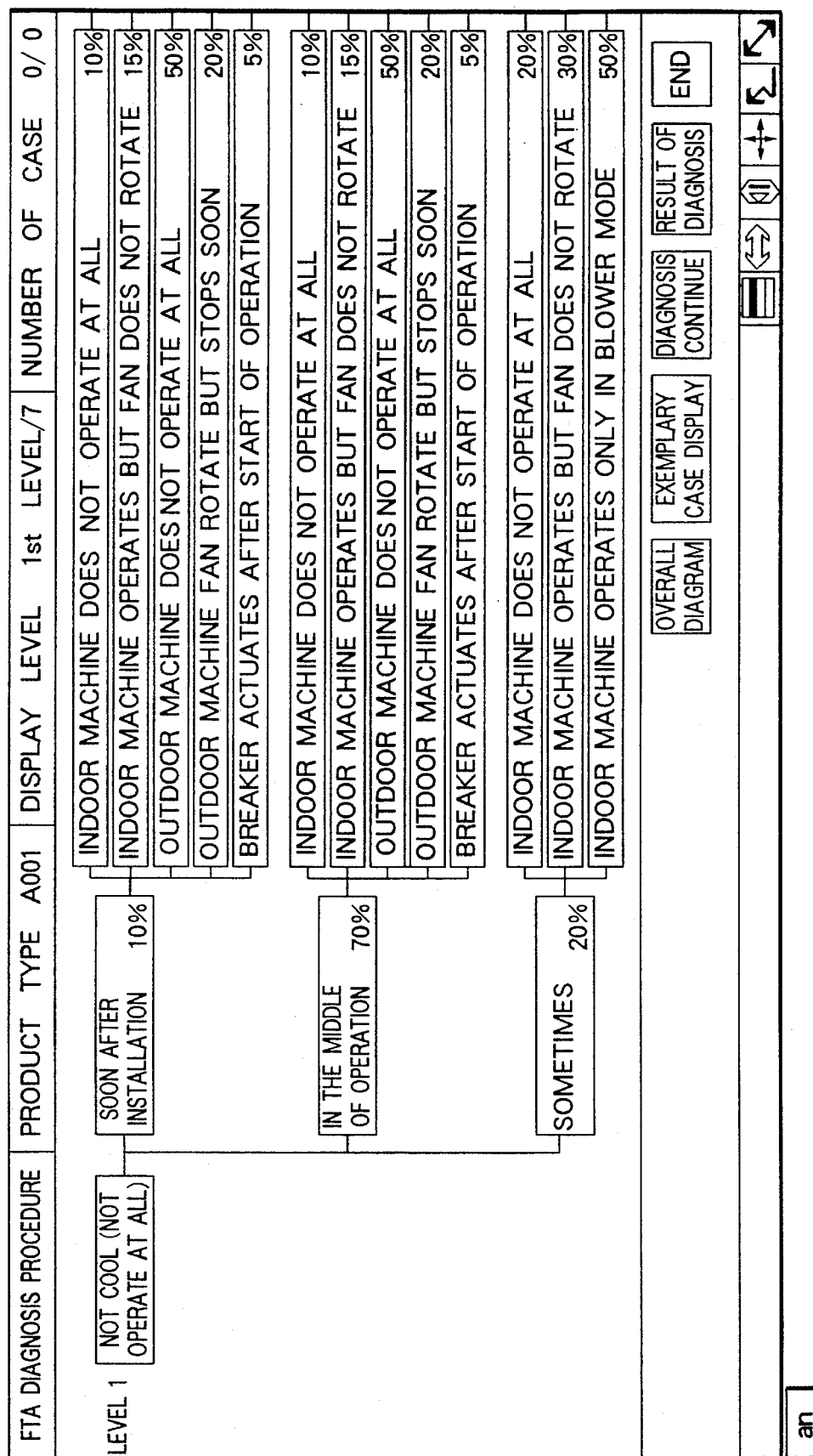
FIG. 10 shows a part of the fault tree during diagnosis.
Figure 11:
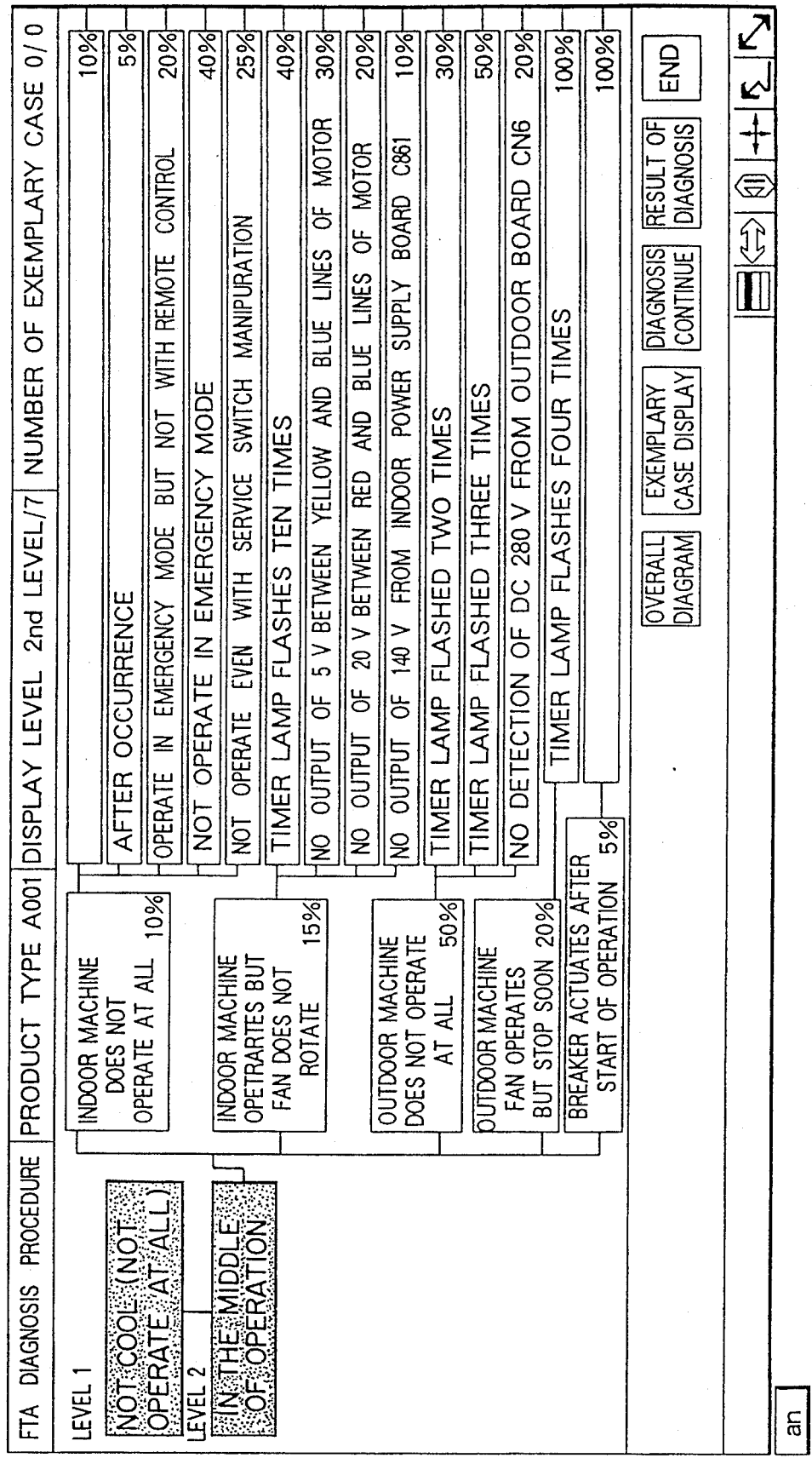
FIG. 11 is a view showing an image generated when the fault tree is dialogically searched one level at a time.
Figure 12:
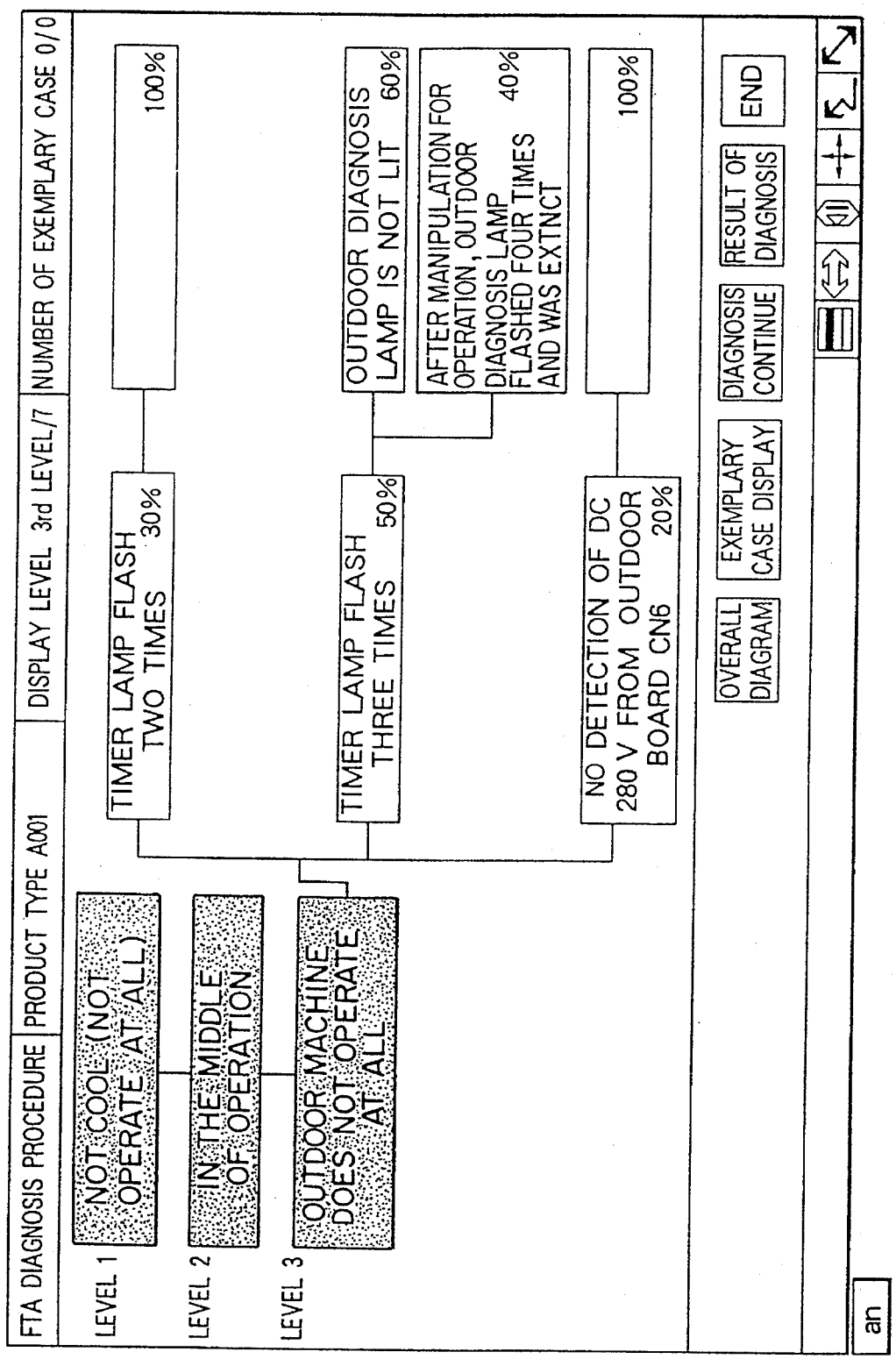
FIG. 12 is a view showing an image generated when the fault tree is dialogically searched one level at a time.
Figure 13:
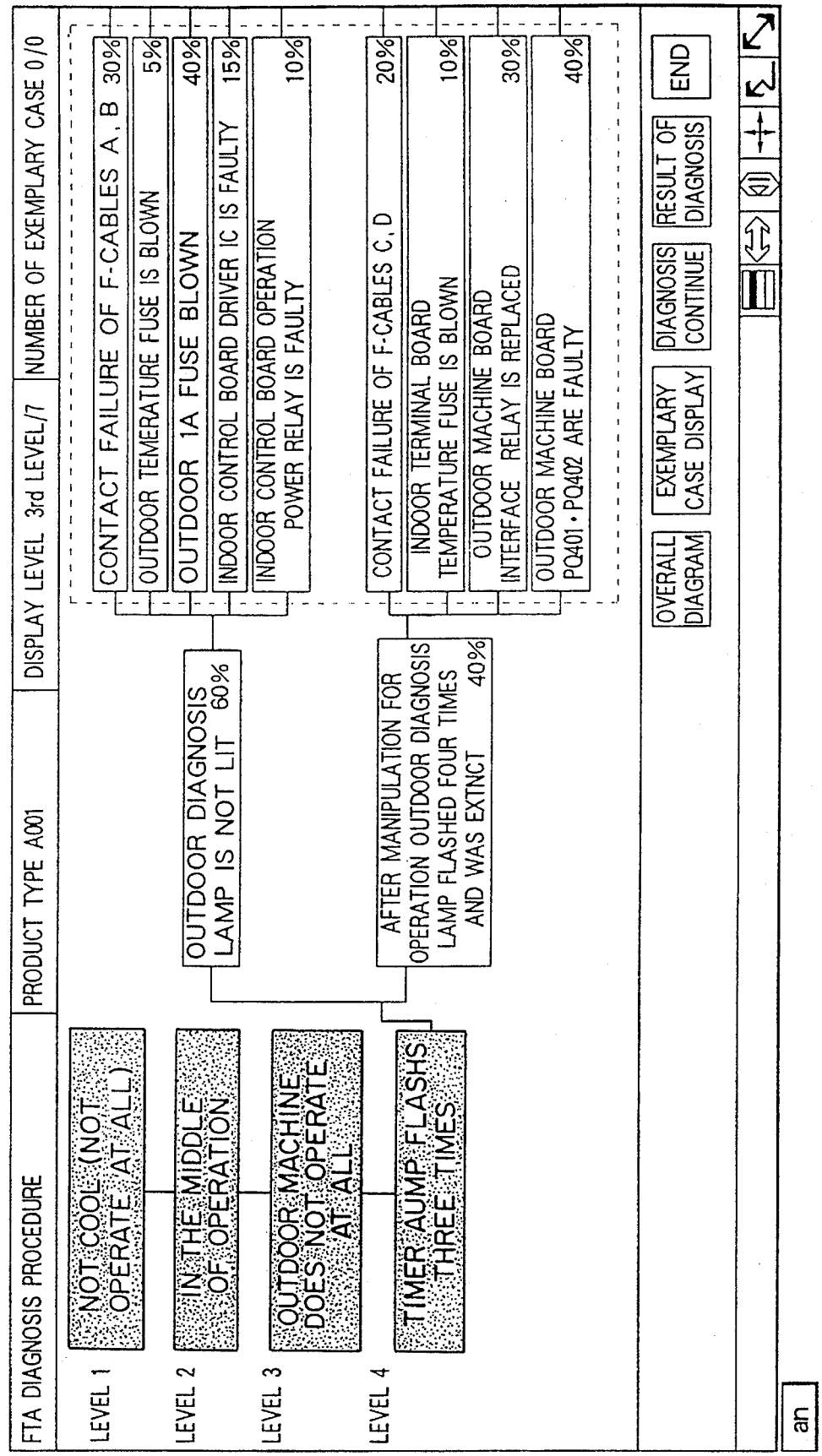
FIG. 13 is a view showing an image generated when the fault tree is dialogically searched one level at a time.
Figure 14:
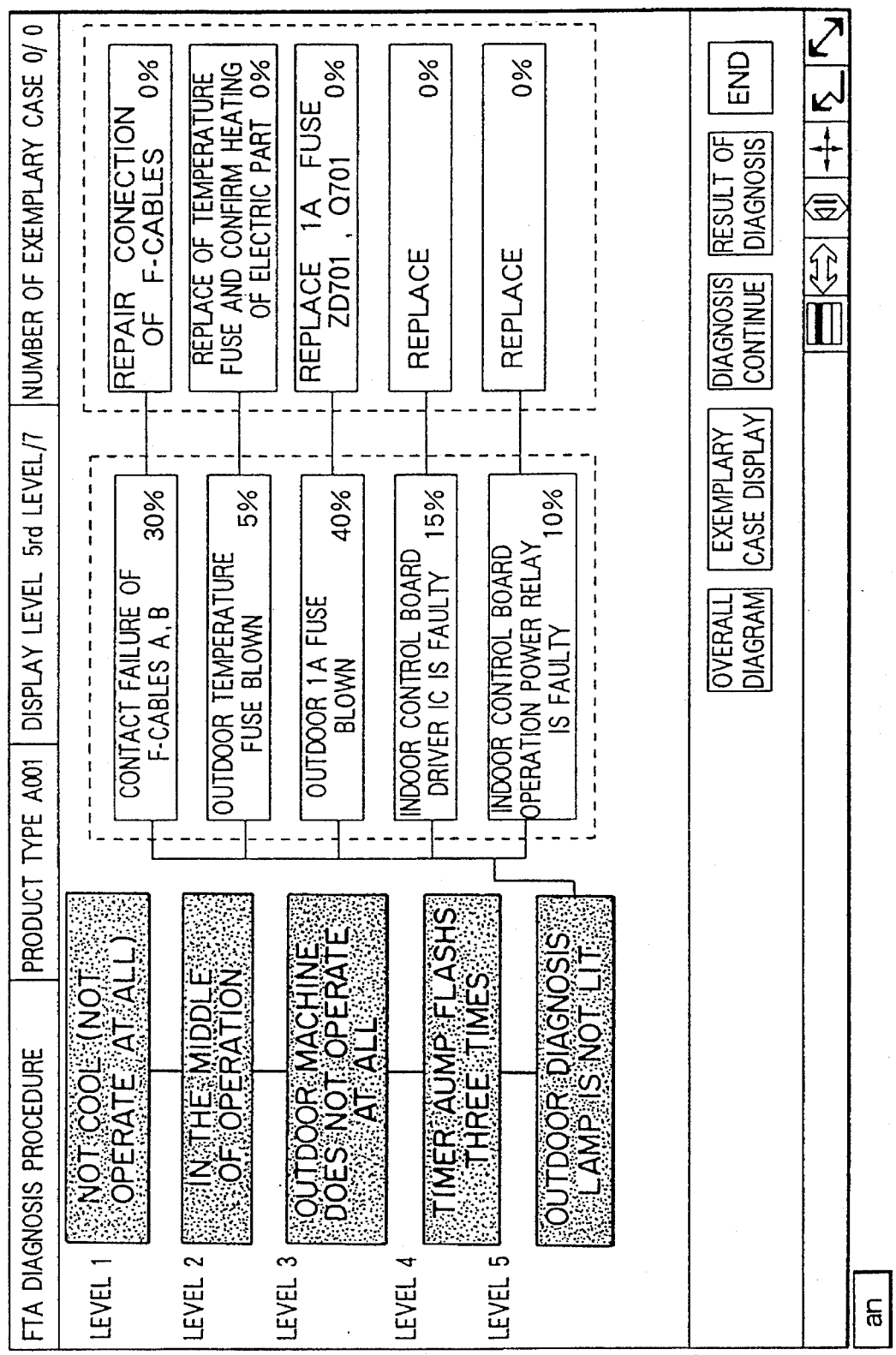
FIG. 14 is a view showing an image generated when the fault tree is dialogically searched one level at a time.

FIG. 10 shows a part of the fault tree in the course of the diagnosis. In the case of this example, the symptom "not cool" at the current hierarchical level is shown together with three operation modes "immediately after installation", "in the middle of operation" and "sometimes" at the children nodes imparted with respective occurrence probabilities. The diagnosis proceeds to a next step by selecting one from these children nodes in a dialogical fashion.

FIGS. 11 to 14 show images generated successively in following the stepwise dialogical search of the fault tree.

FIG. 15 shows the results of the diagnosis.

Figure 16:
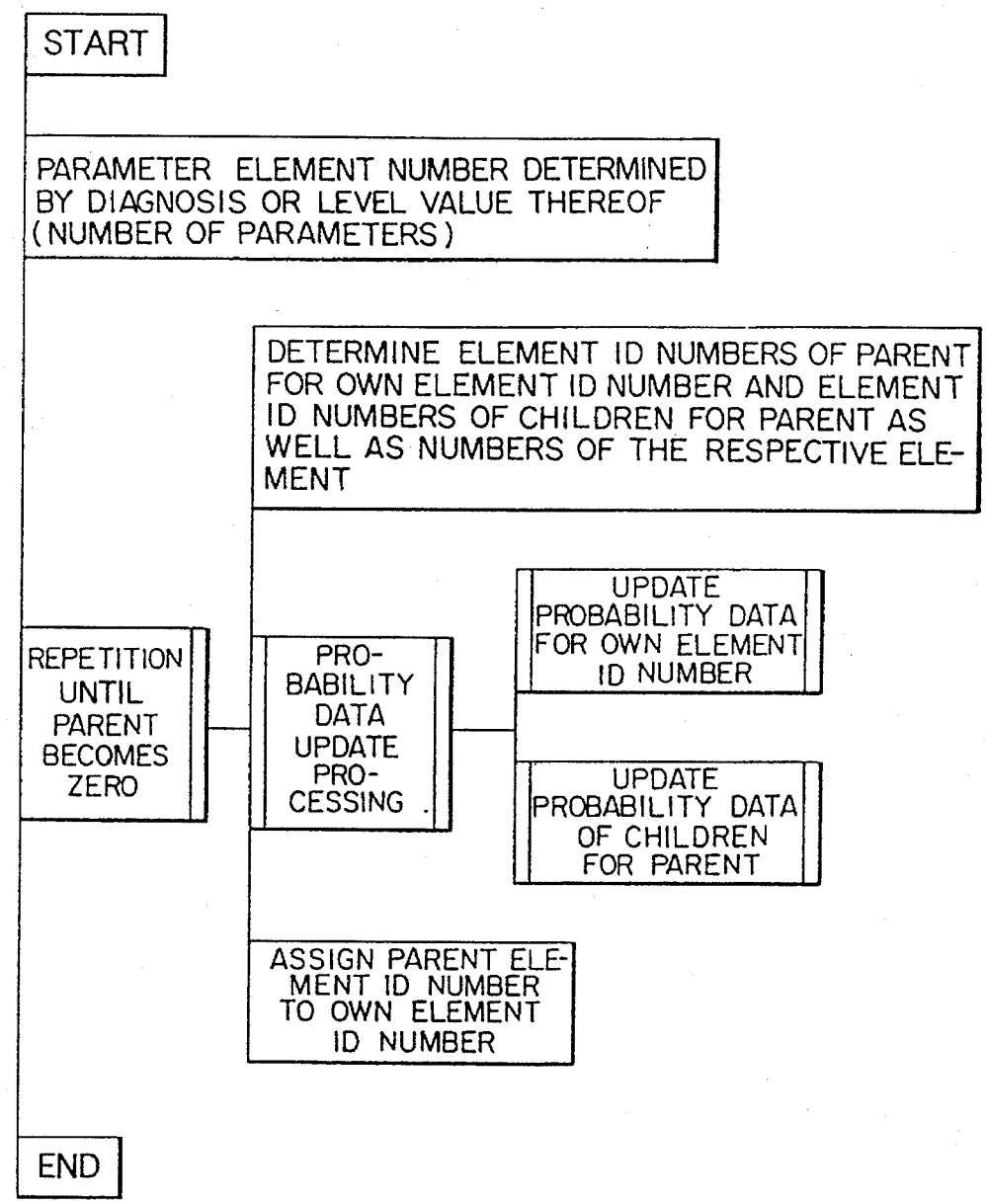
FIG. 16 is a view for illustrating a processing procedure for updating probabilities affixed to individual nodes of the fault tree in accordance with the results of diagnosis described by reference to FIG. 4.
Figure 16B:
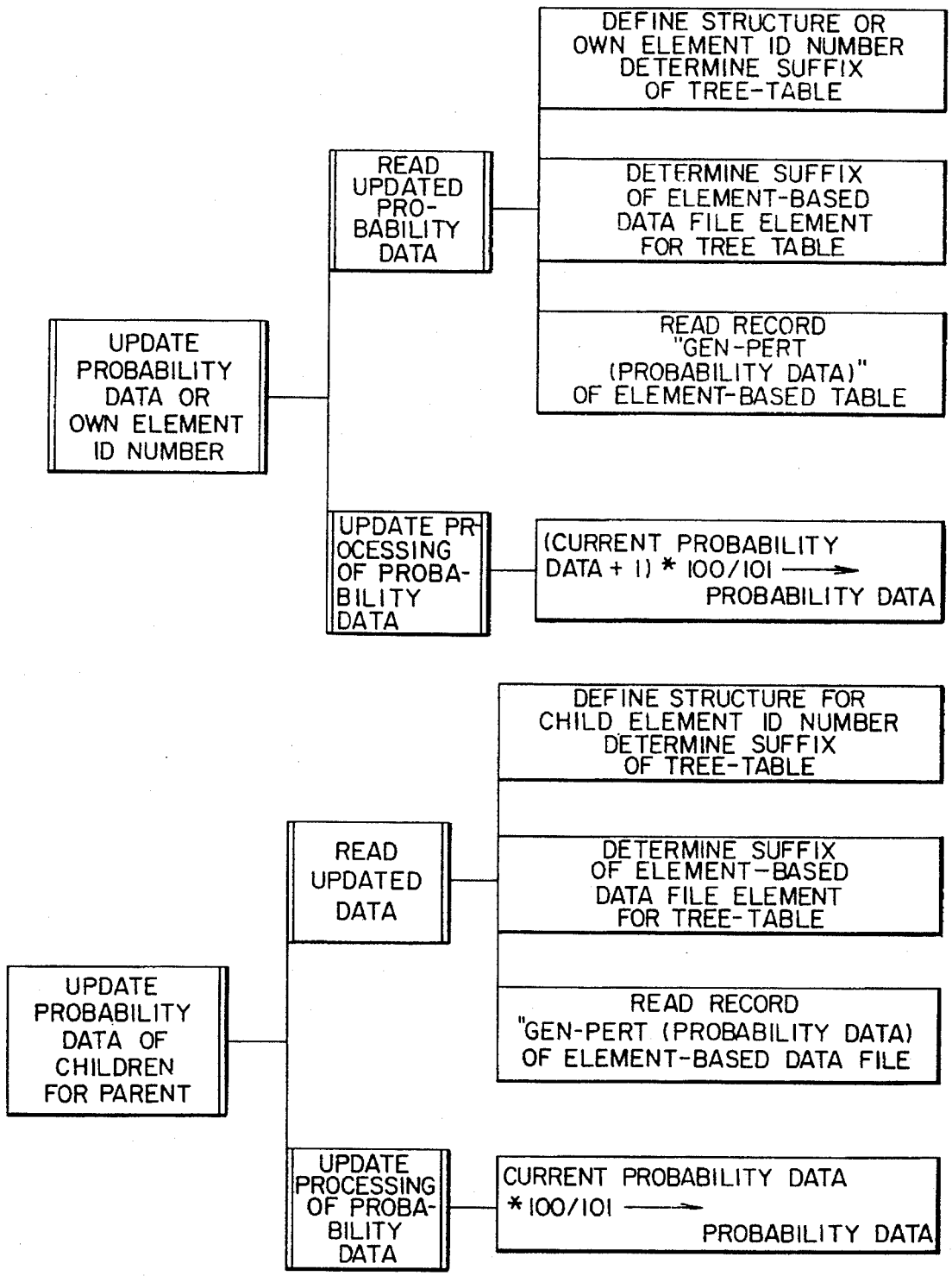

FIG. 16 shows a processing procedure for updating the probabilities affixed to the individual nodes of the fault tree in accordance with the results of the diagnosis described previously by reference to FIG. 4.

Figure 17:
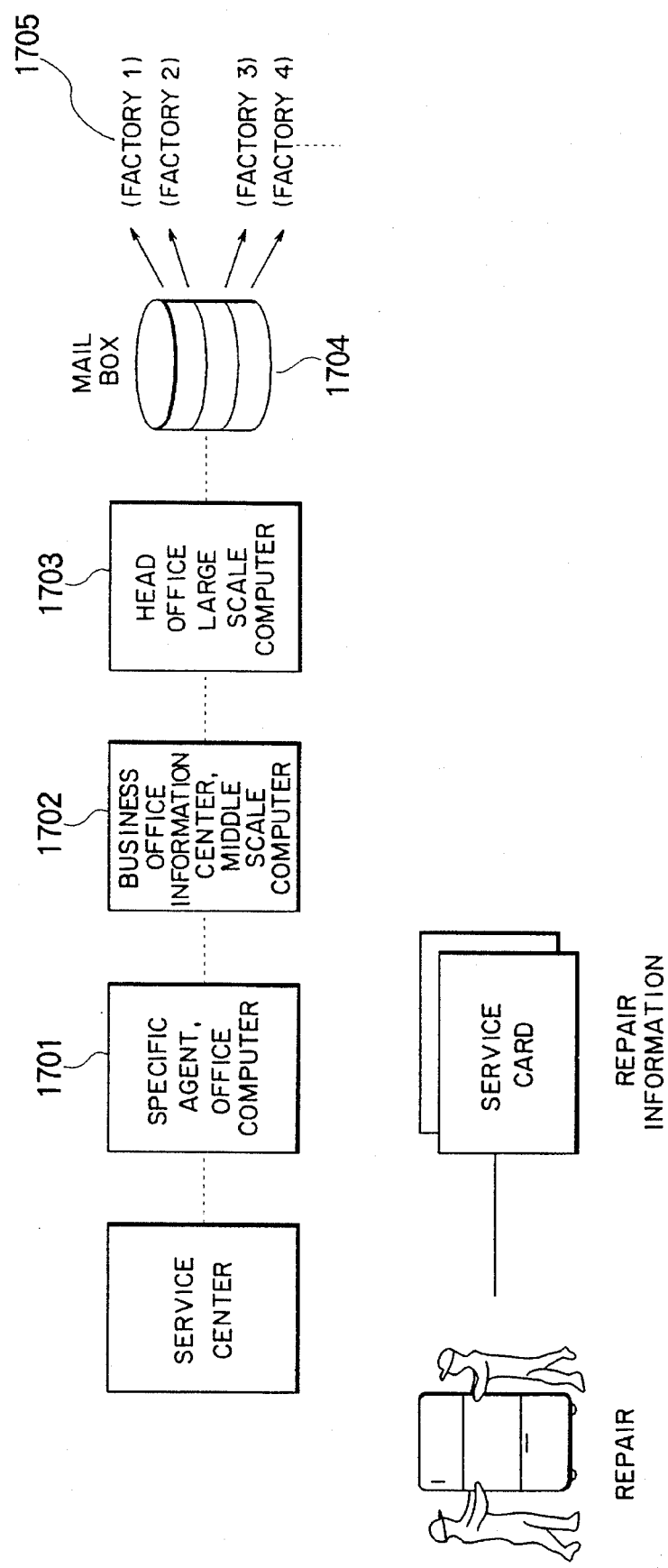
FIG. 17 is a view showing a route through which real data of the fault diagnosis and the repair are up-loaded from a locale shown in FIG. 2.

FIG. 17 shows a route through which the real data of the fault diagnosis and the repair are up-loaded from the locale, as described hereinbefore in conjunction with FIG. 2. The figure shows a network which extends to a factory from a local base at which the product quality data acquired from a customer are inputted. More specifically, upon occurrence of a fault in a product at an installation site of a user or customer, a maintenance engineer such as a serviceman who is responsible for dealing with the customers' claims repairs the product, whereon the information concerning the repair is transmitted on-line to the factory which are responsible for designing, manufacturing and inspection of the product through a business division such as a special agent or a business office on a repair-by-repair basis. More specifically, the product quality data acquired from a customer is inputted to a terminal 1701 installed at a special agent and sent to a computer 1702 installed at an associated business division, wherein data resulting from the edition performed by the computer 1702 is transferred to a similar large scale computer 1703 which edits the data supplied from all the business division, so that they can be utilized in the factory, the result of this edition being stored in a large scale storage unit 1704 connected to the large scale computer 1703. The large scale storage unit 1704 is imparted with a mail-box function so that large scale computers 1705 installed at factories or workshops such as "shop-1 computer", "shop-2 computer", "shop-3 computer", "shop 4 computer", and so forth can always make access to the large scale storage unit 1704 for reference.

The maintenance engineer for the customers such as the serviceman inputs to the hand-held computer the type or model of the product as repaired, fault symptoms, part(s) as used, contents of the measures as taken and others in a predetermined format, a typical structure of which is shown in FIG. 18. The contents of the format include several ten items, of which primary ones (1) to (27) are mentioned below.

(1) Classification of product ... type and name of product.

(2) Classification of charge/charge-free ... discrimination of the repair as to whether it is to be charged or charge-free.

(3) Reason for charge-free ... reason why repair is free of charge.

(4) Manufacturing number ... ID number attached to each product for identification at the time of manufacture.

(5) Part No. .... ID number of the part used in the repair.

(6) Card No. .... unique number for the card identification.

(7) Joint No. .... ID number allocated serially to a part repaired simultaneously.

(8) Reception No. .... card number managed by a special agent or a distributor.

(9) Division/agent/distributor classification ... distinction of card issuers (business division or special agent or distributor).

(10) Symptom ... symptoms of fault.

(11) Situation ... times or conditions at or under which the fault takes place repetitionally.

(12) Period of operation in month ... number of months elapsed from the start of operation of the product at a customer to the occurrence of fault.

(13) Special agent . . . special agent who disposed of the fault.

(14) Business division . . . business division to which the special agent (13) belongs.

(15) Classification of client . . . classification of repair request source (customer or distributor or special agent).

(16) Classification of repairer . . . identification of repairer (internal or external).

(17) Date of failure . . . date of repair.

(18) Classification of guarantee . . . distinction as to whether or not a product of concern is within the term of guarantee.

(19) Date of purchase of . . . date when a product of concern was purchased by the customer.

(20) Classification of visitor/hospital repair . . . distinction as to whether repair was performed by dispatching an engineer to the locale or conducted after hospitalized in a factory.

(21) Classification of repair contents . . . treatment performed for the removal of the fault.

(22) Adjustment/rearrangement . . . factum of adjustment or rearrangement and symbol indicating a part adjusted or rearranged.

(23) Classification of repair contents . . . discriminative identification of repair contents such as exchange of parts, inspection or the like.

(24) Repair charge . . . cost involved in a fault removal (classified into the service fee and the cost of a part or parts).

(25) Statistical date . . . date when the repair charge is registered.

(26) Part name . . . name of a part retrofit.

(27) Maker . . . name of manufacturer who manufactured the part subjected to the retrofit.

In the factory, the information received from the mail-box and including the items mentioned above are added with undermentioned items (28) to (40) which are managed on the side of the manufacturer.

(28) Type of product . . . model and type of a product.

(29) Manufactural year . . . the manufactural year in which a product was manufactured (the manufactural year as set may differ from one to another product).

(30) Year and month of manufacture . . . year and month in which a product was manufactured.

(31) Product year . . . the year in which a product of the same model was first delivered to the market.

(32) Lot number . . . identification number for managing products on the basis of production lots.

(33) Circuit No. . . . numbers identifying parts on a substrate.

(34) Trouble ID number . . . codes for identifying troubles of high importance for management.

(35) Classification of measures . . . measures for coping with symptoms allocated with the trouble ID number mentioned above (33).

(36) Disposal of failure . . . failure ascribable to the responsibility of the factory (charge-free even after lapse of the guarantee).

(37) Disposal . . . identification codes of the measures taken for recovery from the failures.

(38) Trouble lot number . . . lot number of the measure for coping with a large number of troubles of same symptom.

(39) Classification of operating periods . . . classification of periods elapsed from the manufacture to the occurrence of failure.

(40) Repair history . . . history of repairs in the past.

The information concerning the repair and the product mentioned above is subjected to the analysis together with real sale data of a product. With the real sale data, it is intended to mean a quantity of products delivered from business divisions to special agents or a quantity of products delivered from the special agents to the distributors or a quantity of products shifted to customers from the distributors as determined for each type, month and business division, respectively.

Figure 19:
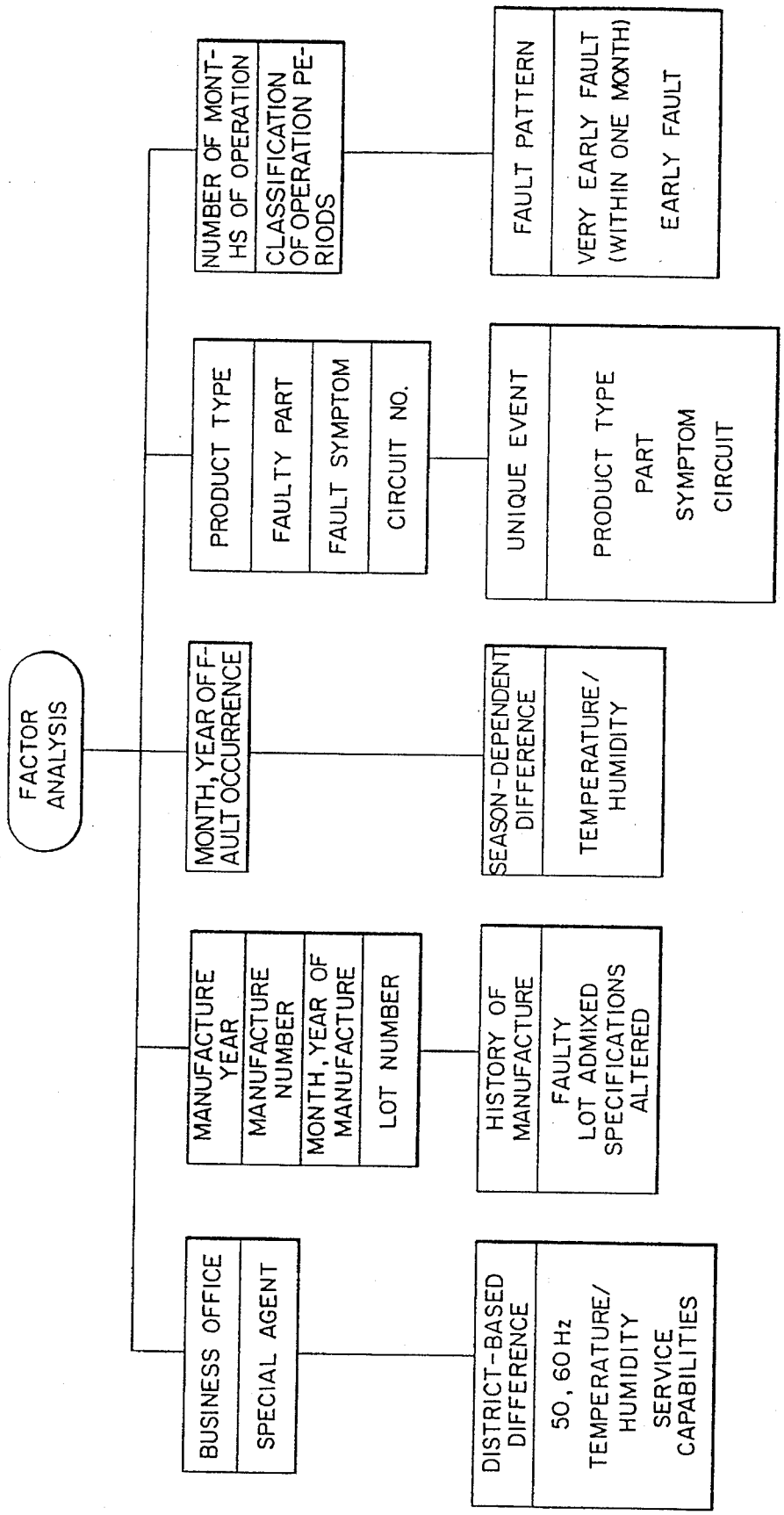
FIG. 19 is a view showing faults of a product occurring in reality in the field and deficiency in the quality as well as relations between these factors.

FIG. 19 shows faults of a product occurring in reality in the locale or field and deficiency in quality as well as relations between these factors. More specifically, this figure illustrates exemplarily the contents of the card mentioned above and the relations among the factors.

EXAMPLE 1

Case in which fault distribution in each special agent or business division which dealt with the fault removal depends on difference in service facilities and climate such as temperature and humidity which differs from one to another district.

EXAMPLE 2

Case in which fault occurrence distribution in each manufactural year, manufacturing number, manufacture year and month and production lot is attributable to the manufacturing history such as mixed use of faulty parts and change in the product specifications.

EXAMPLE 3

Case in which fault occurrence distribution per year and month in which repair was performed is ascribable to climate factors such as difference in temperature and humidity.

EXAMPLE 4

Case in which fault symptom occurrence distribution per part (module) subjected to the repair and per product type is attributable to specific product models and parts.

EXAMPLE 5

Case in which fault occurrence distribution per the number of months elapsed from the start of operation of a product till occurrence of fault or per class of the fault is ascribable to a specific fault pattern such as initial fault, accidental fault and worn fault.

Figure 20:
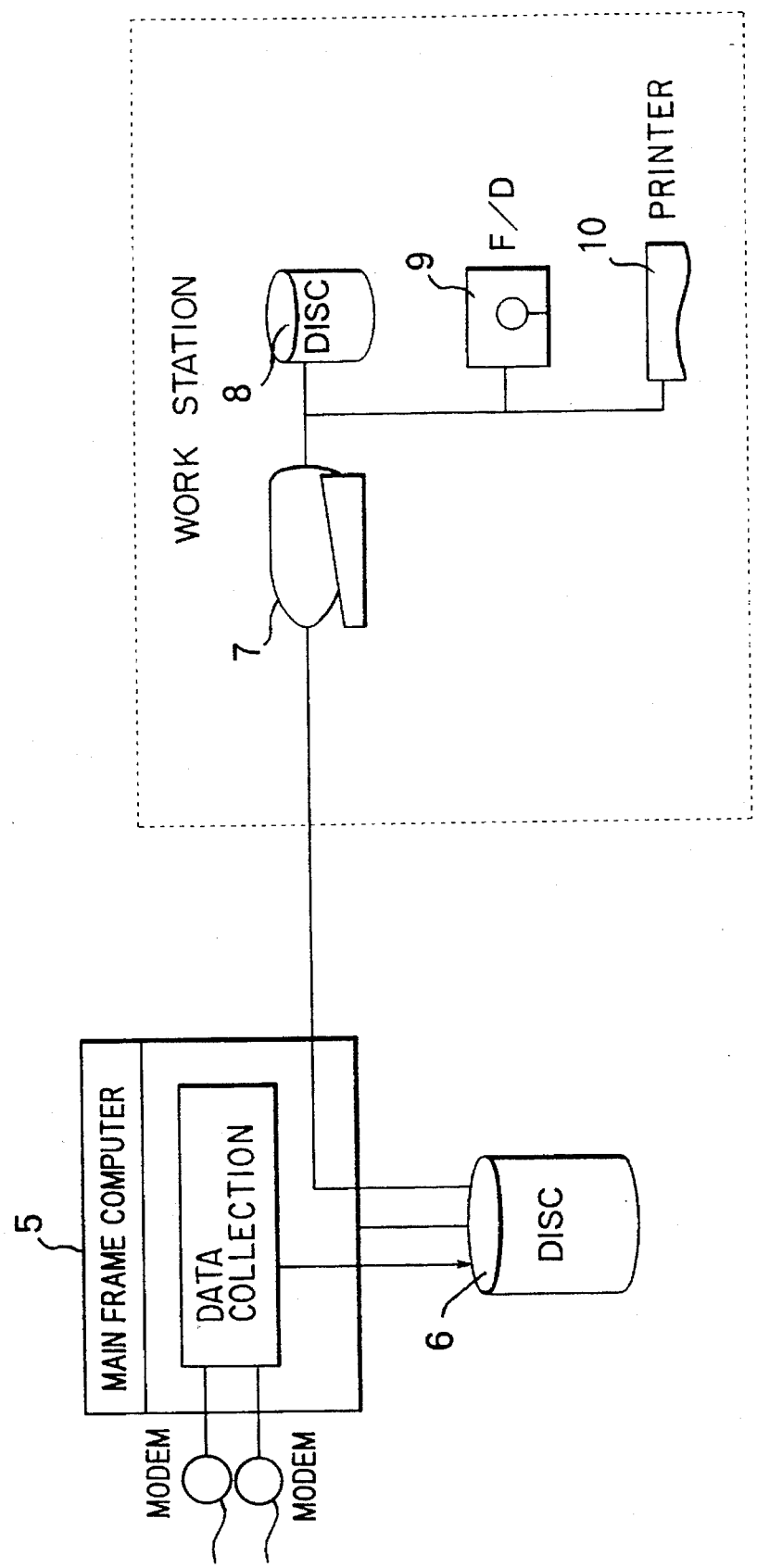
FIG. 20 shows a large scale computer installed at each factory for storing and managing quality data received from the large scale computer 1704 shown in FIG. 17 and a structure of a work station for performing search and analysis of the quality data.

FIG. 20 shows a large scale computer installed at each factory for storing and managing quality data associated with the factory, which data are acquired from the large scale storage unit 1704 shown in FIG. 17 by issuing a transfer request, together with a work station designed for performing search and analysis of the quality data. Connected to the large scale computer 5 is a large scale storage unit 6 which stores customer-originated quality data for all the fault cases of all the products manufactured in the individual factories in the past. Search and analysis of the quality data are performed in the work station 7 which is equipped with an external storage unit 8 storing a database of the quality data. The result of the search and the analysis performed on the basis of the database are outputted to an external storage unit 9 or to a printer 10. The work station 7 is connected to the large scale computer 5 through a high-speed network. Upon appearance of a request for data which do not exist in the database of the work station, they are sent to the work station through the network.

Figure 21:
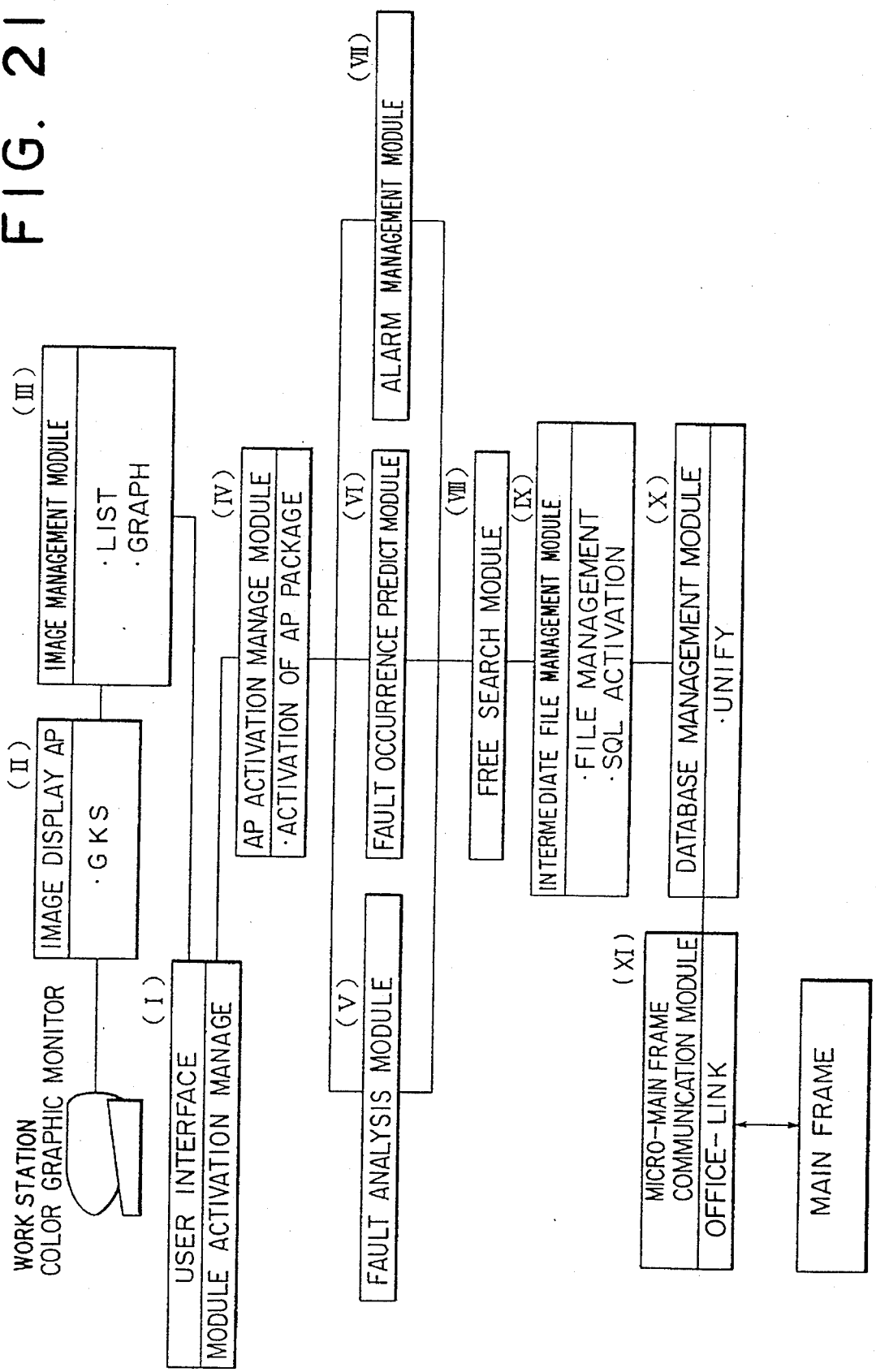
FIG. 21 is a view showing a configuration of software for performing search and analysis of the quality data in the work station 7 shown in FIG. 20.

FIG. 21 shows a configuration of software for performing search and analysis of the quality data in the work station 7 shown in FIG. 20. In the following, description will be made concerning individual modules having respective functions illustrated in FIG. 20. (i) A user interface 1 serves for controlling activation and deactivation of the individual modules. (ii) An image display application 2 controls color graphic monitor displays by using a graphic package. (iii) An image control module 3 serves for activation and deactivation of the image display application. (iv) An application activation/control module 4 serves for activation and deactivation of the individual modules. (v) A fault analysis module 5 is imparted with analysis functions for analyzing distributions, correlations, trends and others. (vi) A fault occurrence predicting module 6 has a function for predicting a fault occurrence distribution by resorting to a hazard analysis. (vii) An alarm control module 7 has a function for managing costs estimated for the faults and availability of parts for the retrofit, the number of which is previously estimated. (viii) A free search module 8 indicates search of an intermediate file or the database on the basis of search items as designated. (ix) An intermediate file manage module 9 is in charge of management of the intermediate files and activation of a database search language. (x) A database manage module 10 is a database manager for performing management, updating and search of the database. (xi) A M-2050 communication module 11 serves for controlling the data communications between the large scale computer and the work station by making use of inter-file communication packages.

Figure 22B:
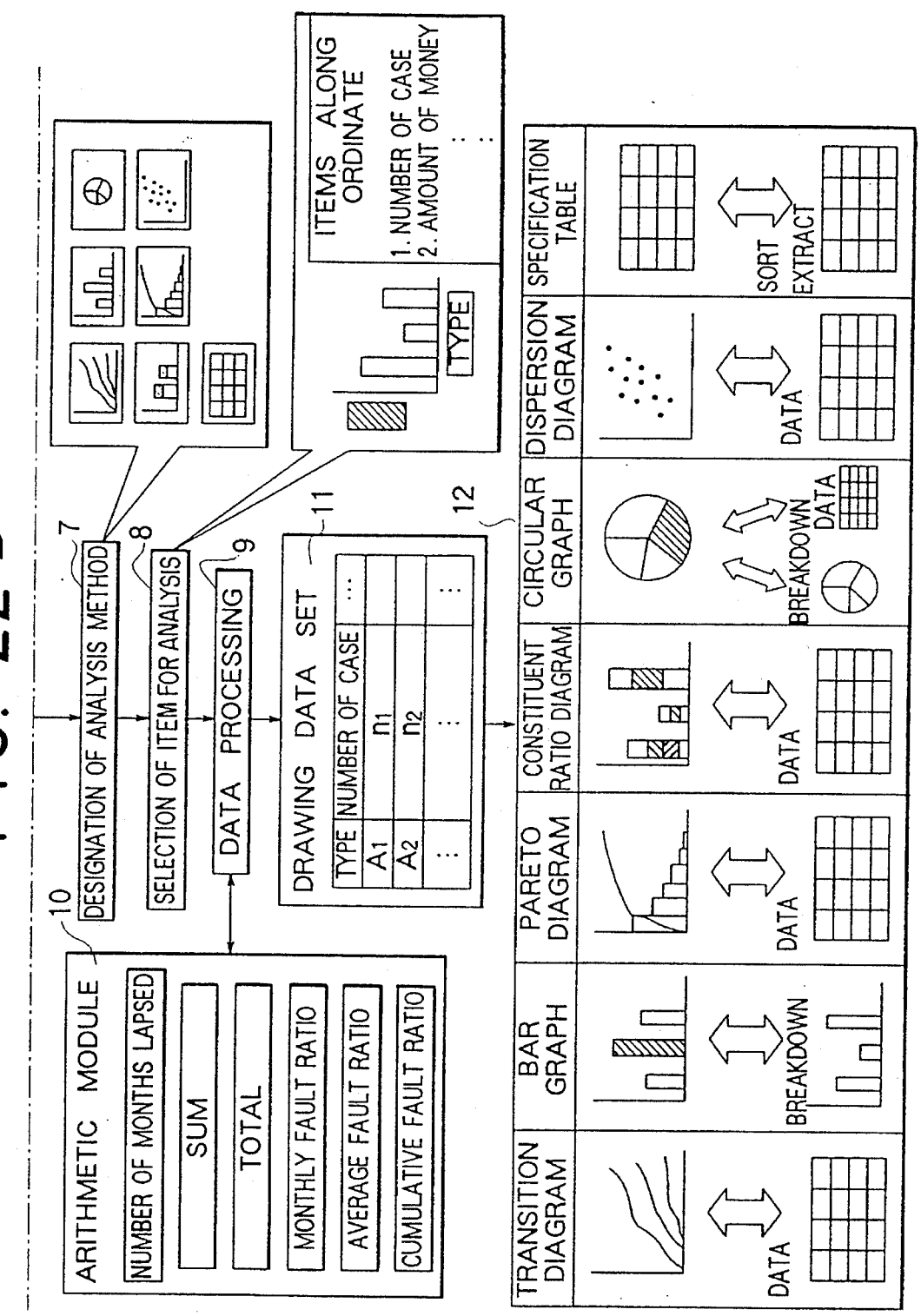
FIG. 22 is a view showing contents of a processing for performing the quality data search in the workstation.

FIG. 22 shows contents of processings for performing the quality data search in the workstation. In the following, individual procedures involved in the processing flow for performing the search and the analysis will be described by reference to FIG. 22. On the basis of the search query set up through a procedure 1, search is performed through a procedure 2. The procedure 2 activates the database manage function of a procedure 3. Through the procedure 3, the database is searched in accordance with the search query or condition. Unless the data set of the database satisfies the search query or condition, apart of the data which is not common to the search query and the database, i.e. the data which does not exist in the database is transferred from the large scale computer by making use of a host access function of a procedure 4 and registered in the database. The result of the search performed through the procedure 2 is written in a core memory as a source data set 6. At that time, data values can directly be referred to for those items which are selected through a data set item selecting procedure 5. Analysis is performed on the data set written in the core memory. Through a procedure 7, an analysis method is designated, which is followed by a procedure 8 for selecting parameters involved in the analysis, whereon processing is performed through an analysis procedure 9. The analysis procedure 9 performs arithmetic operation in accordance with the analysis method designated in the procedure 7. The result of the arithmetic operation is outputted in the form of an output format 12 which complies with the analysis method. With the arithmetic operation in accordance with the analysis method, it is intended to mean to perform calculation for each data item shown in FIG. 23B in accordance with a given one of management items shown in FIG. 23A.

Figure 24:
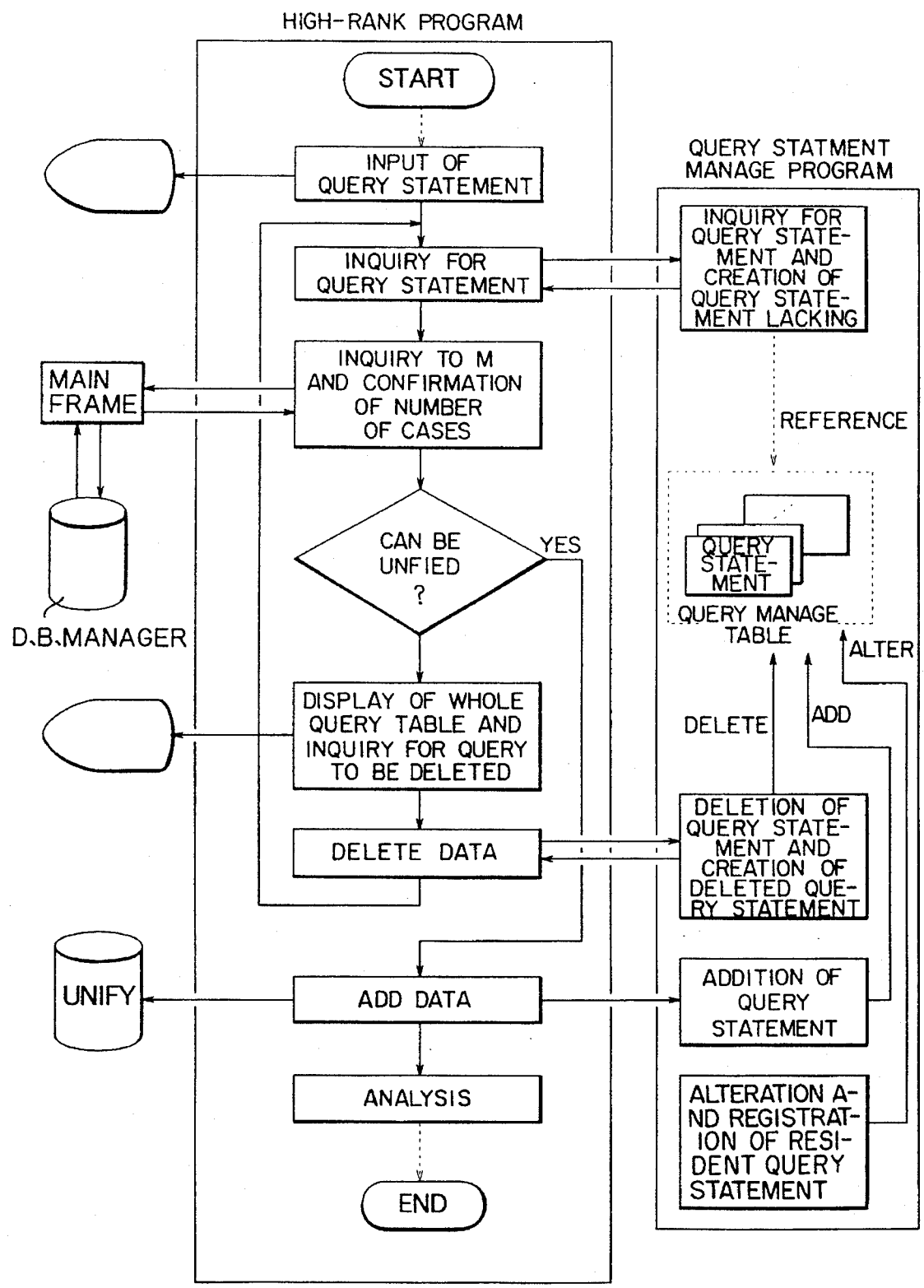
FIG. 24 is a view for illustrating a processing procedure in which when data sets of a database in a work station do not meet a search query in a database search, a part of data which are not common to the search query and the database, i.e. the data not existing in the database, is transferred from a large scale computer to the database to be registered therein.

In the processing flow described above, a database manage/search method will be considered. When a search request is issued through the procedure 2 shown in FIG. 22, the database manage function of the procedure 3 shown in FIG. 22 is activated, whereon the database is searched in the light of the search query. In that case, unless the data set of the database of the work station satisfies the search condition, a part of the data which is not common to the search query and the database, i.e. the data which does not exist in the database, is acquired from the large scale computer through the procedure 4 shown in FIG. 22 to be registered in the database. A processing procedure to this end is shown in FIG. 24. Starting from the search query statement, a query statement for the nonexistent data is created. In the light of this query, the large scale computer performs the search, the result of which is transferred to the work station. When there is available a sufficient disk space in the work station for storage, the data transferred from the large scale computer is registered. If otherwise, those query statements which indicate data groups which may be deleted from the disk are selected and the corresponding data are deleted. Thereafter, the transferred data are registered.

Figure 25:
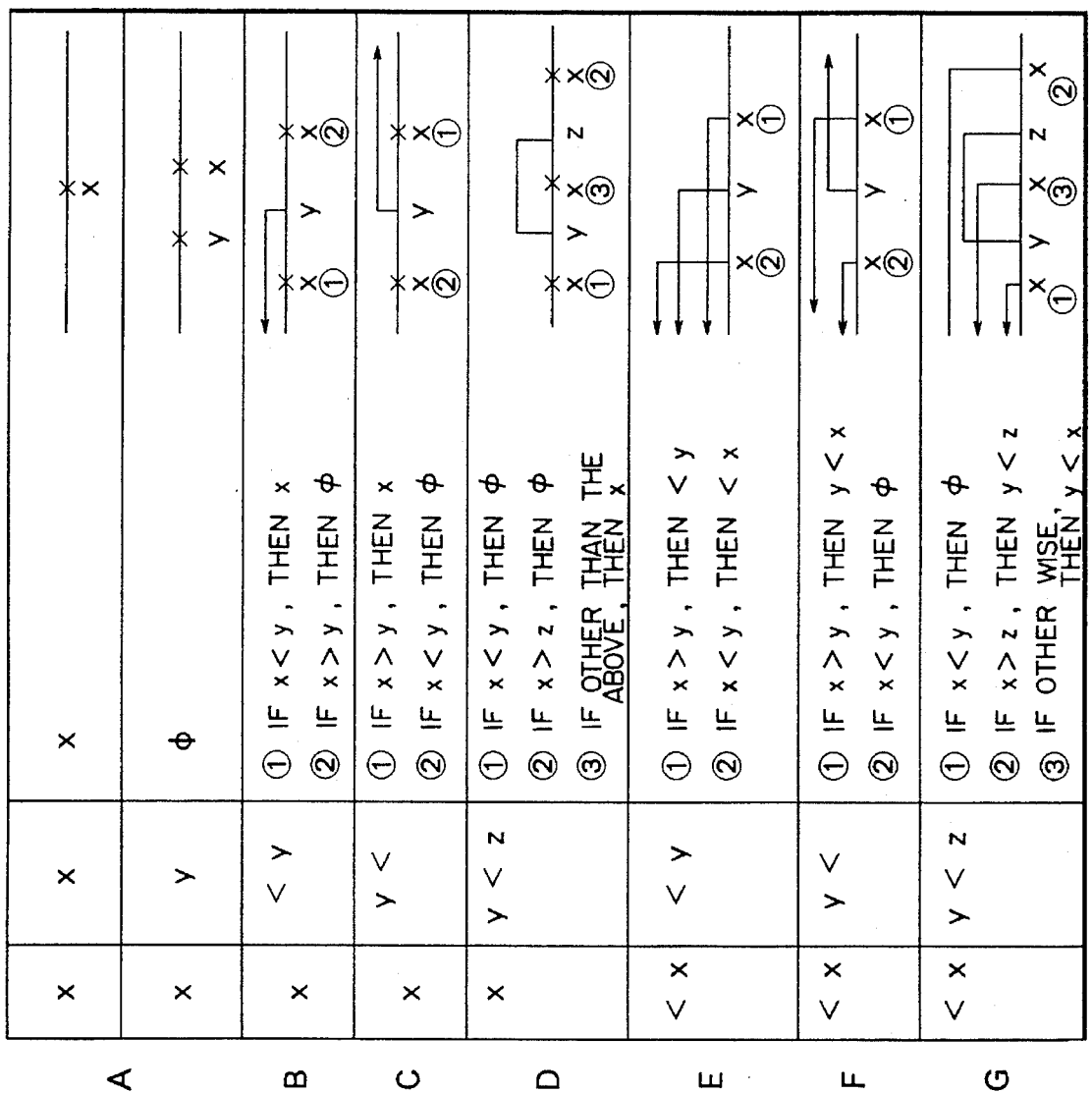
FIG. 25 is a view showing products of sets for all cases where inclusion relations between data sets and search queries are arithmetically determined and the case where search query statement for the lacking data are created.
Figure 26:
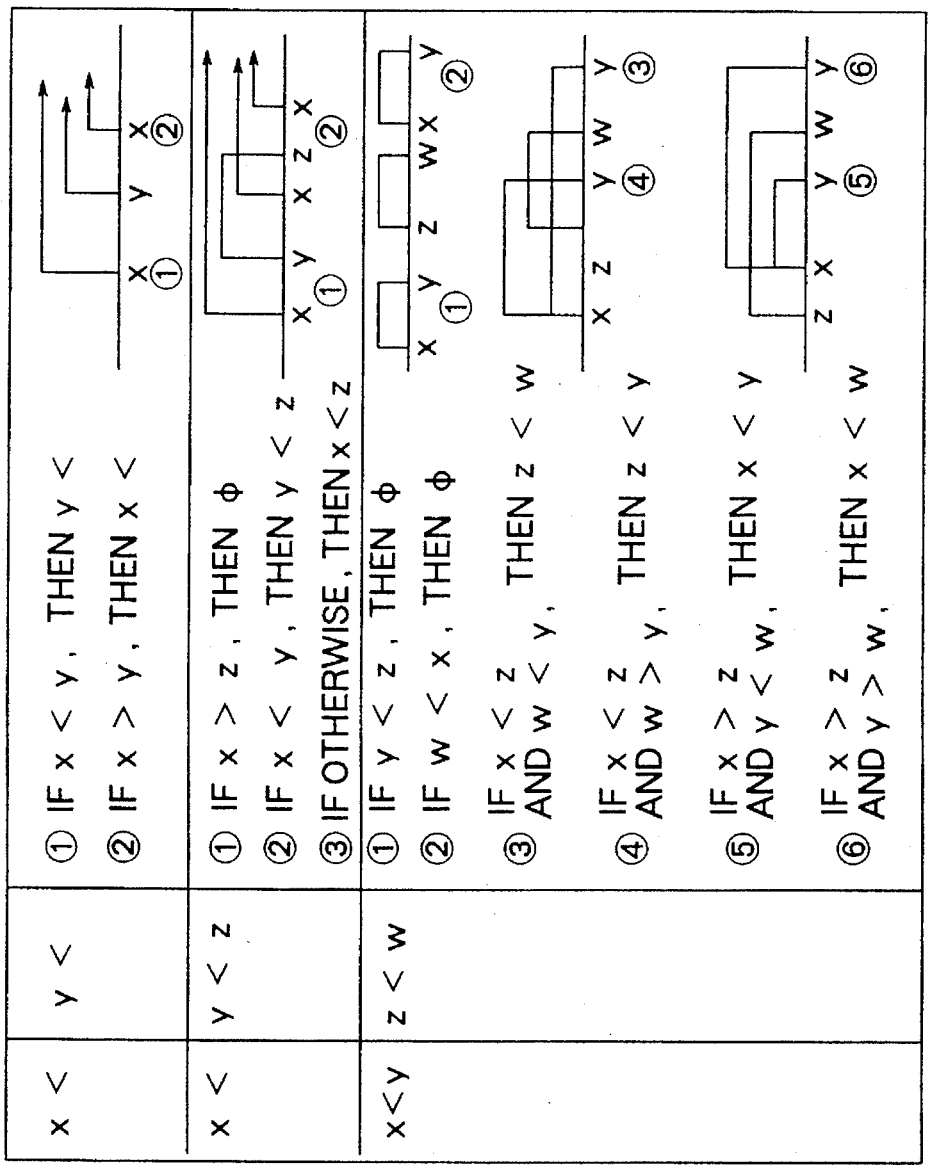
FIG. 26 is a view showing products of sets for all the cases where inclusion relations between data sets and search queries are arithmetically determined and the case where search query statement for the lacking data are created.

FIGS. 25 and 26 show comprehensively products of sets for all the cases there inclusion relations between the data sets and the search queries are arithmetically determined and the case where the search query statements for the nonexistent data are created on the basis of the given search query statements. For all of the cases, the results of determination of the products between the conditions indicated in a first column (leftmost column) and a second column (center column) are shown in a third column (rightmost column). In the following, description will be made orderly of the individual cases.

A: (upper row) A product between a condition of being equal to x and a condition of being equal to x indicates a condition of being equal to x. (lower row) A product between a condition of being equal to x and a condition of being equal to y represents an empty set.

B: A product between a condition of being equal to x and a condition of being smaller than y indicates the condition of being equal to x in the case ① where x<y, while representing an empty set in the case ② where x>y.

C: A product between a condition of being equal to x and a condition of being greater than y indicates the condition of being equal to x in the case ① where x>y, while representing an empty set in the case ② where x<y.

D: A product between a condition of being equal to x and a condition of being greater than y and smaller than z represents an empty set in the case ① where x<y or in the case ② where x>z, while indicating a condition of being equal to x in the other cases than ③, ① and ②.

E: A product between a condition of being smaller than x and a condition of being smaller than y indicates a condition of being smaller than y in the case ① where x>y, while indicating a condition of being smaller than x in the case ② where x<y.

F: A product between a condition of being smaller than x and a condition of being greater than y indicates a condition of being greater than x and smaller than y in the case ① where x>y, while representing an empty set in the case ② where x<y.

G: A product between a condition of being smaller than x and a condition of being greater than y and smaller than z represents an empty set in the case ① where x<y, while indicating a condition of being greater than y and smaller than z in the case ② where x>z, and indicates a condition of being smaller than x in the other cases than ③, ① and ②.

H: A product between a condition of being greater than x and a condition of being greater than y indicates a condition of being greater than y in the case ① where x<y, while indicating a condition of being greater than x in the case ② where x>y.

I: A product between a condition of being greater than x and a condition of being smaller than z represents an empty set in the case ① where x>z, while indicating a condition of being greater than y and smaller than z, and indicates a condition of being greater than x and smaller than z in the other cases than ③, ① and ②.

J: A product between a condition of being greater than x and smaller than y and a condition of being greater than z and smaller than w represents an empty set in the case ① where y<z, represents an empty set in the case ② where y<z, represents an empty set in the case ② where w<z, indicates a condition of being greater than z and smaller than w in the case ③ where x<z and w<y, indicates a condition of being greater than z and smaller than y, indicates a condition of being greater than z and smaller than y in the case ④ where x<z and w>z, indicates a condition of being greater than x and smaller than y in the case ⑤ where x>z and w>y, and indicates a condition of being greater than x and smaller w in the case ⑥ where x>z and w<y.

Figure 27A:
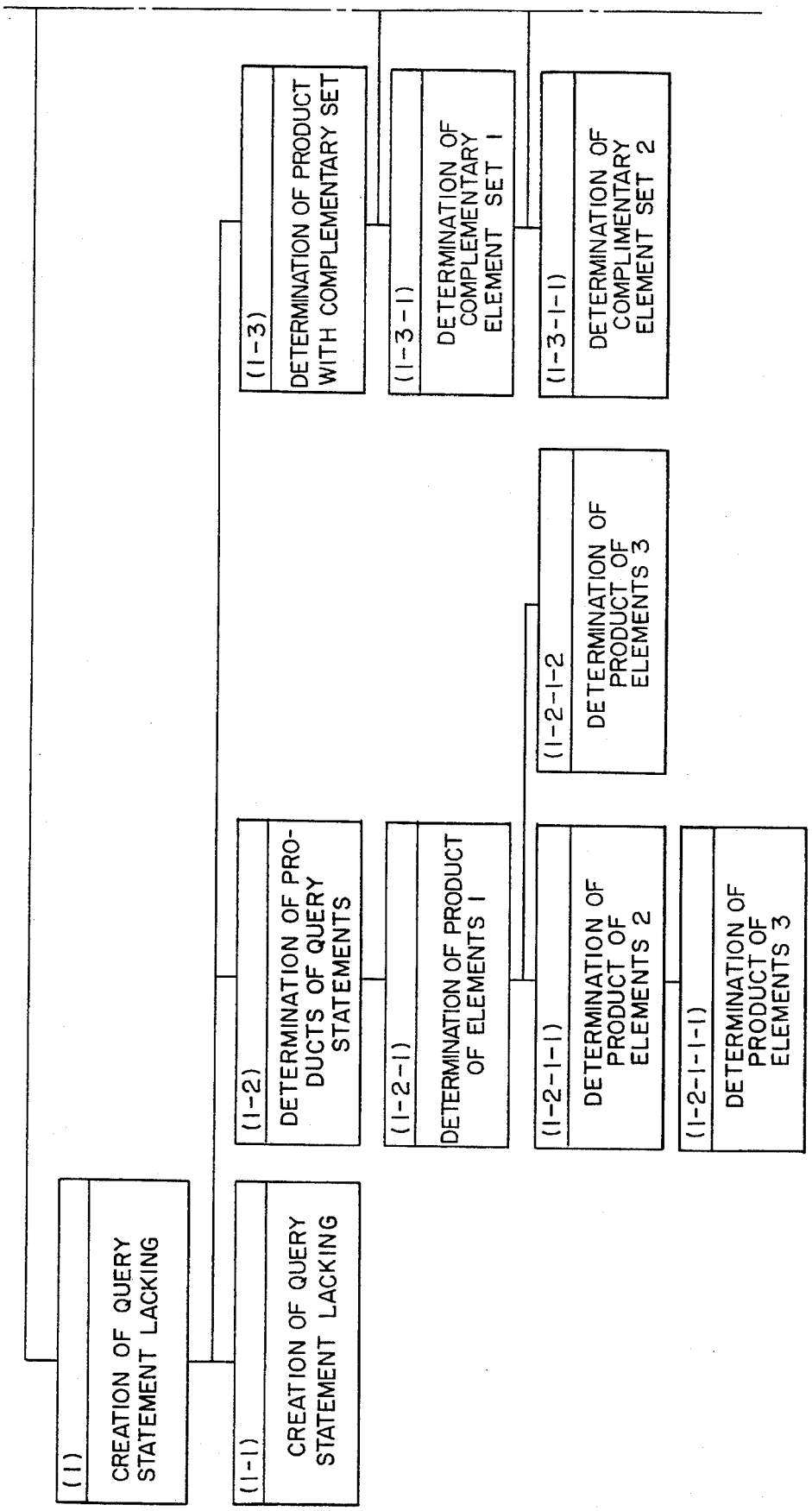
FIG. 27 is a functional diagram for illustrating processings involved in carrying out the data search in the work station.

FIG. 27 is a functional diagram for illustrating processings involved in carrying out the data search in the work station. A search query manage program according to the present invention is composed of (1) creation of nonexistent search queries, (2) deletion of search query and creation of the deleted search query, (3) addition of queries, and (4) alteration and registration of resident query statements. Further, the creation of the non-existent query statement includes (1-2) arithmetic determination of the products between the query statements and the arithmetic determination of the products with complementary sets. The arithmetic determination (1-2) of the product between the query statements includes combination (1-2-1) of the results of calculation for determining the product of elements, while arithmetic determination of the products with the complementary sets includes the calculation (1-3-1) of complementary sets of elements and combinations (1-3-2) of products of the elements. Through the procedure (2) for deletion of the query statement and creation of the deleted query statement is accompanied with (2-1) creation of the nonexistent query statements.

Figure 28:
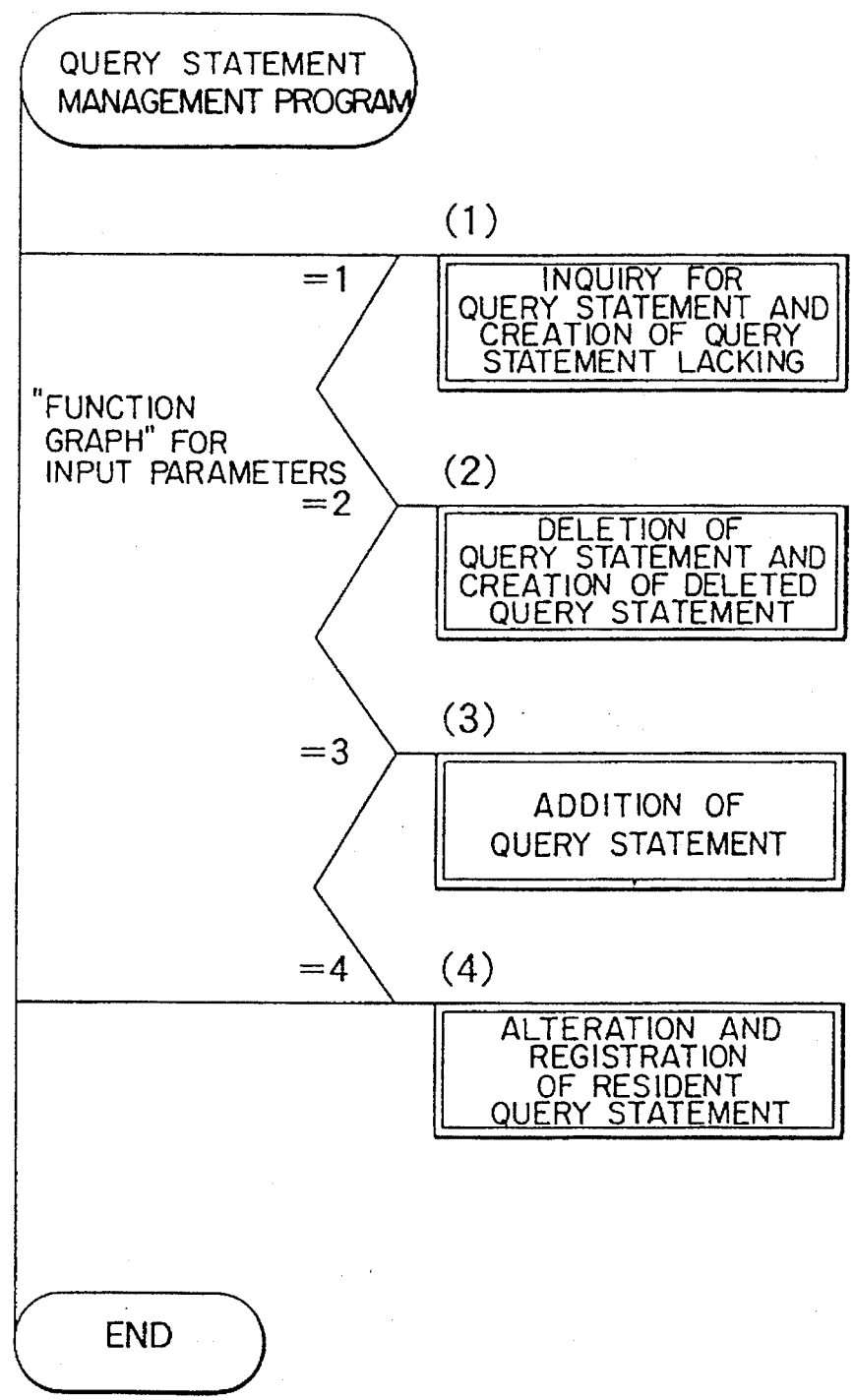
FIGS. 28 is a view showing (1) creation of nonexistent query statement, (2) deletion of query statement and creation of deleted query statement, (3) addition of a query statement or (4) alteration or registration of a resident query statement, either one of which is activated when a query statement manage program is started.
Figure 29:
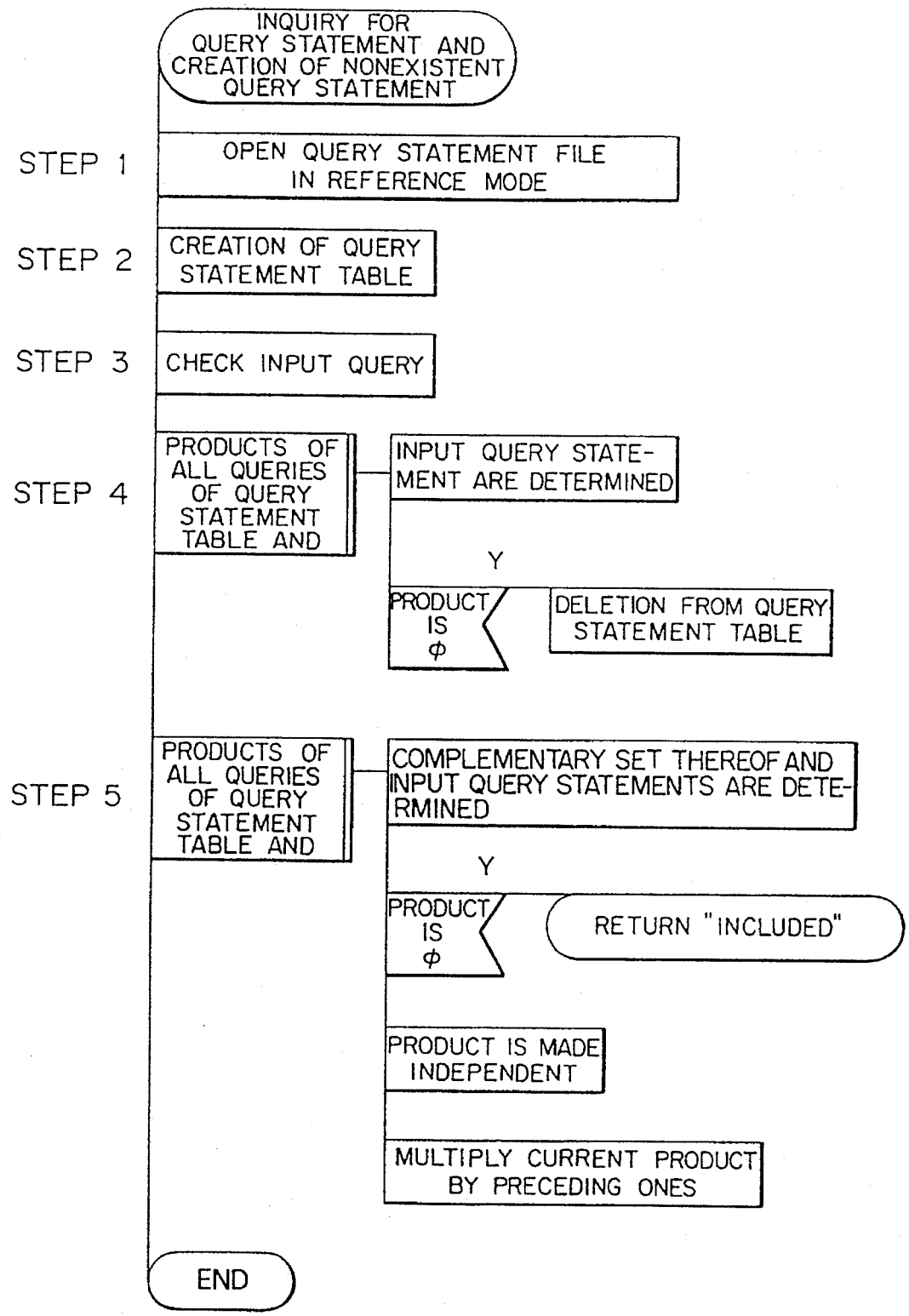
FIG. 29 is a view showing a procedure through which the function (1) of inquiry for the query statement and the creation of nonexistent query statements shown in FIG. 28 is executed.

FIGS. 28 to 32 show in PAD diagrams further details of the major functions shown in FIG. 27. Referring to FIG. 28, it can be seen that when the query statement manage program is activated, either one of the functions (1) creation of a nonexistent query statement, (2) deletion of a query statement and creation of a deleted query statement, (3) addition of a query statement or (4) alteration and registration of a resident query statement is effectuated. FIG. 29 shows a procedure through which the function (1) of inquiry for a query condition and a nonexistent query statement shown in FIG. 28 is executed. This procedure will be described below stepwise.

step 1: a query statement file is opened in a reference mode;

step 2: a query condition table is created;

step 3: input query statement is checked;

step 4: products of all the query statements contained in the query statement table and the individual input query statements are computed, whereon those of having the empty result are deleted from the query statement table.

step 5: Products of complementary sets of all the query statements contained in the query statement table and individual input query statements are computed, and fop the empty result, a message "included" is outputted. If otherwise, the products are sequentially multiplied by one another.

Figure 30:
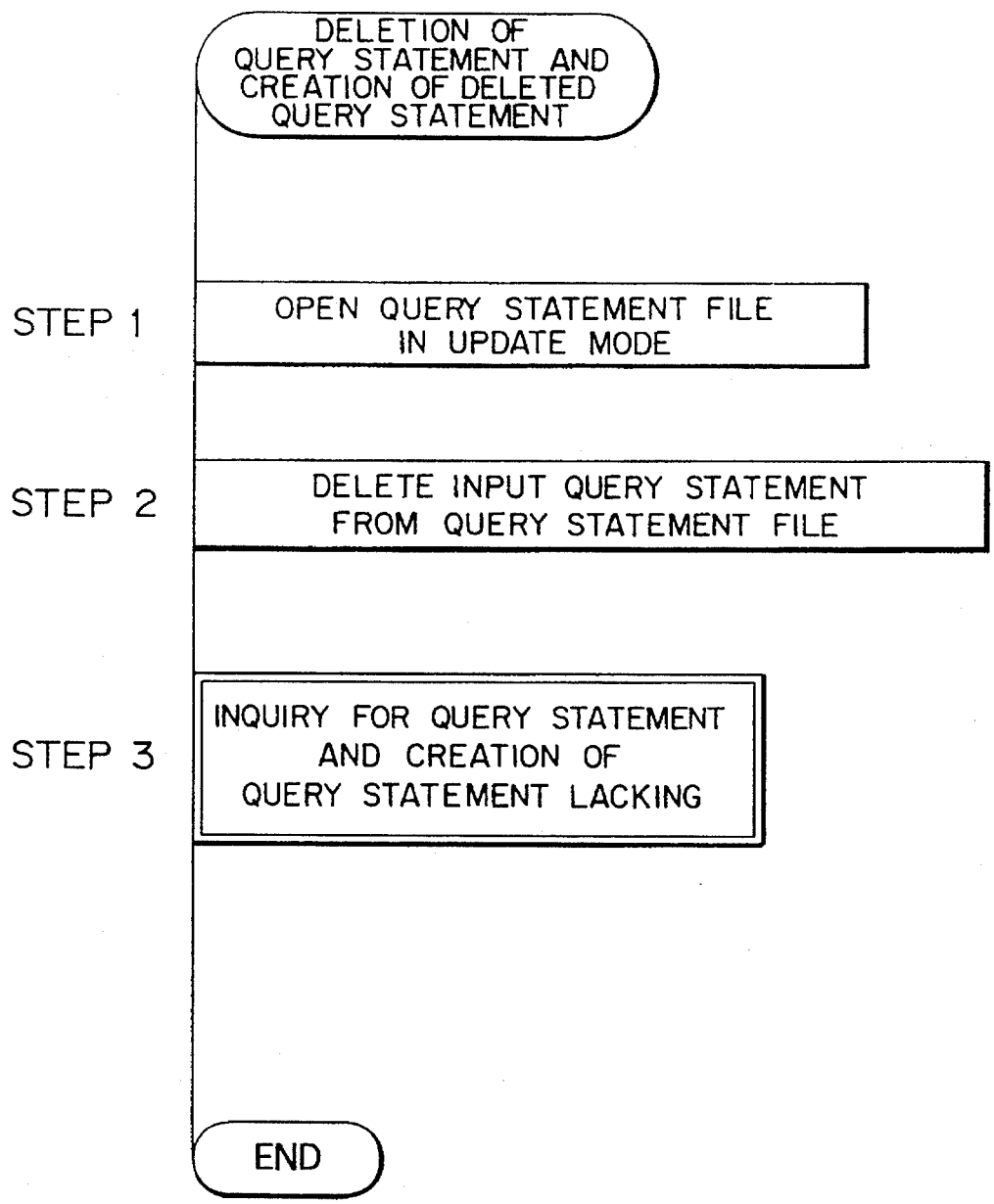
FIG. 30 is a view showing a procedure through which the function (2) of deletion of the query statement and the creation of the deleted query statement shown in FIG. 28 is implemented.

FIG. 30 shows a procedure through which the function (2) of deletion of query statement and creation of the deleted query statement shown in FIG. 28 is implemented. This procedure will be described stepwise.

step 1: the query statement file is opened in an update mode;

step 2: input query statement is deleted from the query statement file;

step 3: function of inquiry about the query statement and creation of the nonexistent query statement is activated.

FIG. 31 shows a procedure through which the function of alteration and registration of the resident query statement shown in 28 is activated. This procedure will be described below stepwise.

step 1: the query statement file is opened in the update mode;

step 2: input query statement is written in a query statement file;

step 3: thee query statement file is closed.

FIG. 32 illustrates a procedure through which the function (3) for addition of the query statement shown in FIG. 28 is implemented. This procedure will be described below stepwise.

step 1: the query statement file is added in an addition mode;

step 2: the input query statement is added to the query statement table;

step 3: the query statement file is closed.

FIG. 33 Shows file specifications for the query statement file destined for storing the search query statements which are subjected to the arithmetic operation. Further, FIG. 34 shows file specifications for an input/output parameter file adapted for storing elements of the query statements which are used for the data transaction with a program of a higher rank.

Next description will be made of individual functions for performing the arithmetic operations on the results of the processings described above in accordance with the analysis method designated by the procedure 7 and outputting the results of the arithmetic operation in the form of the output format 12 which complies with the analysis method.

(i) Transition diagram

An example of a transition diagram is shown in FIG. 35. Owing to this function, the fault occurrence number, the repair cost and the fault ratio can each be classified up to five hierarchical levels at maximum and plotted time-serially. Parenthetically, the data values can be found in a data table.

(ii) Bar graph

Figure 36:
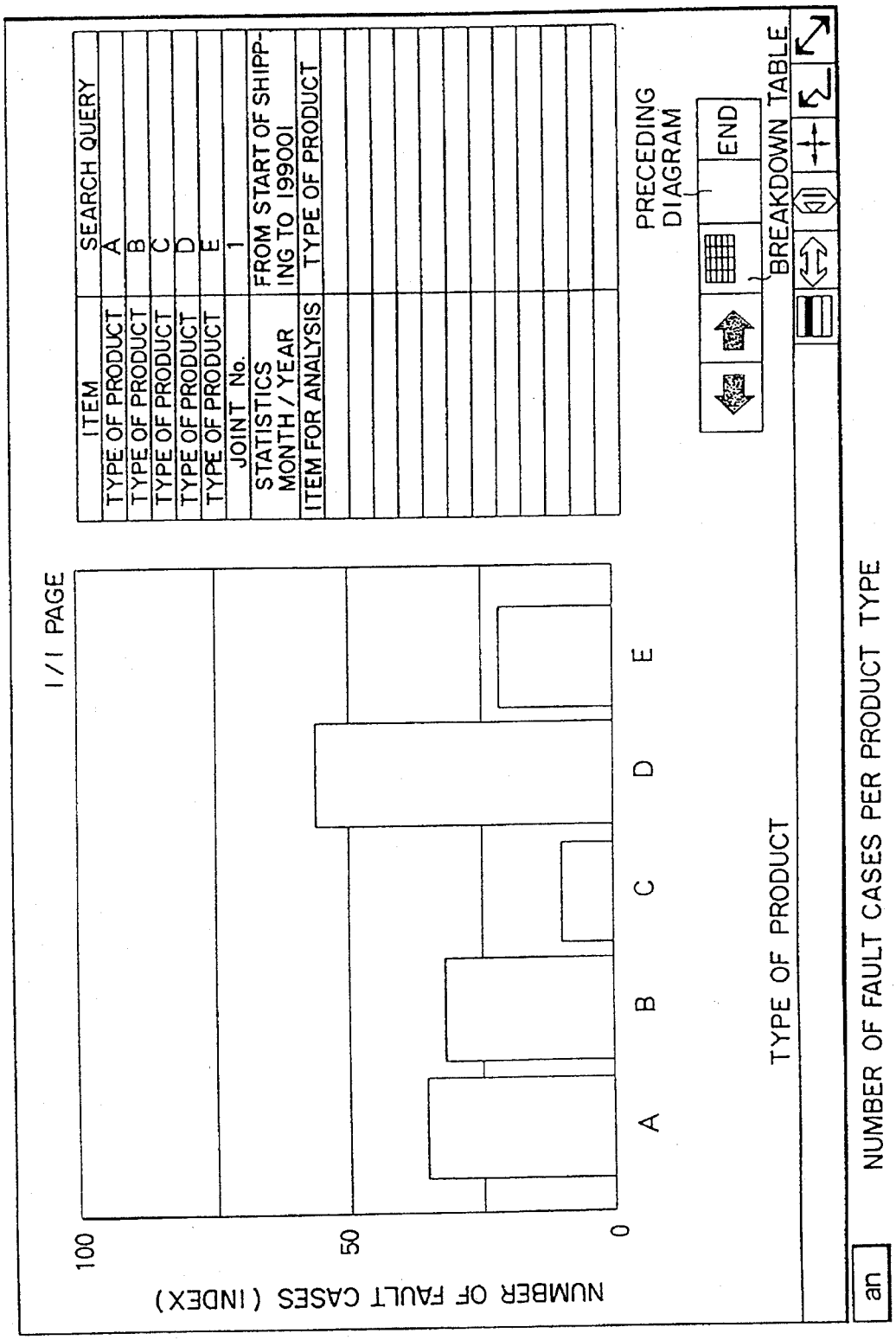
FIG. 36 is a views showing an example of bar graph as a result of the analysis.

An example of bar graph is illustrated in FIG. 36. Owing to this function, the fault occurrence number, the repair cost and the fault ratio can be illustrated hierarchically in category. Further, a specific categorical item may be displayed hierarchically in another category. Parenthetically, data value can be seen in the data table.

(iii) Pareto diagram

Figure 37:
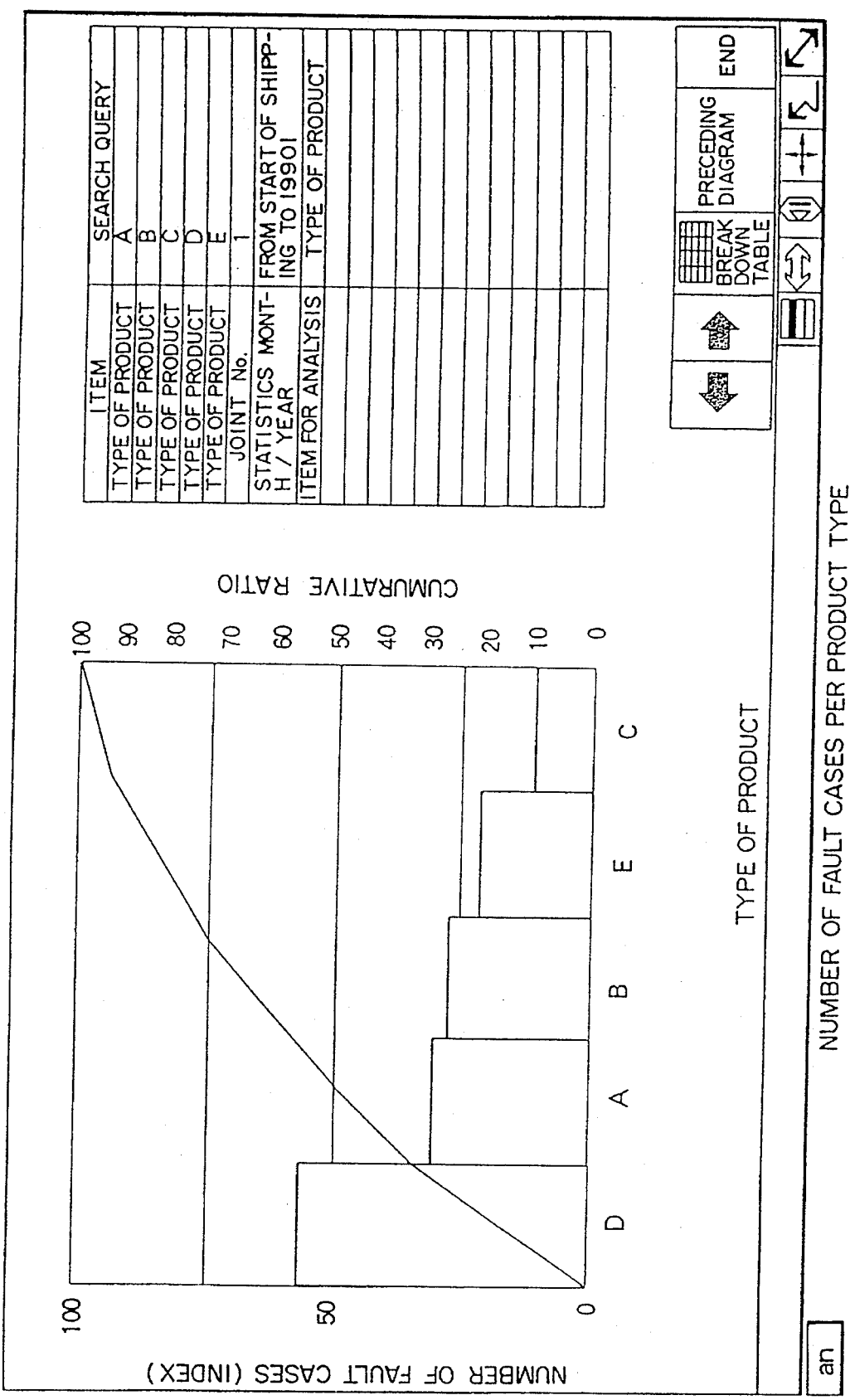
FIG. 37 is a view showing an example of a Pareto diagram as a result of the analysis.

An example of a Pareto diagram is shown in FIG. 37. Owing to this function, the fault occurrence number, the repair cost and the repair rate can be categorically classified into hierarchical levels and displayed after having been sorted in the order of magnitude. Further, cumulative values of ratios of the individual item values to a sum value are plotted. The data value can be seen in the data table.

(iv) Constituent ratio diagram

Figure 38:
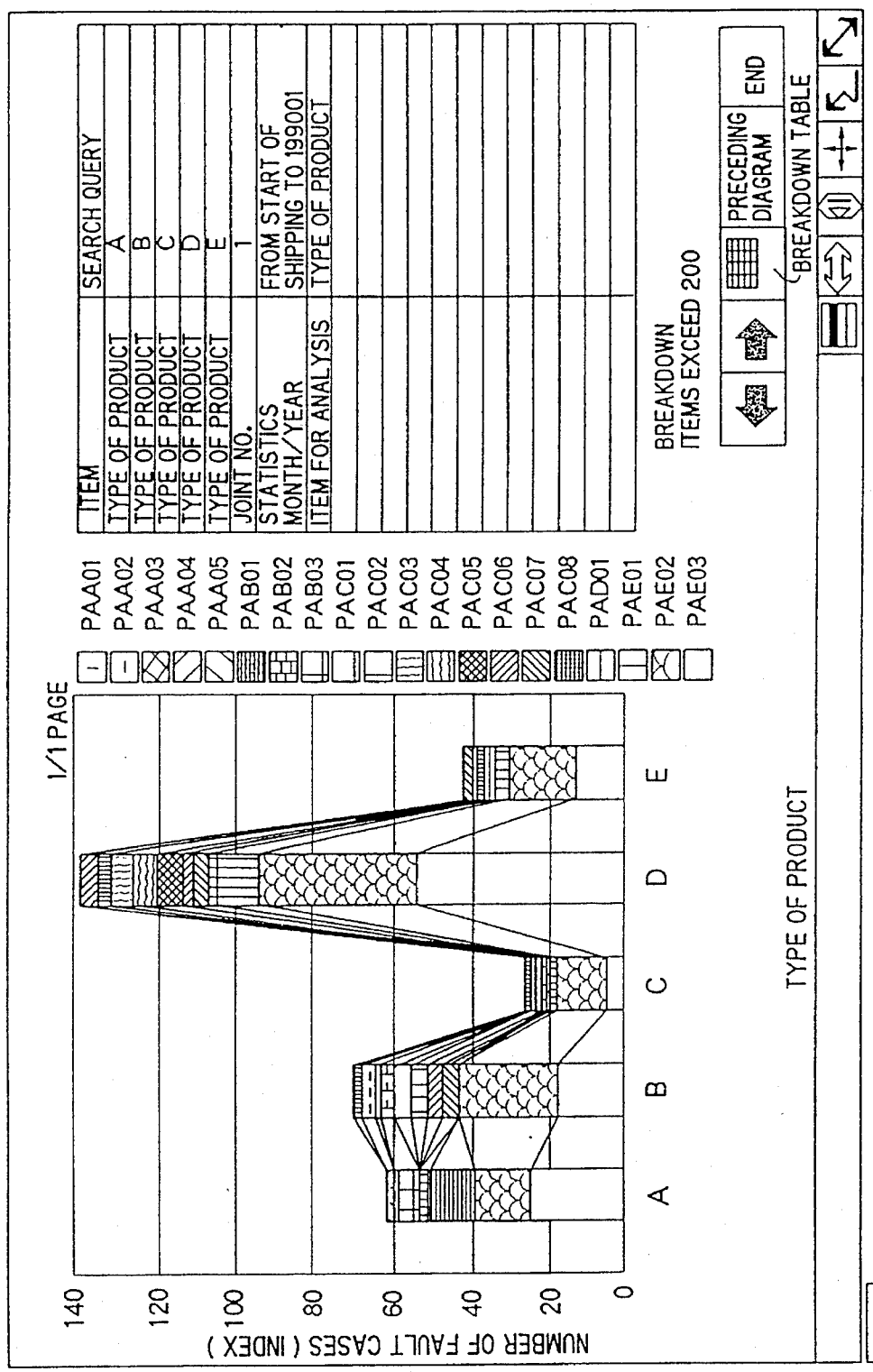
FIG. 38 is a view showing an example of a constituent ratio diagram as a result of the analysis.

An example of a constituent ratio diagram is shown in FIG. 38. Owing to this function, the fault occurrence number, the repair cost and the fault ratio are classified into main and subsidiary categories, wherein the main category is taken along the abscissa with the subsidiary category being taken along the ordinate to display the fault occurrence number, the repair cost and the fault ratio in terms of the constituent ratios. Parenthetically, the data value can be found from the data table.

(v) Circular graph

Figure 39:
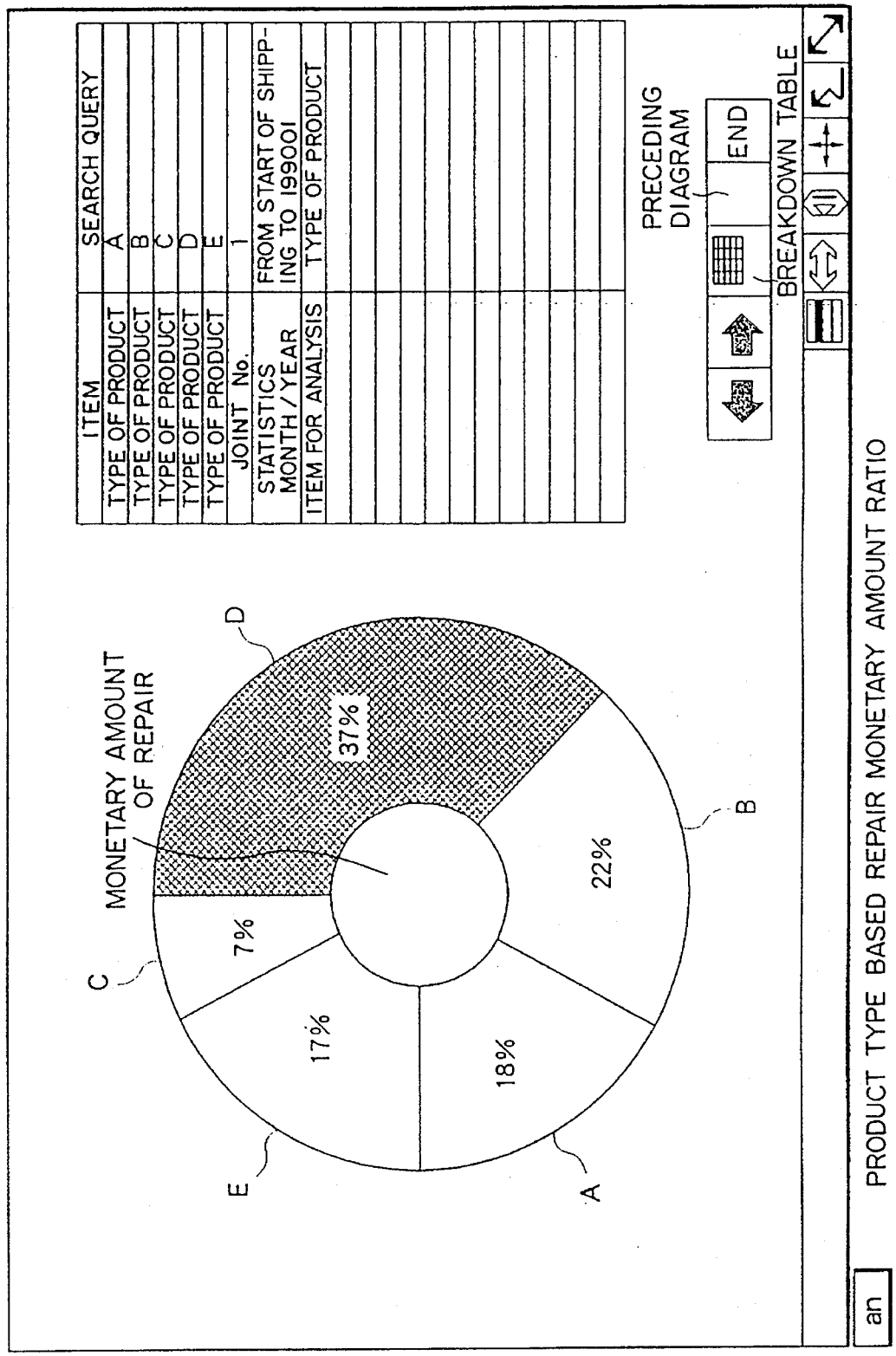
FIG. 39 is a view showing an example of a circular graph as a result of the analysis.

An example of a circular graph is shown in FIG. 39. Owing to this function, the fault occurrence number, the repair cost and the fault ratio can be categorically displayed. It is possible to display hierarchically a specific categorical item in another category. The data value can be seen in the data table.

(vi) Dispersion diagram

Figure 40:
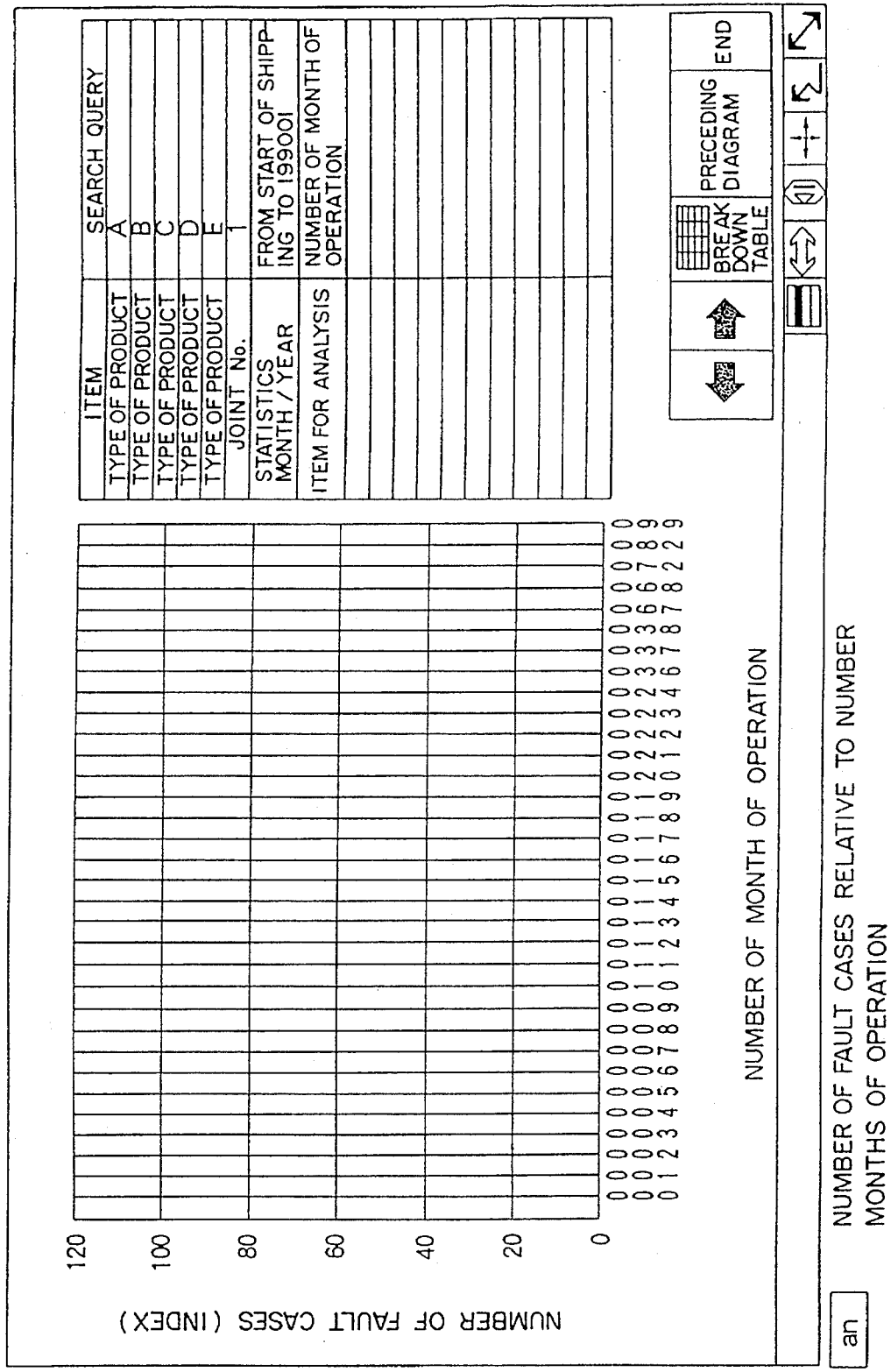
FIG. 40 is a view showing an example of a dispersion diagram as a result of the analysis.

An example of a dispersion diagram is shown in FIG. 40. Owing to this function, a pair of data can be displayed in the form of a single point. The data value can be found in the data table.

(vii) Specifications table

An example of a specifications table is shown in FIG. 41. Owing to this function, data of the service cards as retrieved by the search can be rearranged in terms of the items and sorted (thrice at maximum), whereon specific data are extracted to be displayed in the form of a table.

As will be appreciated from the above, with the aim of pursing the main cause of the faults of the products taking place actually in the field and deficiencies in the quality by performing arithmetic operation in accordance with the designated analysis methods and expanding the individual functions for outputting the results of the arithmetic operations in the output formats which comply with the analysis method, the processing for screening out the main cause and the outputting of the results of arithmetic operation can be executed in parallel with each other. Contents of such processing are exemplarily shown in FIGS. 42 to 44.

Figure 42:
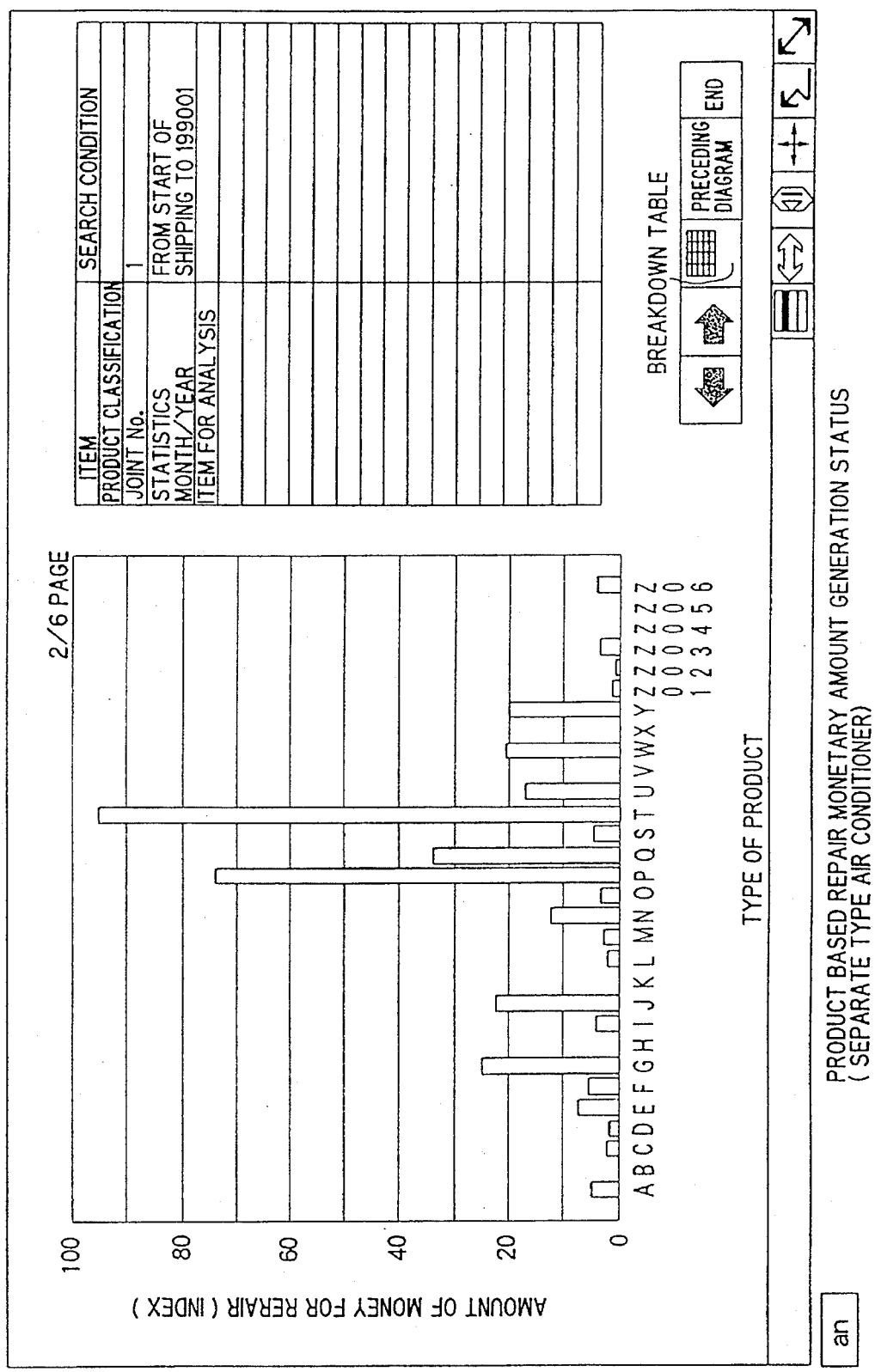
FIGS. 42 is a view for illustrating an example of processing for screening out factors in the course of pursing the factors of a fault of a product and deficiency in the quality of the latter encountered actually in the field, when the invention is carried out.
Figure 43:
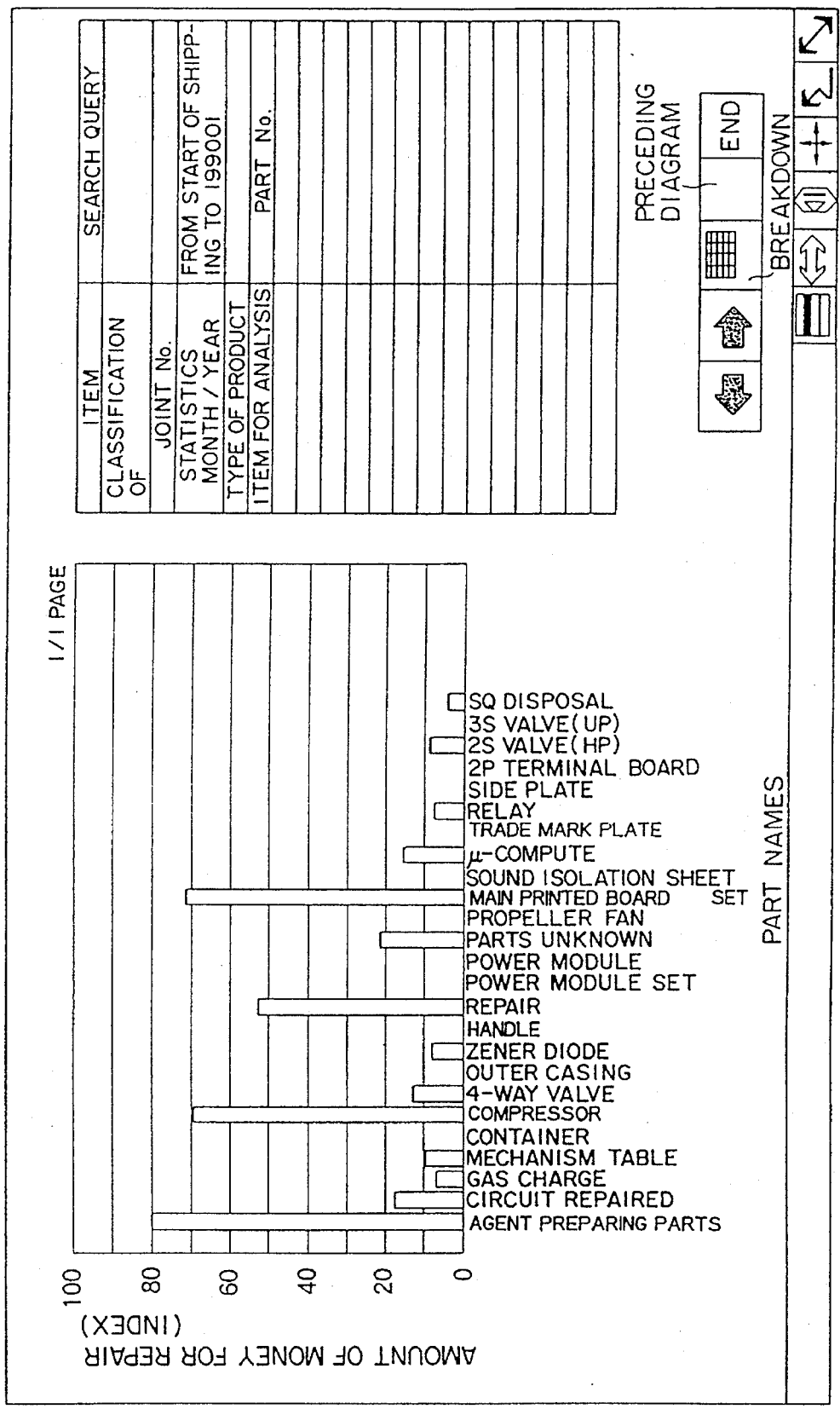
FIGS. 43 is a view for illustrating an example of processing for screening out factors in the course of pursing the factors of a fault of a product and deficiency in the quality of the latter actually encountered in the field, when the invention is carried out.
Figure 44:
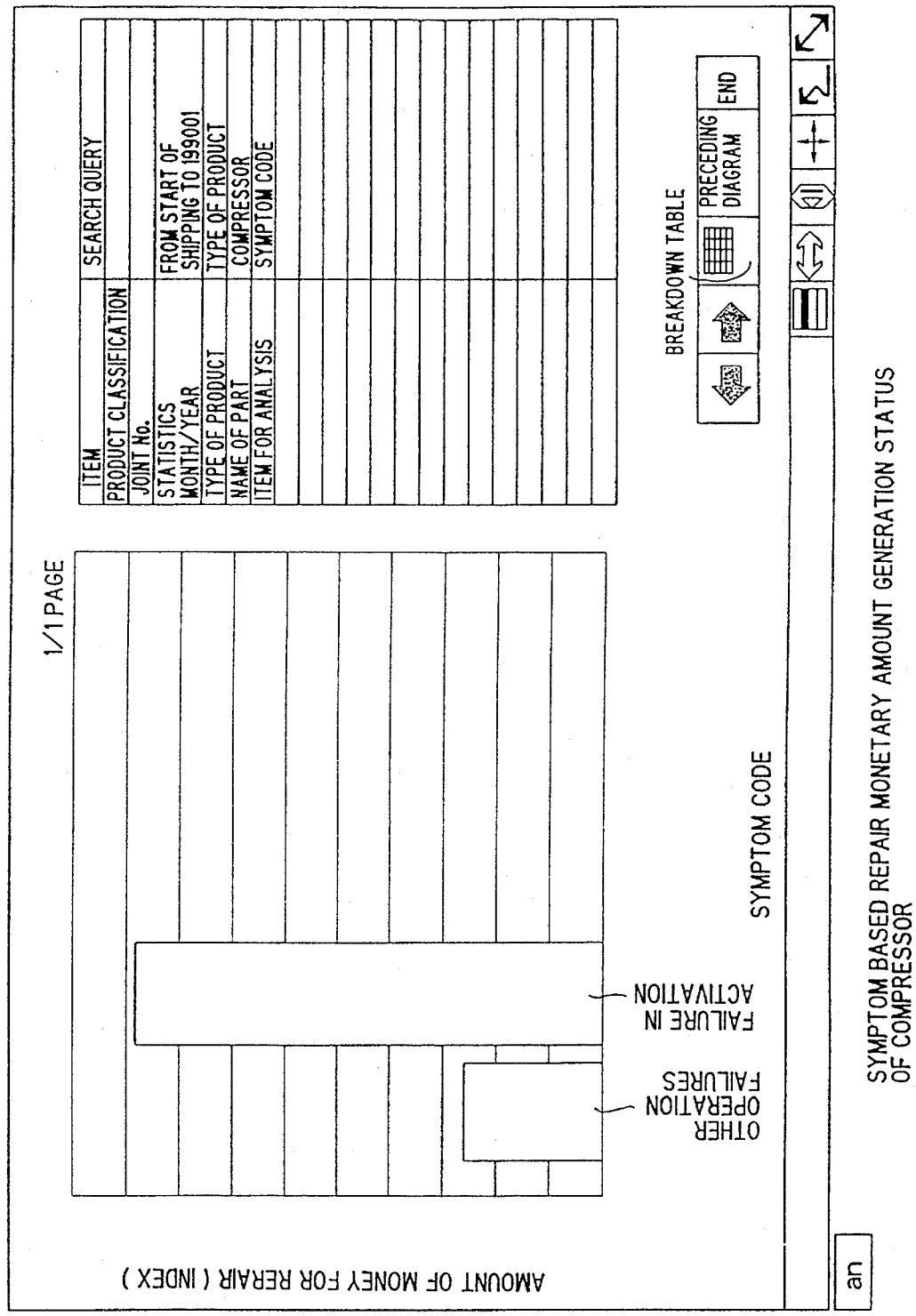
FIGS. 44 is a view for illustrating an example of a processing for screening out factors in the course of pursuing the factors of a fault of a product and deficiency in the quality of the latter actually encountered in the field, when the invention is carried out.

An example of the analysis performed on a product series of air conditioners will be considered, by way of example. At first, in the product series of air conditioners, the product which is to be improved with regard to the design and the inspection method is selected. To this end, the fault occurrence number, the repair cost, the fault ratio and others may hierarchically be classified in terms of the type or model and displayed. Result of this procedure is illustrated in FIG. 42. In this case, a product of a type T incurring a greatest monetary amount in the repair is selected as the object for the analysis. To this end, a bar indicating the repair cost of the product T shown in FIG. 42 is designated by a cursor and selected by clicking with a mouse. Thus, only the data of the products of this type are subjected to the analysis. In the products of the type T, those portions which are to be improved with regard to the design and the inspection are selected. This can be accomplished by classifying the fault occurrence numbers, the repair costs, the fault occurrence ratios for each constituent part and symptom. FIG. 43 shows a result of classification of the repair costs of the product type T for each of the constituent parts. In this conjunction, conditions for limiting the data subjected to the analysis are added sequentially to the table as the search queries, as indicated in a right column in FIG. 43. At this time point, a compressor requiring relatively lots of cost for the repair is selected as the object for the analysis. In this case, a bar indicating the monetary amount involved in repairing the compressor is designated by the cursor and selected by clicking with the mouse in the image shown in FIG. 43 in a similar manner as described previously. Consequently, only the data of the compressors of the products of the type T which experienced the fault can be screened out as the object for the analysis. Subsequently, in the products of the type T incorporating the compressors experienced the fault, those constituent parts which are to be improved in respect to the design and the inspection are selected. In this conjunction, a result of classification of the repair costs on the basis of the symptoms is illustrated in FIG. 44. As a result of the processings for screening out the main factor of the cause of fault, it can be determined that the product of the type T which incorporates the associated compressor experienced a fault in operation is one of the objects which is most important for improvement in the design and the inspection scheme.

The processings illustrated in FIGS. 42 to 44 will be described below in detail.

FIG. 45 shows a correlated data diagram for the fault factor analysis. With the fault factor analysis, it is intended to mean more detailed analysis and development of the content of the fault factors specified on the basis of the analysis data.

The source data manage table is provided for managing the source data for the analysis, wherein each row represents one fault repair case. Data concerning one fault repair case includes a plurality of items each of which manages information independently. The data analysis is performed by carrying out a data processing method designated for one vertical row of the individual items. A source data number table is designed to store the number of data stored in the source data manage table.

An analysis tool manage table is provided for managing information to be utilized in performing analysis on the source data and contains an item for analysis, a data processing method and an analysis method. The analysis item stores the item number (1-L) of the source data for which the analysis is performed. The data processing method item contains the type of arithmetic operation to be performed on the analysis item designated. The analysis method item stores the type of image for displaying the result of the analysis as performed. For the analysis items managed by the analysis tool manage table, arithmetic operation is performed in accordance with the data processing method as designated. The result of the analysis is displayed in accordance with the analysis method as designated.

A factor analysis table serves for storing as the content of factor analysis the content of one item designated by the analysis data which is the information required for the factor analysis and which is designated by the analysis tool manage table in accordance with the analysis method. A factor analysis number table serves for managing the number of data stored in the factor analysis table. When a plurality of data are stored in the factor analysis manage table, comparison is performed successively a number of times corresponding to the factor analysis number for determining whether or not the factor analysis content of the analysis items coincides with the one case data of the source data manage table. When coincidence is found for all the analysis, items, decision is made that the data are to be subject to the factor analysis, whereon the analysis is performed on the data processing method stored in the analysis tool manage table.

Figure 46:
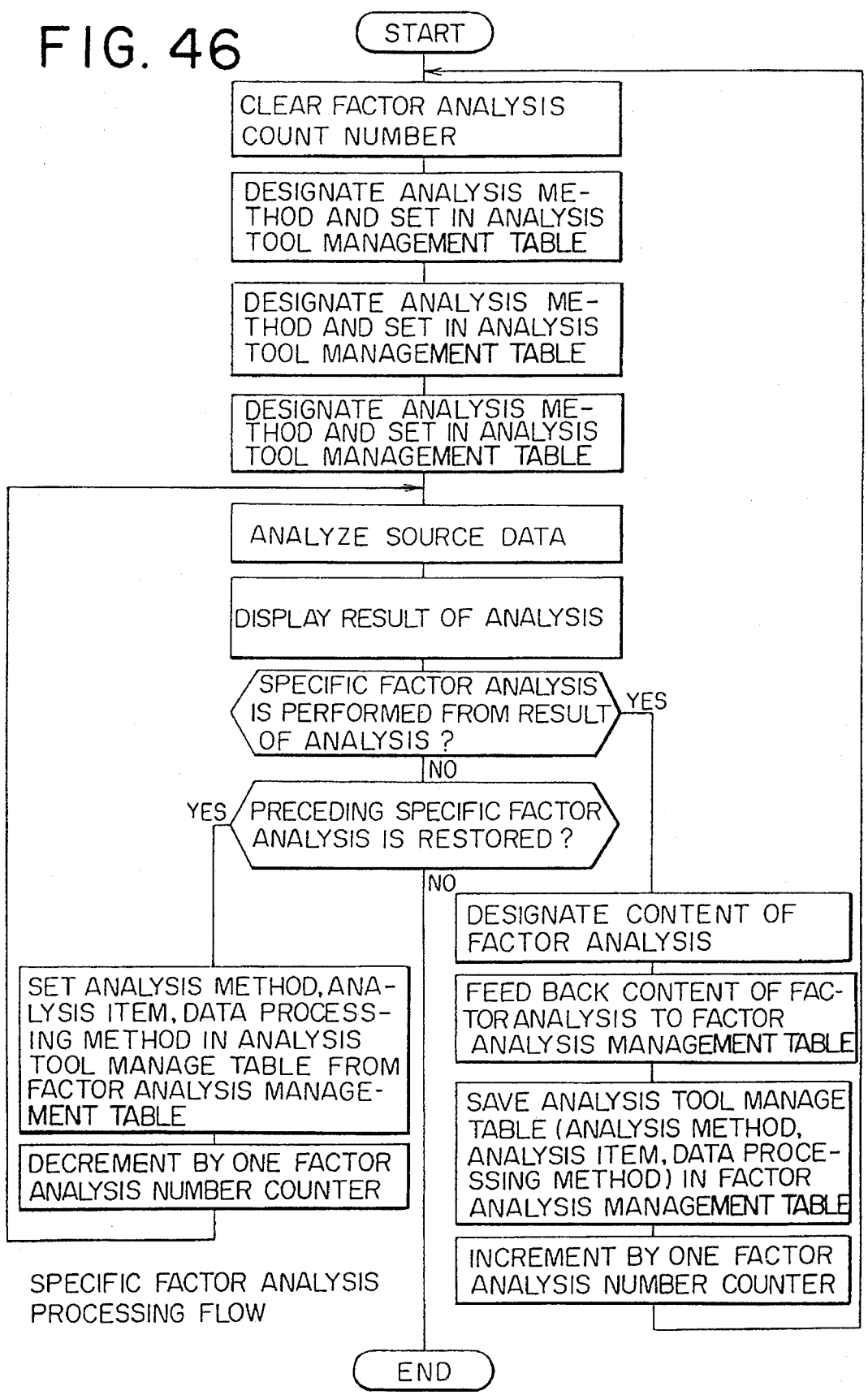
FIG. 46 is a flow chart showing a specific factor analysis processing for performing the factor analysis.

FIG. 46 shows a specific factor analysis processing flow.

In this processing flow, it is assumed that the data are previously set in the source data manage table and the source data number table in the data correlation diagram shown in FIG. 45.

At first, the factor analysis number in the factorial analysis number table is cleared. Subsequently, the analysis method, the item for analysis and the data processing method which constitute the information managed by the analysis procedure manage table are designated and placed in the table. Source data is analyzed in accordance with the information set in the analysis procedure manage table. The result of the analysis is displayed in accordance with the analysis method which is the information contained in the analysis procedure manage table. Subsequently, on the basis of the analysis result, decision is made as to whether or not the content of a specific factor is to be analyzed and developed in more detail. When the analysis is to be performed on the specific factor, the content of one of the items for the analysis being displayed is designated in dependence on the analysis method contained in the analysis tool manage table. The designated content for the factor analysis is saved in the factor analysis manage table. Further, the contents (analysis method, item for analysis and data processing method) of the analysis tool manage table indicating the current content for the analysis are saved in the factor analysis manage table. Subsequently, a factor analysis number counter is incremented by one, whereupon saving of the current analytical information is completed. For performing a specific factor analysis, information managed in the analysis procedure manage table is designated. Unless the processing for the specific factor analysis is performed, decision is made as to whether or not the preceding specific factor analysis is to be restored or not. If it is to be restored, processing mentioned below is performed. From the factor analysis manage table, the analysis method, the item for the analysis and the data processing method are set in the analysis tool manage table. The factor analysis number counter is decremented by one to thereby restore the analysis data. When the information has been set in the analysis procedure manage table from the factor analysis manage table, the source data analysis is performed, the result of which is then displayed. Unless the specific factor analysis is restored, the whole processing now under consideration is completed.

Figure 47:
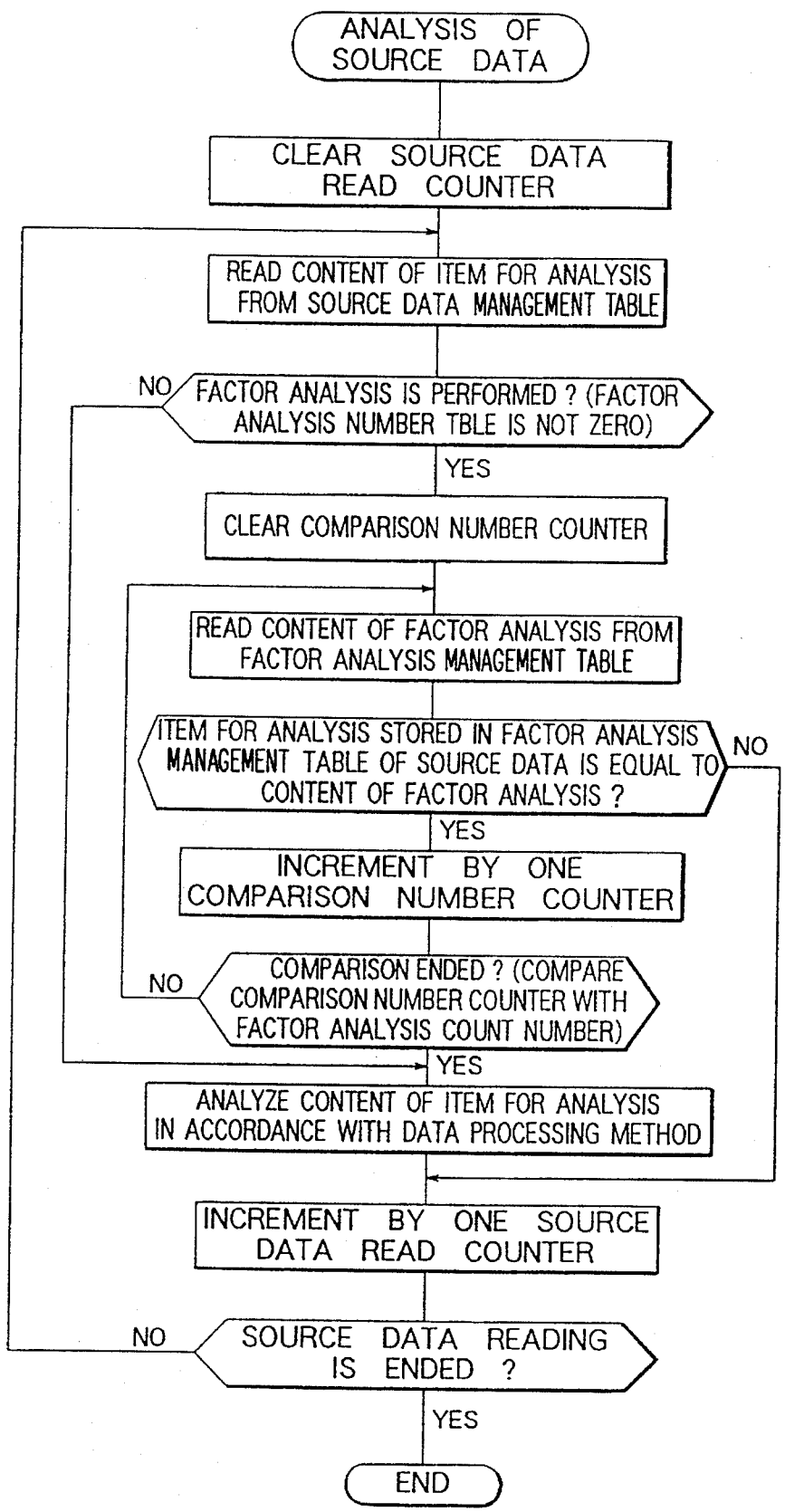
FIG. 47 is a flow chart for illustrating processing of contents of a source data management table in accordance with the information of the analysis tool manage table shown in FIG. 45.

FIG. 47 shows a source data analysis processing flow.

This flow illustrates the data processing method carried out on the contents of the source manage table in accordance with the information contained in the analysis tool manage table.

In the first place, a source data read counter is cleared. Next, content of the item for the analysis is read out from the source data manage table. It is then decided whether the factor analysis is to be performed or not in dependence on whether the value of the factor analysis number table is zero or not. When the factor analysis is to be performed, a factor analysis comparison number counter is cleared. Content of the factor analysis is then read out from the factor analysis manage table, whereon decision is made as to whether or not the content of the factor analysis coincides with the item for the analysis which is stored in the factor analysis manage table for the source data. When coincidence is found, the comparison number counter is incremented by one. When the value of the comparison number counter becomes equal to the factor analysis number, it is then decided that the read position data equal to the value of the source data read counter is the data for the analysis of the specific factor. Subsequently, the item for the analysis contained in the analysis tool manage table is analyzed in accordance with the data processing method. Unless the item of the source data is equal to the content of the factor analysis or unless the factor analysis is to be performed, no data processing is carried out. Next, the source data read counter is incremented by one. In this manner, the contents of the items for the analysis read out from the abovementioned source data manage table are processed in accordance with the value of the source data read counter until the value of the source data number table becomes equal to the number of times the read operation was performed.

Next, description will turn to a scheme for estimating fault occurrences in the future on the basis of the current fault occurrence and the product shipping data. First, procedures involved in this scheme are mentioned below.

step 1: a total number N(t) of operating products and a number r(t) of faults as occurred are determined over a number of months (t) in which the products were put into operation.

step 2: a fault ratio is determined in accordance with $\lambda(t)=r(t)/N(t)$.

step 3: $(\ln t, \ln\Sigma\lambda (t))$ is plotted on a hazard probability sheet.

step 4: Straight lines or polygonal lines are applied to the plotted points and the line exhibiting a best fit is selected.

step 5: parameters $(m, \eta)$ of the fault distribution (Weibull distribution) are determined on the basis of the gradient and intercept of the straight line.

step 6: a cumulative fault ratio $F(t)=\int f(t)dt$ in an assumed month t is determined by using the parameter determined in the step 5 and based on the $$m \cdot \frac{t^{m-1}}{\eta^M} \cdot \exp\left(-\left(\frac{t}{\eta}\right)^m\right)$$

equation $f(t)=$.

step 7: A cumulative fault occurrence number in an assumed month is determined in accordance with $\Sigma n(t) \cdot F(t)$ (where n(t) represents the number of products as sold in each month (t)).

step 8: An accumulated rate of faults in an assumed month is determined in accordance with $\Sigma n(t) \cdot F(t)N$ (where $N=\Sigma N(t)$), representing a total number of products as sold).

FIG. 48 shows the processing in more concrete.

As is shown in this figure at a leftmost column, at a time point when a fault, takes place in a product, type of that product, symptom of the fault, parts, contents of the disposal and other information are reported in the form of a card. In this conjunction, it is to be noted that the time pint at which the products were started to operate differs from one to another, in the contrast to the case of life test. Under the circumstances, the failure ratio is calculated on the basis of the number of months in which the products were operated, as indicated at an upper left field in the rightmost column of FIG. 48. Starting from the fault ratio, the cumulative hazard values are determined and plotted relative to the number of the months over which the product was operated. On the basis of the slope and the intercept of a straight line approximating the plot, the fault occurrence estimation is performed. As a model for this estimation, the Weibull distribution is made use of. By using as the Weibull parameters the slope m and the intercept m·lnη determined through the linear approximation, the fault occurrence is estimated in accordance with a function f(t) shown in a lower left portion. In the Weibull distribution, it globally applies that m<1 represents a pattern in which a relatively large number of faults occur in an earlier stage after the products having been put into operation, while m>1 represents a pattern in which faults are ascribable to wearing. In the case of a pattern represented by m=1, the fault is of accidental nature.

According to the present invention, it is possible to pinpoint the cause of a fault occurring in a machine by searching along a fault tree starting from a symptom of the fault upon occurrence thereof in the course of use of the machine by a customer, to thereby indicate the appropriate measures such as adjustment, repair and the like. By virtue of this feature, the number of visits on the customer for the repair, the turn-around time taken till the complete recovery, the number of constituent parts required in the repair and the like can be reduced, to an advantageous effect.

Since the search and analysis of the quality data can be performed in the work station according to the invention, the sequence of the search/analysis request, the processing and the output can be executed on a real-time basis, whereby the turn-around time involved in the analysis work can be reduced, to another advantageous effect.

According to the invention, information concerning the repairs collected primarily in the field by the customer's product maintenance engineers such as servicemen who are dispatched to the customers upon occurrence of faults in their machines can instantaneously be fed back on a repair-by-repair basis to a factory which is responsible for the design, manufacture and the inspection of the machine by way of the business divisions such as the specific agent, business office or the like. Owing to this feature, it is possible to perform design improvement of the products being manufactured as well as improvement of the evaluation/inspection systems for the parts as used in an earlier stage. Besides, reliability can be improved in the design of new products.

Since the search/analysis of the quality data can be performed in the work station without relying on external means, the sequence of the search, the analysis request, the processing and the output can be executed on a real-time basis, whereby the turn-around time involved in the analysis work can be reduced.

Further, by searching the source data on a record-by-record basis and developing the data on the memory in the workstation, there can be realized not only the analysis for each item of data concerning the fault and the repair of a product but also the analysis for all combinations of the items.

We claim:

1. A computer-implemented method of diagnosing and analyzing fault information of a product, said method comprising the steps of:

a) creating a hierarchical fault tree structure representing causal relationships of faults based on structure and characteristic data of the product and storing said fault tree in storage means, said fault tree having branches allocated with weighting coefficients predetermined according to previous faults and causes thereof;

b) inputting new fault information of the product;

c) in response to the inputting of said new fault information, searching said fault tree in accordance with said weighting coefficients based on said fault information stored in said storage means to thereby determine a cause of the fault of said product;

d) generating and outputting data concerning an adjustment or repair of said product suffering from the fault based on the determined cause of fault as well as the structure and characteristic data of said product;

e) supplying specific fault information including information concerning timing of the occurrence of the fault of said product, symptoms of the fault, the determined cause of the fault and the adjustment and repair data to a marketing product quality information collecting/analysis facility through a data collecting station, wherein said marketing product quality information collecting/analysis facility is supplied with the specific fault information regarding a plurality of units of the product, to thereby provide a database for said fault information, wherein the database fault information is continuously updated; and f) statistically analyzing, in said marketing product quality information collecting/analysis facility quality of said product based on all or a part of the database fault information.

2. A method according to claim 1, wherein said weighting coefficient is given in terms of a probability value indicating validity of said causal relation, said method further comprising a step of updating said weighting coefficient and configuration of said fault tree.

3. A method according to claim 1, wherein in said step e), information concerning the timing of the occurrence of the fault of said product, the symptoms of the fault, the determined cause of the fault, the adjustment and the repair as supplied from a plurality of different locations is transferred to said marketing product quality information collecting/analysis facility via said data collecting stations, said database being managed by said host computer.

4. A method according to claim 1, said method further comprising a step of sending analysis results obtained in step f) to said terminal from said marketing product quality information collecting/analysis facility via said data collecting station.

5. A method according to claim 1, wherein in said step f), said computer analyzes factors of a failure of the product and fault occurrence trends and based on all or a part of the information of said database, the result of said analysis being fed back to at least a designing division, a manufacturing division and an inspection division of the product.

6. A system for diagnosing and analyzing fault information of a product with assistance from a computer, comprising:

a fault diagnosis system, including:
storage means for storing a fault tree representing causal relations for previous faults and causes thereof in a tree structure together with information concerning structure and characteristics of the product, said fault tree having branches allocated with weighting coefficients,
a terminal capable of communicating with said computer for inputting new fault information of the product,
means responsive to the inputting of said new fault information for searching said fault tree in accordance with said weighting coefficients based on said fault information stored in said storage means to thereby determine the cause of the fault of said product, and
means for generating and outputting information concerning adjustment or repair of said product suffering from the fault based on the determined cause of the fault as well as said information concerning the structure and characteristics of said product; and a marketing product quality information collecting/analysis facility, including:

means for receiving specific fault information including information concerning timing of an occurrence of the fault of said product, symptoms appearing in the fault, the determined cause of the fault and the information concerning said adjustment and repair, via a data collecting station, wherein said marketing product quality information collecting/analysis facility receives the specific fault information regarding a plurality of units of the product, to thereby provide a database for the fault information, wherein the database fault information is continuously updated; and means for statistically analyzing quality of said product based on all or a part of the database fault information.

7. In a system having a database for managing production information including design information, production history information and inspection information of products manufactured in a factory, market information including fault information regarding products in a market, repair information of the products, and sales information of the products, a total quality management system comprises:

means for connecting the factory with a service base in the market via a communications network;

means for receiving, at said service base, said market information including information representing faults having occurred in products in the market or at least a type of product incurring the faults, fault events, names of faulty parts and information representing treatments for the faults, and for storing said market information into said database via said network;

user interface means for receiving an instruction for outputting display information for analyzing fault causes for each product type in accordance with the information stored in said database;

a fault analysis module wherein a distribution of either one of at least a number of faults, repair costs and fault ratio corresponding to an analysis item of at least fault date, product type, product name, event code and operation months is obtained based on the information stored in said database in accordance with respective data processing methods, said distribution being displayed by a monitor of a work station in accordance with either one of displaying methods of at least a transition diagram graph, a constituent ratio diagram and a dispersion diagram, object data being restricted each time an element of the analysis item is received by said user interface means and the displaying is repeated, at the same time said analysis item, a data processing method, an analysis method and a factor analysis content are recorded and the history is added on the display thereby to reproduce an inverse order and narrowing of the cause of fault is easily made possible;

a fault occurrence prediction model for predicting the number of faults at each future number of months of operation with respect to the product type or part name restricted by said factor analysis content repeatedly narrowed in said fault analysis module based on the information of fault occurrence, the sales information of a product of the product type or a product assembled with the product of the product name presently stored in said database; and an alarm management module for generating an alarm when a fault ratio predicted by said fault occurrence predict module exceeds a target value of a predetermined fault ratio of each product type, and for predicting a time when the fault ratio exceeds the target value.

8. A system according the claim 7, wherein the fault analysis module includes:

means for accessing and searching said data base and displaying graphical information for the plurality of products, selecting one of the products for display of information specifically related thereto, and displaying the specifically related information of the selected product without reaccessing said database.

9. A system according to claim 7, wherein the fault analysis module includes:

means for correlating the information relating to failure of the product and processing applied to correct the failure with the information relating to manufacturing and sales of the product stored in said database;

means for displaying the correlated information in a continuous manner in dependence upon limited predetermined parameters of the product and expanding the display based upon the predetermined parameters; and means for displaying the correlated information in different graphical forms applying predetermined parameters to one of the graphical forms, and displaying the correlated information in a different graphical form representing an expansion of the display based upon the predetermined parameters.

10. A system according to claim 9, wherein the fault analysis module further includes:

means for recording said predetermined parameters for every time the correlated information is displayed and enabling regeneration in a reverse order.

* * * * *